(12) United States Patent
Balema et al.

(10) Patent No.: US 11,208,334 B2
(45) Date of Patent: Dec. 28, 2021

(54) PREPARATION OF METAL CHALCOGENIDES

(71) Applicant: Iowa State University Research Foundation, Inc., Ames, IA (US)

(72) Inventors: Viktor Balema, Ames, IA (US); Ihor Hlova, Ames, IA (US); Vitalij K. Pecharsky, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 496 days.

(21) Appl. No.: 15/998,266

(22) Filed: Jul. 26, 2018

(65) Prior Publication Data

US 2019/0039913 A1 Feb. 7, 2019

Related U.S. Application Data

(60) Provisional application No. 62/605,102, filed on Aug. 1, 2017, provisional application No. 62/710,190, filed on Feb. 12, 2018.

(51) Int. Cl.

| | |
|---|---|
| *C01G 39/06* | (2006.01) |
| *C01G 41/00* | (2006.01) |
| *B02C 15/00* | (2006.01) |
| *B02C 19/06* | (2006.01) |
| *C01B 19/00* | (2006.01) |

(52) U.S. Cl.
CPC ............ *C01G 39/06* (2013.01); *B02C 15/004* (2013.01); *B02C 19/06* (2013.01); *C01B 19/002* (2013.01); *C01G 41/00* (2013.01); *C01G 41/006* (2013.01); *C01P 2002/01* (2013.01); *C01P 2002/72* (2013.01); *C01P 2002/85* (2013.01); *C01P 2002/88* (2013.01); *C01P 2004/03* (2013.01); *C01P 2004/04* (2013.01); *C01P 2004/20* (2013.01); *C01P 2004/30* (2013.01)

(58) Field of Classification Search
CPC ...... C01G 39/06; C01G 41/006; C01G 41/00; C01B 19/002; B02C 15/004; B02C 19/06; C01P 2004/04; C01P 2002/01; C01P 2004/30; C01P 2002/85; C01P 2002/88; C01P 2004/03; C01P 2004/20; C01P 2002/72

See application file for complete search history.

(56) References Cited

FOREIGN PATENT DOCUMENTS

| CN | 10185727 A | 10/2010 |
|---|---|---|
| CN | 101857274 A | 10/2010 |
| CN | 104577063 A | 4/2015 |
| CN | 106033810 A | 10/2016 |
| CN | 104577047 A | 4/2019 |

OTHER PUBLICATIONS

Ibrahem, et al., High quantity and quality few-layers transition metal disulfide nanosheets from wet-milling exfoliation, RSC Advances 2013; 3: 13193-13202 (Year: 2013).*

(Continued)

*Primary Examiner* — Daniel C. McCracken

(57) ABSTRACT

A method embodiment involves preparing single metal or mixed transition metal chalcogenide using exfoliation of two or more different bulk transition metal dichalcogenides in a manner to form an intermediate hetero-layered transition metal chalcogenide structure, which can be treated to provide a single-phase transition metal chalcogenide.

26 Claims, 44 Drawing Sheets

(56) References Cited

OTHER PUBLICATIONS

Xing, et al., Gas Protection of Two-Dimensional Nanoparticles from High-Energy Impacts, Scientific Reports 2016; 6: 35532, pp. 1-9 (Year: 2016).*

Niu, et al, Salt-Assisted High-Throughput Synthesis of Single- and Few-Layer Transition Metal Dichalcogenides and Their Application in Organic Solar Cells, Small 2014; 10(22): 4651-4657 with Supporting Information (Year: 2014).*

Honglin Li et al., Novel dual-petal nanostructured $WS_2$-$MoS_2$ with enhanced photocatalytic performance and a comprehensive first-principles investigation, Journals of Materials Chemistry AA, 3, 20225-20235, 2015.

Nitin Choudhary et al., Centimeter Scale Patterned Growth of Vertically Stacked Few Layer Only 2D $MoS_2$/$WS_2$ van der Waals Heterostructure, Scientific Reports, 1-6, 2016.

Shoujun Zheng et al., Monolayers of $W_xMo_{1-x}S_2$ alloy heterostructure with in-plane composition variations, Appl. Phys. Lett. 106, 063113, 2014.

D.O. Dumcenco et al., Raman study of $2H$-$Mo_{1-x}W_xS_2$ layered mixed crystals, *Journal of Alloys and Compounds* 506, 940-943, 2010.

Jianging Shi et al., Temperature-Mediated Selective Growth of $MoS_2$/$WS_2$ and $WS_2$/$MoS_2$ Vertical Stacks on Au Foils for Direct Photocatlytic Applications, Adv. Mater. 28, 10664-19672, 2016.

Cecile Thomazeau et al., Two Cation Disulfide Layers in the $W_xMo_{(1-x)}S_2$ Lamellar Solid Solution, Journal of Solid State Chemistry, 160, 147-155, 2001.

Rui Dong et al., Bottom-up direct writing approach for controlled fabrication of $WS_2$/$MoS_2$ heterostructure systems, The Journal of the Royal Society Adv., 66589, 12016.

Kun Chen et al., Lateral Built-in Potential of Monolayer $MoS_2$-$WS_2$ In-Plane Heterostructure by a Shortcut Growth Strategy, Adv. Mat. 27, 6431-6437, 2015.

Yu Lei et al., Low-Temperature Synthesis of Heterostructures of Transition Metal Dichalcogenide Alloys ($W_xMo_{1-x}S_2$) and Graphene with Superior Catalytic Performance of Hydrogen Evolution, ACS Nano 11, 57103-5112, 2017.

Lu Wang et al., $Mo_xW_{1-x}S_2$ Solid Solutions as 3D Electrodes for Hydrogn Evolution Reaction, Adv. Mat. 2, 1500041, 2015.

* cited by examiner

PREPARATION OF METAL CHALCOGENIDES

RELATED APPLICATIONS

This application claims benefit and priority of U.S. provisional application Ser. No. 62/605,102 filed Aug. 1, 2017, and Ser. No. 62/710,190 filed Feb. 12, 2018, the entire disclosures and drawings of which are incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to the preparation of a transition metal chalcogenide material that includes using one or more dry or liquid-assisted mechanical exfoliation steps.

BACKGROUND OF THE INVENTION

Bulk single-phase transition metal dichalcogenides (TMDCs), which are built from separate transition metal-chalcogen layers bound together by weak Van der Waals forces, find numerous applications, as components of lubricating oil additives, self-lubricating coating materials, photoelectrode materials, photocatalysts, battery materials, components of supercapacitors, thermoelectric materials, and hydrogen storage materials, catalysts for the electrochemical hydrogen evolution reaction (HER), and more. In the vast majority of cases known to date, TMDC based materials consist of two chemical elements, a transition metal and a chalcogen, which form a binary chemical compound.

Recent interest in tunable materials for quantum electronics, energy generation and storage created a strong demand for multi-principal element TMDC systems, which performance can be tuned by altering the materials chemical composition. Currently, the set of known single-phase layered TMDCs is limited to two and a few examples of three or four element systems with general formula of MXX' and (M,M')XX', where M and M' is selected from the following group of elements Mo, W, Nb, Ti, Zr, Hf, Ta, Re, Pd, Pt, In, Ga or Sn, and X and X' is selected from S, Se, Te. Mixed (multi-principle element) TMDCs, such as $(Mo,W)S_2$, $(Mo,W)Se_2$, $(Mo,W)SSe$ and others find numerous applications as lubricating oil additives [2], self-lubricating coating materials [3,4], photoelectrodes [5], photocatalysts [6-8], battery materials [9], supercapacitor electrodes [10,11], thermoelectric materials [12], hydrogen storage materials [13,14], catalysts for the electrochemical hydrogen evolution reaction [8]. In particular, two-dimensional (2D) nanostructures of TMDCs, have attracted considerable interest due to their unique mechanical, electrical and optical properties. Remarkably, these materials provide all favorable mechanical properties of graphene, but in contrast to its near zero bandgap exhibit a direct bandgap in the monolayer form, which can be tuned in mixed TMDCs such as $Mo_xW_{(1-x)}S_ySe_{(1-y)}$, where x and y=0-1, for example.

Conventionally, single-phase TMDCs are prepared using several experimental approaches. The reactions of transition metals or transition metal oxides with pure chalcogens S, Se or Te in bulk or using chemical vapor deposition technique (CVD) by far dominate the synthetic landscape.

The preparation of mixed TMDCs is usually carried out using several experimental approaches. Chemical Vapor Deposition and Atomic Layer Deposition (CVD & ALD) are by far the major techniques to obtain monolayers of various types. CVD&ALD utilize the gas phase reactions of metals [15] or metal oxides [16-18] with volatile chalcogens in an inert gas atmosphere at elevated temperatures. However, the materials formed using vapor deposition techniques are often complex systems where different TMDC constituents are present as separate phases. Another synthetic approach to the synthesis of mixed TMDCs involves the decomposition of co-crystallized thiosalts, such as $(NH_4)_2MoS_4$, $(NH_4)_2WS_4$ [19] or other similar precursors [21], in a reducing atmosphere. Thus prepared bulk materials were reported to consist of two-cation sulfide layers $Mo_xW_{(1-x)}S_2$ if the precursor salts are mixed in the solution and treated with electrical current [22] or hydrogen at high temperature [19], or multi-layer single cation heterstructures [20] when a step by step deposition and thermal decomposition of specific thiosalts is employed. However, recent results showed that the presence of a nano-carbon/graphene support is critical for the formation of such solid solutions [23].

An earlier attempt to make single-phase mixed TMDCs by heating up crushed and thoroughly mixed bulk $WS_2$ and $MoS_2$ was reported as unsuccessful [19]. Even at 1000° C. the mechanical mixture of these metal disulfides did not form a single-phase solid solution and remained just a mixture of the separate $WS_2$ and $MoS_2$ phases.

Mechanical processing in the form of milling or grinding is commonly used for crushing, mixing or exfoliating of TMDCs or precursors for their synthesis as well as for making their nanoparticles.

In one such example, $MoS_2$ nanosheets are produced in a jet mill followed by processing with $H_2O_2$ and ethanol, then upper layer is filtered and vacuum dried to obtain the so-called $2H$—$MoS_2$ concentrate [24].

The high temperature self-lubricating composite based on Ni with 5% C and 40% $WS_2$ additives is prepared first by ball milling to obtain uniform mixing and then subsequent annealing of the latter under elevated temperatures and pressures [25]. Similar material can be obtained based on copper [26] as well.

Mechanochemical exfoliation to produce 2D materials from graphite, TMDCs or other layered materials is based on intercalation of $Li^+$ and $Et_4N+$ ions within the layered crystals in deep eutectic solvent environment by means of shear forces during ball milling [27].

Mechanical activation of $WO_3$ and sulfur was used to produce homogeneous hexagonal $WS_2$ nanoplates upon subsequent annealing [28,29].

Also, there are reports describing the preparation of TMDC-containing composites by employing mechanical milling (mechanical processing) as an experimental technique:

Ball milling of a mixture containing $WS_2$ or $MoS_2$ and graphite produces a composite consisting of intermixed TMDC and graphite particles. Upon milling the uniform distribution of single-phase $WS_2$ and $MoS_2$ nanoparticles ranging in size from 10 to 60 nm and coated in graphite is obtained [30].

Coupling of ball milling technique with sonication in deionized water environment facilitates production of nano $WS_2$ and $MoS_2$ granules [31].

The composite of $MoS_2$—C which is made by ball milling of the bulk $MoS_2$ with graphite consists of separate nanographene and $MoS_2$ phases, whereby separate graphene layers cover $MoS_2$ nanoparticles [32].

Transition metal chalcogenides are prepared by high-temperature synthesis with subsequent ball milling in presence of a surfactant to obtain ultra-thin single-phase nanosheets for the use as lubricating oil additives [2].

Nanocomposite of titanium dioxide and tungsten sulfide ($TiO_2$—$WS_2$), generated by ball milling, shows a high ability to absorb visible light and, as a consequence, suitability for water-splitting applications [5].

Pretreatment by ball milling is used to generate $WS_2$ nanopetals which subsequently act as a base for growing curly $MoS_2$ structures with a significant photocatalytic activity [6].

Ball milling with subsequent heat-treatment at elevated temperatures is utilized to prepare $WS_2$ nanosheets-carbon composite which demonstrated high reversible capacity when applied as anode for sodium and lithium ion batteries [9].

Ball milling of $MoS_2$ is used for the exfoliation of $MoS_2$ for further use as electrode materials for flexible supercapacitors [10]. In another case, similar electrodes are fabricated from nanoparticles of $Fe_3O_4$ attached to nano-$WS_2$, which are made by the exfoliation of bulk $WS_2$ using ball milling and sonication [11].

Ball milling with subsequent sonication and sintering is used for the preparation of $TiS_2$—$MoS_2$ composites that can be utilized as low-cost high-efficiency thermoelectric materials [12].

A ball milled $MoS_2$ is used in an Mg/$MoS_2$ nano-composite for hydrogen storage applications. The nanocomposite shows the reduced desorption temperature and an ability to maintain nano-scale crystallites, which favors its cycling stability[13,14].

Influence of milling media and materials of milling setup on exfoliation of $MoS_2$ has been studied. Ball milling using alumina balls is found to be more efficient than processing in all-stainless steel setup [33].

Exfoliation of $MoS_2$ has been achieved by dry milling of the bulk material with NaCl and subsequent ultrasonic disintegration of the nanostructured $MoS_2$ in an organic solvent [34].

Another particular synthetic process that is known uses chemical conversion of co-crystallized thiosalts, such as $(NH_4)_2MoS_4$, $(NH_4)_2WS_4$ or other similar precursors in a reducing atmosphere at temperatures of 300-700° C. (see references 19, 21, 35-37). One such process includes the dissolution of $(NH_4)_2MoS_4$ and $(NH_4)_2WS_4$ in water, mixing together the aqueous solutions formed, the evaporation of water and subsequent decomposition of the obtained solid material in hydrogen containing atmosphere at about 400° C. As a result, $(NH_4)_2MoS_4$ and $(NH_4)_2WS_4$ are chemically converted into mixed materials as shown in Eq. 1.

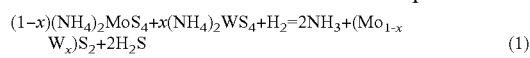

$$(1-x)(NH_4)_2MoS_4 + x(NH_4)_2WS_4 + H_2 = 2NH_3 + (Mo_{1-x}W_x)S_2 + 2H_2S \quad (1)$$

There is a need for a simple and inexpensive method to prepare metal chalcogenides that are single phase. Furthermore, single-phase metal chalcogenides combining four or more chemical elements in their structure do not appear to have been reported in the open literature.

SUMMARY OF THE INVENTION

The present invention provides method embodiments for preparing a transition metal chalcogenide material by exfoliating two or more different bulk transition metal chalcogenides separately or together and combining in a passive manner (self-assembly) and/or active manner (mixing) the exfoliated products to form a transition metal chalcogenide hetero-structure having layers of different composition.

A particular method embodiment of the present invention involves preparing the metal chalcogenide material starting from different, bulk transition metal dichalcogenides (TMDCs) wherein the method includes one or more dry or liquid-assisted mechanical exfoliation steps. The bulk TMDCs can include two or more bulk metal sulfides, selenides, tellurides, or their combinations. Embodiments of the present invention envision producing a mixed metal or a same (single) metal chalcogenide material.

An illustrative method embodiment of the invention involves one or more exfoliation steps that involve dry mechanical exfoliation by mechanical processing of the two or more different bulk TMDC materials together under inert gas atmosphere for a time period effective to form a material, which can have a disordered structure or ordered structure. The ordered TMDC can be a substantially homogenous three dimensional (3D) hetero-layered structures of the two or more unique constituents.

In another illustrative method embodiment of the invention, the dry mechanical exfoliating step is conducted by mechanical processing using pestle and mortar, shaker ball mills of any configuration, planetary ball mills of any configurations, any type of laboratory or industrial grinders, or other milling, or grinding equipment that can produce plastic, shear and other irreversible deformation as well as partial or complete exfoliation of the bulk TMDCs to produce an intermediate 3D hetero-layered structure. The hetero-layered structure so produced can be subjected to reactive interlayer mixing and conversion of the layered structure into a single phase, wherein reactive intermixing is effected by means of heat treatment (annealing), or mechanical working/processing, or high uniaxial external pressure, or a combination of external pressure and shear stress, or by cold, or hot rolling, or by combination of thereof.

Another illustrative method embodiment of the invention involves one or more liquid-assisted exfoliation steps that involve exfoliating two or more different transition metal chalcogenide materials together or separately in the same or in a different liquid medium using mechanical processing, sonication, or any other exfoliation technique and combining the products of the exfoliating in a manner to form a transition metal chalcogenide material having hetero-layers (3D heterostructures) of different composition. The material can be further processed to obtain an ordered multi-principal element single-phase product in a crystalline form.

In a particular illustrative embodiment of the invention, the exfoliating step is conducted by mechanical processing and/or sonication in the same or different liquid(s) to form dispersion(s), and the combining step involves spontaneous self-assembly (e.g. in the same dispersion or by mixing the dispersions together), or additive assembly (e.g. by layer-by-layer deposition, spin coating, ink jet printing etc. of the dispersions) of the exfoliated products of the dispersions. The hierarchical layered structures so produced can be subjected to reactive interlayer mixing and conversion of the hierarchical layered 3D heterogeneous-structures (heterostructures) into a single phase material, wherein reactive intermixing is effected by means of heat treatment (annealing), mechanical working/processing, high uniaxial external pressure, or a combination of external pressure and shear stress, or by cold or hot rolling or by combination of thereof.

The present invention also provides a composition of matter embodiment comprising two dimensional (2D) single layer or three dimensional (3D) multi-layer thick, mixed TMDC nanoplates having a chemical composition represented by $(M_a M^2_b M^3_{c...n})(X_d X^2_e X^3_f)$, where the formula unit includes more than two different metals (M), and X, $X^2$ and $X^3$ represent S, Se, and/or Te, whereby the sum of a+b+c+ . . . n is between 1 and 3 and the sum of d+e+f is between 1 and 6. For a composition including more than two different metals ($M_a M_b$), the composition can be represented by $M_a M^2_b X_d$ where X is at least one of S, Se, and Te.

The present invention further envisions in still another composition of matter embodiment a mixed TMDC material, such as a layered bulk material or nano-structured material such as 2D or 3D nano-plates), having a chemical composition represented by $(M_a M^2_b M^3_c \ldots n)(X_d X^2_e X^3_f \ldots X^m_z)$, where the formula unit includes four or more different chemical elements; where M is a transition metal selected from the group consisting of Ti, Zr, Hf, Nb, Ta, Mo, W, Re, Pd, Pt, In, Ga and Sn and where X is selected from the group consisting of S, Se, and Te and may additionally and optionally include O, N, B, C and/or P; where the sum of a+b+c+ . . . n is between 1 to 10; and where the sum of d+e+f+ . . . z exceeds 0.1.

The present invention also provides still another composition of matter embodiment a mixed TMDC material, such as a layered bulk or nano-structured material such as 2D or 3D nano-plates, having a chemical composition represented by $(M_a M^2_b M^3_{c...n})(X_d X^2_e X^3_f \ldots X^m_z)$, where the formula unit includes three or more different chemical elements; where M is a transition metal selected from the group consisting of Ti, Zr, Hf, Nb, Ta, Mo, W, Re, Pd, Pt, In, Ga and Sn and where X is selected from the group consisting of S, Se, and Te with Te always present in the material and may additionally and optionally include O, N, B, C and/or P; where the sum of a+b+c+ . . . n is between 1 to 10; and where the sum of d+e+f+ . . . z exceeds 0.1.

Practice of the present invention utilizes solid-state processing to obtain hetero-layered materials in different TMDC systems, which materials can be converted to single-phase material, and enables simple, inexpensive, and scalable way of their industrial production.

Other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 18a-18b; 19a-19b, and 20a-20b relate to five- and six-principal element TMDCs, wherein FIG. 18a shows XRD pattern and FIG. 18b shows Raman spectra of $(Mo_{0.4}W_{0.2}Nb_{0.4})S_{0.8}Se_{1.2}$. Corresponding data for $(Mo_{0.6}W_{0.2}Ta_{0.2})S_{0.8}Se_{1.2}$ is shown in FIG. 19a and FIG. 19b, and for $(Mo_{0.25}W_{0.25}Nb_{0.25}Ta_{0.25})SSe$ is shown in FIG. 20a and FIG. 20b. Diffraction patterns and Raman spectra of starting materials are shown as references.

FIGS. 22a-22e show HAADF-STEM and STEM-EDS images of the as-milled equimolar mixture of $MoS_2$ and $WSe_2$; wherein FIG. 22a shows an example of a "compositionally uniform" particle and FIG. 22b shows a heterostructured particle. A side view of a large particle is shown in FIG. 22c and FIG. 22d, and a "reshuffled" fragment of the same material is shown in FIG. 22e. Due to the higher Z-factor, $WSe_2$ fragments produce brighter image than the $MoS_2$ layer

DETAILED DESCRIPTION OF THE INVENTION

Figure 1A:
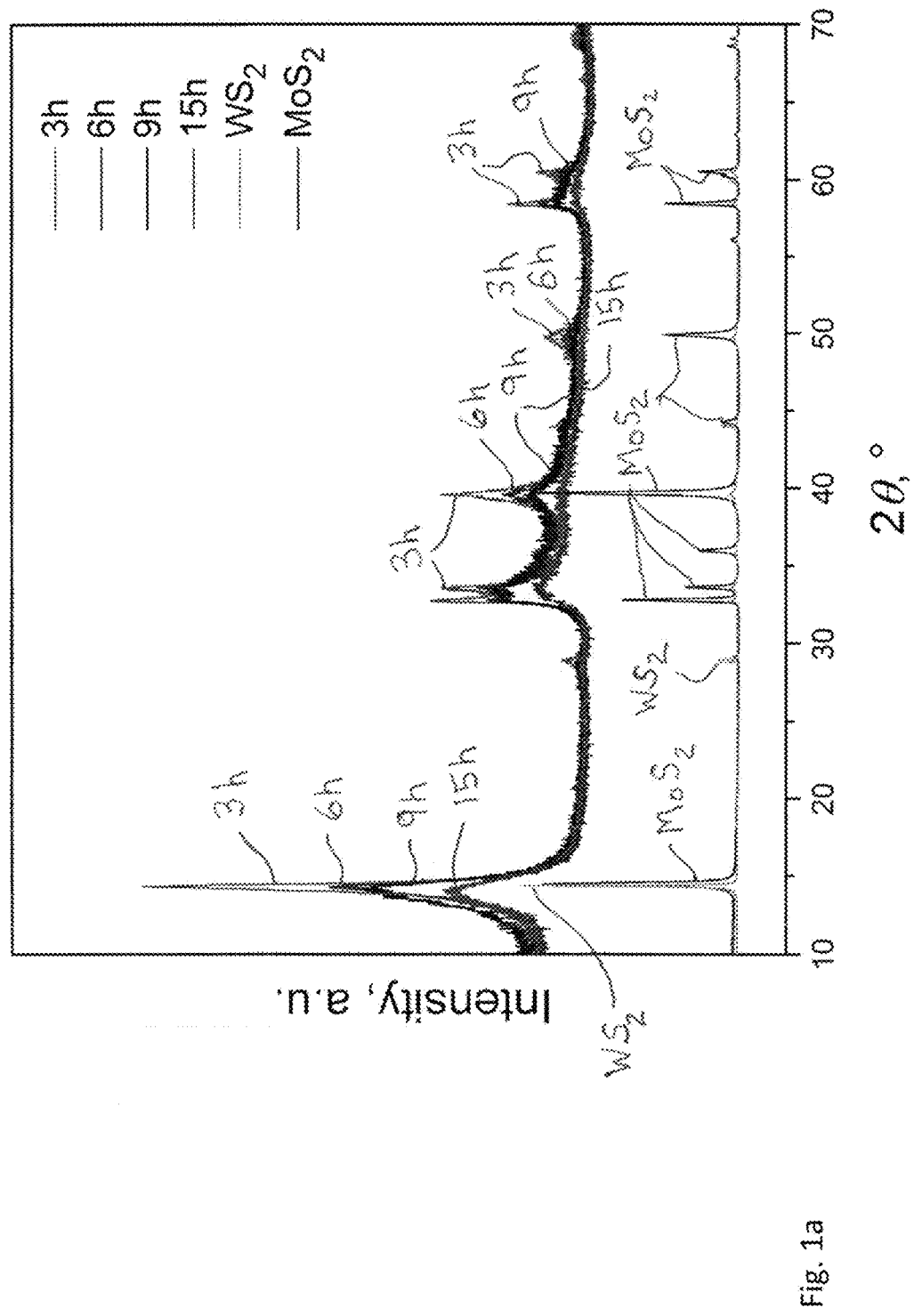
FIGS. 1a and 1b show powder X-ray diffraction patterns for the stoichiometric 1:1 (molar) mixture of $MoS_2$ and $WS_2$ milled for various periods of time in a planetary mill (FIG. 1a) and a mixer mill (FIG. 1b).

The present invention provides method embodiments for preparing a transition metal chalcogenide material, such as a TMDC, by exfoliating two or more different starting TMDCs separately or together and combining the exfoliated products to form a transition metal chalcogenide structure having layers of different composition. The combining of the exfoliated products can be achieved in a passive manner by self-assembly in the event the TMDCs are exfoliated together and/or in an active manner by mixing the products together in the event the TMDCs are exfoliated separately.

The present invention involves preparing a transition metal chalcogenide material starting from for example different, bulk, starting TMDCs wherein the method includes one or more solid-state or liquid-assisted exfoliation steps. For purposes of illustration and not limitation, Examples 1-3 set forth below describe dry mechanical exfoliation by mechanical processing to this end. For purposes of illustration and not limitation, Examples 4-7 describe liquid-assisted mechanical exfoliation by mechanical processing, which can be followed by liquid phase sonication, to this same end.

In practice of embodiments of the present invention, the bulk TMDCs that are subjected to processing pursuant to the present invention can include the TMDCs selected from the group consisting of the group 4 TMDCs (M=Ti, Zr, Hf), group 5 TMDCs (M=V, Nb, Ta) or group 6 TMDCs (M=Cr, Mo, W), group 7 TMDCs (M=Mn, Re), group 10 TMDCs (M=Pd, Pt)], group 11 TMDCs (Cu, Ag), group 12 TMDCs (Zn, Cd), group 13 TMDCs (e.g., M=In, Ga) as well as lanthanum group metals chalcogenides (Sc, Y, La, Ce, Pr, Nd, Sm, Eu, Gd, Tb, Dy, Ho, Er, Tm, Yb, Lu).

Practice of embodiments of the invention can produce mixed transition metal dichalcogenide materials that include two or more metals selected from the group consisting of metal is selected from the group consisting of Ti, Zr, Hf, Nb, Ta, Mo, W, Re, Pd, Pt, In, Ga and Cr and two or more chalcogen elements, namely, two or more of S, Se, and Te. Bulk layered chalcogenide materials that can be processed pursuant to the method embodiments can include, but are not limited to two or more bulk single-phase commercially available TMDCs as well as optional graphene, boron nitride, black phosphorus and other related layered materials that additionally and optionally may be incorporated into the composition of a final metal multi-chalcogenide composite product by exfoliation with the TMDCs wherein the composite structure is built-up of 2D exfoliated layers of the different materials.

Examples 1-3 describe illustrative embodiments involving solid-state mechanical processing which can be conducted using pestle and mortar, shaker ball mills of any configuration, planetary ball mills of any configurations, any type of laboratory or industrial grinders, or other milling, or grinding equipment that can produce plastic, shear and other irreversible deformation as well as partial or complete exfoliation of the bulk TMDCs to an extent that achieves the results described below. The mechanical processing can be conducted under an inert or non-reactive gas atmosphere and at any temperature including below room temperature, at room temperature, and/or at elevated temperatures above room temperature such as to 100-1500° C. for appropriate times such as including, but not limited to, 1 minute to 72 hours or longer. The mechanical processing can be followed by heat treatment at elevated temperatures above room temperature such as 100-1500° C. A TMDC having a disordered, heterogeneous-layered structure or ordered, single-phase structure can be produced depending upon processing temperature and processing time. The ordered, single-phase TMDC can be a substantially homogenous solid solution of two or more different TMDCs.

Examples 4-7 describe illustrative embodiments involving (1) mechanochemical exfoliation of two or more different TMDC materials in the same or different appropriate liquid environment using any exfoliation technique, step (2) subsequent generation of mixed hierarchical (layered) heterostructures, either by a spontaneous assembly in solution (e.g. mixing together of the dispersions formed in step (1)) or by using an additive assembly technique (e.g. layer-by-layer deposition, spin coating, ink jet printing etc. of the dispersions formed in step (1), and then step (3) reactive interlayer mixing and conversion of the hierarchical (layered) heterostructures obtained in step (2) into a single phase material, wherein reactive intermixing is effected by means of heat treatment, or mechanical working/processing, or high uniaxial external pressure, or a combination of external pressure and shear stress, or by cold or hot rolling or by combination of thereof. The invention envisions preparing a TMDC material using steps (1) to (3). The material so formed can include a mixed metal component.

In illustrative embodiments, the exfoliating step is conducted by mechanical processing in the same or different liquid(s) to form dispersion(s) and the combining step involves spontaneous self-assembly (e.g. by mixing the dispersions together) or additive assembly (e.g. layer-by-layer deposition, spin coating, ink jet printing, etc. of the dispersions) of the exfoliated products of the dispersions.

The intermediate 3D heterostructured TMDC material having hetero-layers (heterogeneous layers) can be converted to a single phase by subjecting the material to further processing including, but not limited to, thermal heat treatment (annealing), milling, grinding, cold or hot rolling, extrusion, high hydrostatic external pressure or combination thereof to obtain an ordered single-phase material.

Practice of illustrative method embodiments enables simple, inexpensive, and scalable way of industrial production of single-phase materials described above. The liquid media employed for the liquid-assisted embodiment described above can be selected from the list of inexpensive, mass-produced organic solvents (e.g. isopropanol and other alcohols).

The following Examples are offered to further illustrate embodiments of the invention without limiting the scope of method embodiments.

Preparation of Three and Four Principal Element (Mixed Metal) TMDCs by Solid-State Mechanical Exfoliation and Annealing:

Materials and Analytical Techniques.

Ultra-high purity Ar (Matheson, 99.999%), ultra-high purity He (Matheson, 99.999%), $MoS_2$ (Sigma-Alrdich, 99% purity), $WS_2$ (Sigma-Alrdich, 99% purity), $MoSe_2$ (Alfa Aesar, 99.9% purity), $WSe_2$ (Alfa Aesar, 99.8% purity), and $NbSe_2$ (Alfa Aesar, 99.8% purity) were used. As-received commercially available transition metal dichalcogenides, $MoS_2$, $WS_2$, $MoSe_2$, $WSe_2$ and $NbSe_2$, were used as starting materials without further purification. $TaS_2$ was prepared from Ta powder (99.99% purity) and S (Alfa Aesar, 99.9995% purity). In particular, $TaS_2$ was prepared by ball milling a nearly stoichiometric mixture of tantalum and sulfur (5% excess). The milling was performed for 4 hours in a Fritsch, Pulverisette 7 milling machine, then followed by heat treatment of the resulting powder in a quartz tube sealed under 0.75 bar pressure of high purity helium for 5 days.

Powder X-Ray Diffraction (XRD):

The measurements were carried out using a PANalytical X'PERT powder diffractometer with an Xcelerator detector in the 2θ range from 10° to 80° with 0.020 step size employing Cu-$K_{\alpha 1}$ radiation (λ=0.15406 nm).

Thermogravimetric Analysis (TGA):

TGA data were collected using Netzsch Luxx STA 409 PG. About 10 mg of the investigated materials were placed in alumina crucibles and heated up under argon from room temperature to 1450° C. with a ramping rate of 10° C./min.

HAADF-STEM and STEM-EDS Measurements:

TEM experiments were performed on a Titan Themis (FEI) probe Cs-corrected TEM. High-resolution HAADF-STEM images were collected by the convergence semi-angle of 18 mrad and a collection semi-angle of 99-200 mrad at 200 kV. STEM-EDS analysis was carried out using a Super-X EDS detector attached to the Titan Themis. Focused Ion Beam (FIB) cross-sectioning was performed on a Helios Nanolab G3 UC dual-beam instrument (FEI). A liftout for TEM was carried out using standard in-situ TEM liftout procedures by means of the EZLift micromanipulator and Multi-Chem gas injection system [38, 39]. For the FIB cross-sectioning, a large agglomerate of particles was selected and covered with a protective layer of carbon that prevented the sputtering of the top surface of the sample during the experiment. Next, a trench was sputtered from both sides of the particle, resulting in a rectangular shape specimen, which afterwards was attached to a tungsten needle and thinned to electron transparency.

Raman Spectroscopy: Powdered samples were spread on glass cover slips and analysed with a Horiba XploRA Raman microscope (HORIBA Scientific, Edison, N.J.) using 532-nm excitation (8.3·10³ W/cm²) and a 100×(0.90 NA) objective. The detector was a front-illuminated Horiba Synapse EMCCD camera, and the acquisition time was 60 seconds. For each sample, the displayed spectrum was an average of 10 locations.

High-Resolution X-Ray Photoelectron Spectra (XPS):

Measurements were carried out for compositional analysis. A few milligrams of powder samples were mounted on a double-sided Scotch tape. XPS spectra for S 2p, Se 3d, Mo 3d and W 4f were acquired using physical electronic 5500 multi technique system with an Al-$K_\alpha$ source. To compensate the charging effects, the binding energies of all peaks were corrected using standard carbon peak at 285 eV.

Example 1.—$MoS_2$—$WS_2$ System

In a typical experiment, a total 1 g of the stoichiometric mixture of $MoS_2$ powder and $WS_2$ powder in the 1:1 molar ratio was transferred to a milling container together with eight 12 mm stainless steel balls (about 7 g each) so that ball-to-sample ratio was close to 56:1. After sealing the container under argon, ball milling was carried out for various time intervals at 600 rpm in a horizontal planetary mill Fritsch, Pulverisette 7. To facilitate the uniform milling and prevent caking of the powder during the processing, the milling mode was alternated between forward and reverse (30 min each) with an intermittent pause of 5 min. To investigate the effect of milling regime, the same amount of the sample was also processed in a high-energy mixer mill (SPEX, 8000M mill) in a stainless steel container with two 12.7 mm and four 6.35 mm grinding balls (ball-to-sample ratio=18:1). Ball milled powders were characterized using powder X-ray diffraction (XRD), differential scanning calorimetry and the thermogravimetric analysis (DSC/TGA), Raman spectroscopy, high-angle annular dark-field scanning transmission electron microscopy (HAADF-STEM), scanning transmission electron microscopy energy dispersive spectrometry (STEM-EDS), scanning electron microscopy (SEM), scanning electron microscopy energy dispersive spectrometry (SEM-EDS) and scanning and transmission electron microscopies (SEM and TEM) as appropriate. In each example, milling was conducted at ambient temperature.

Figure 1B:
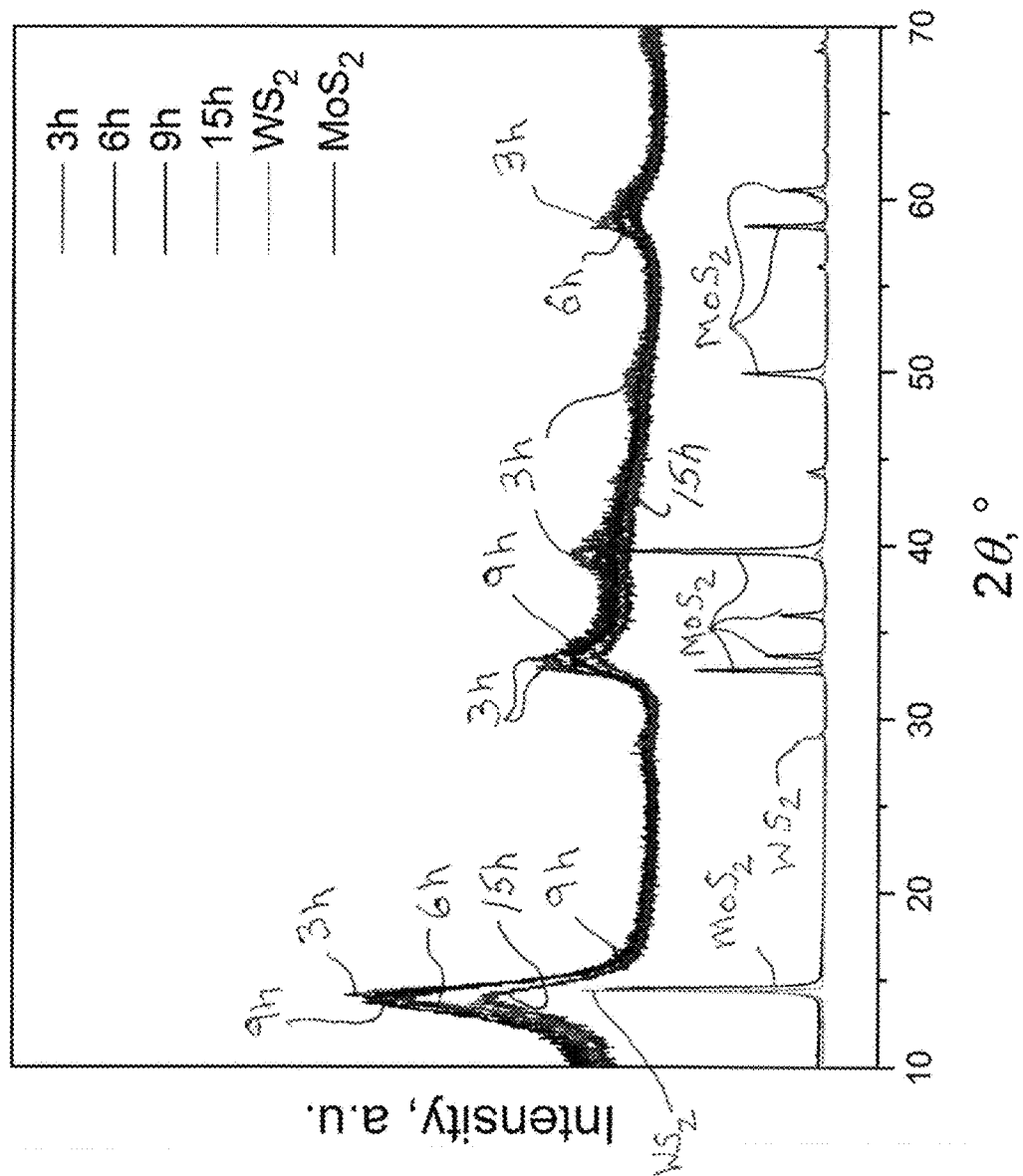

XRD for the samples processed for different periods of time in planetary and mixer mills are shown in FIGS. 1a and 1b, respectively. Due to identical crystal structure and very close cell parameters for $MoS_2$ and $WS_2$, no shift in the Bragg peak positions could be observed even after a prolonged milling. However, strong peak broadening that becomes more apparent with the increasing milling time, which is a typical signature of disordering in the sample is clearly observed.

Figure 2A:
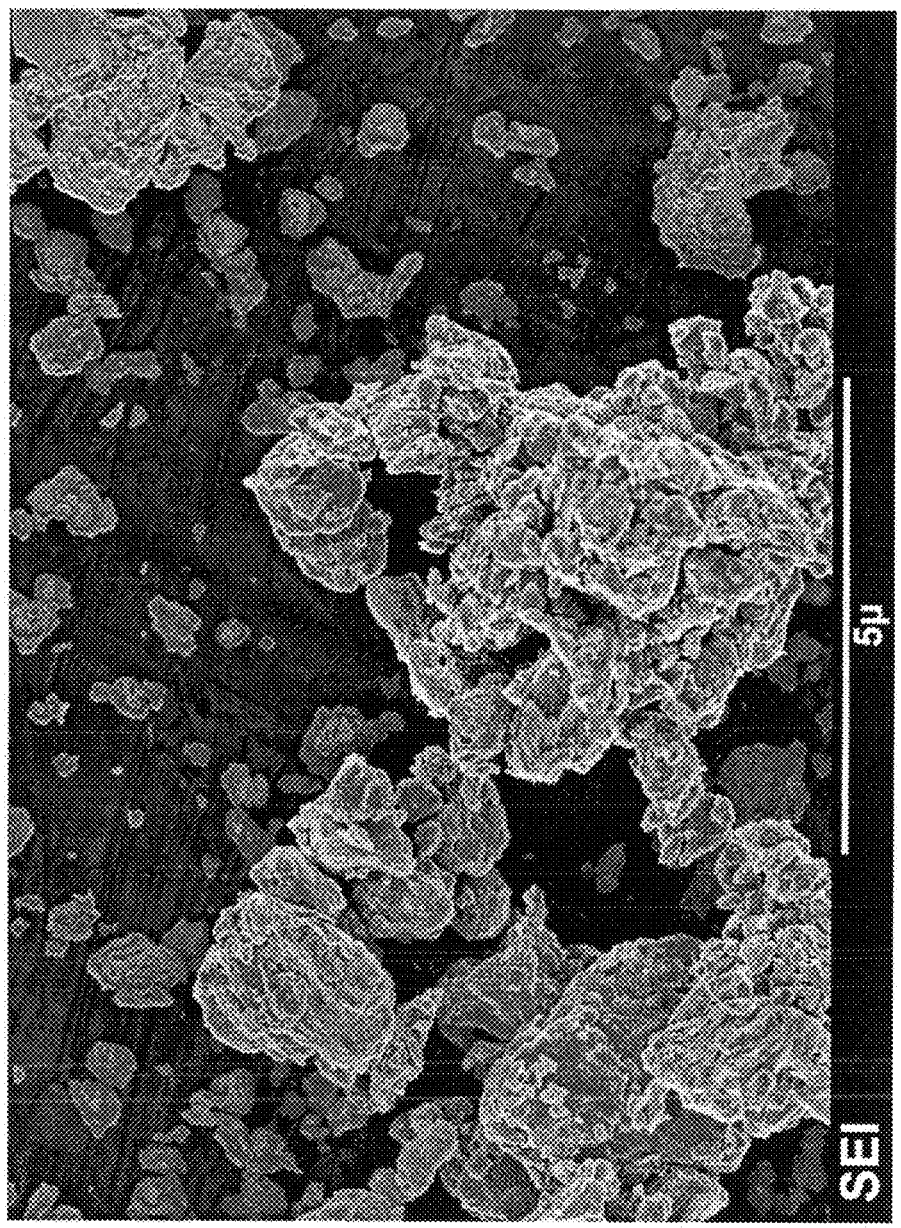
FIGS. 2a-2d are SEM secondary (SEI) and backscattering (BEI) images of the 1:1 (molar) $MoS_2$ and $WS_2$ samples milled for 15 hours in the planetary mill (FIGS. 2a, 2c) and the mixer mill (FIGS. 2b, 2d).
Figure 2B:
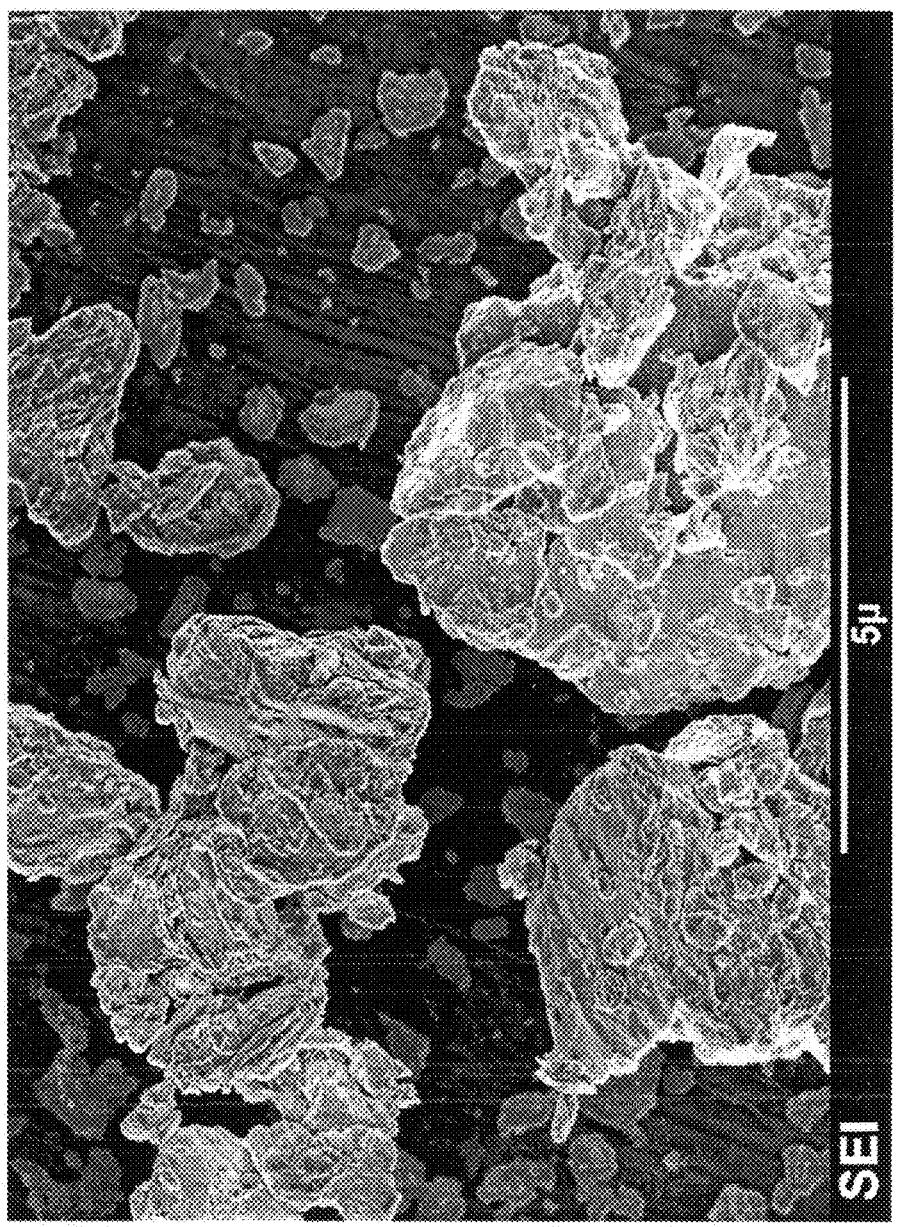
Figure 2C:
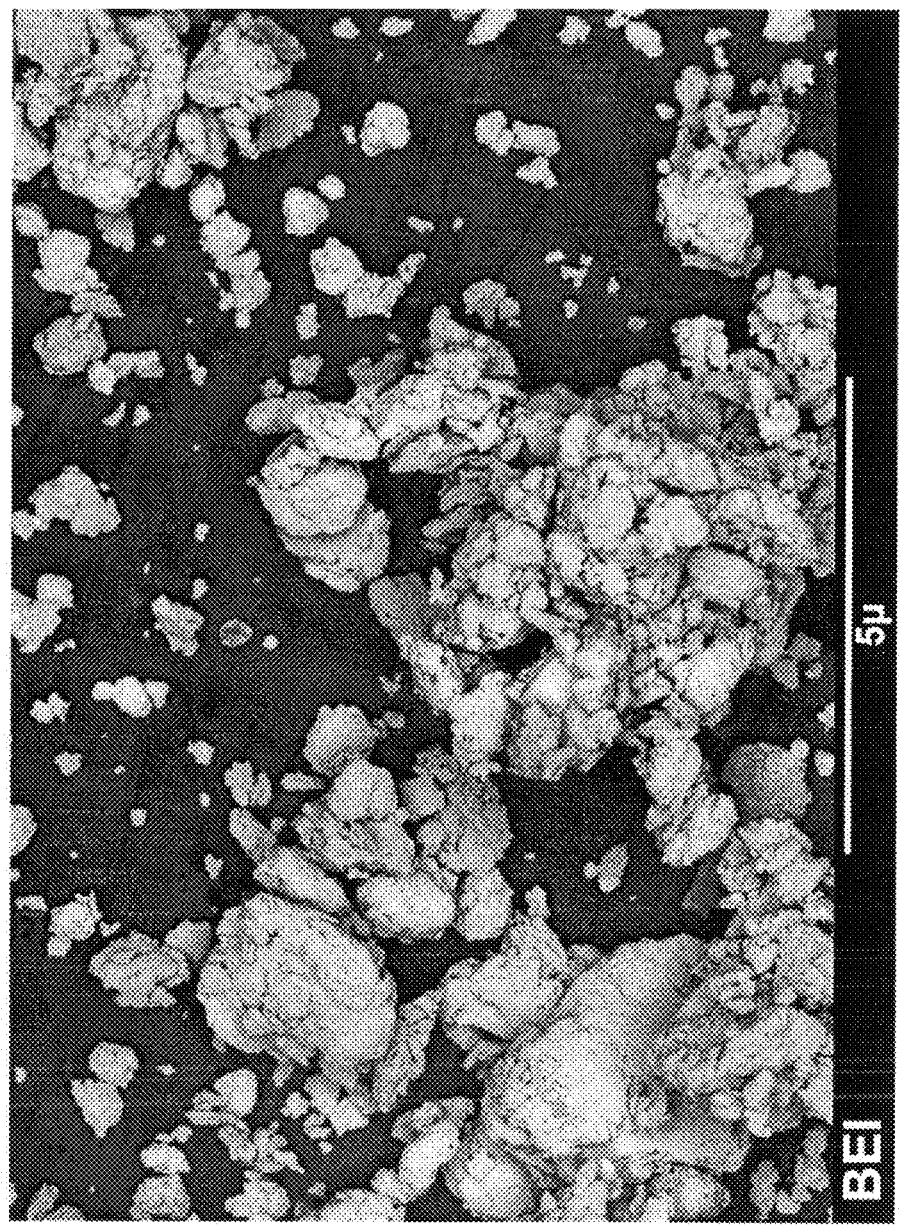
Figure 2D:
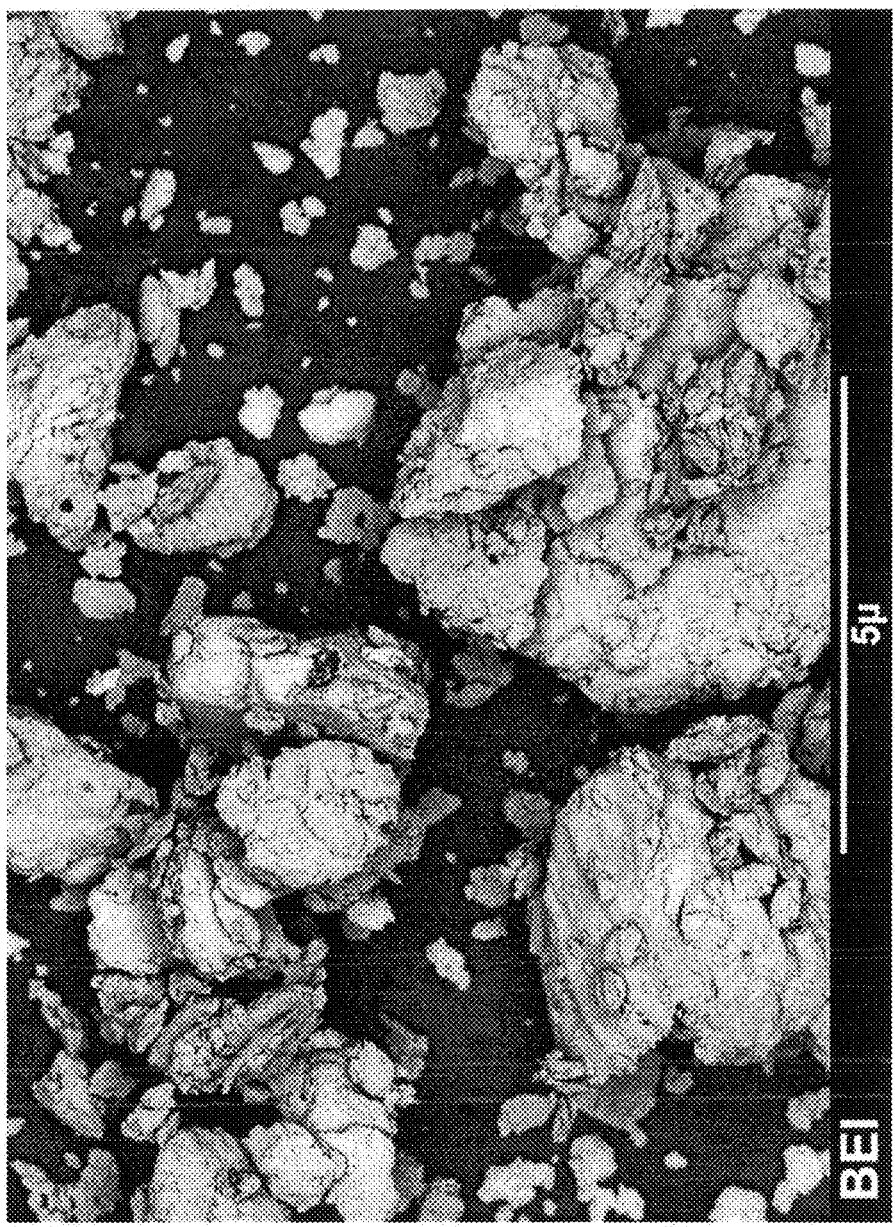

SEM evaluation of two samples milled for 15 hours in the planetary mill and the mixer mill are shown in FIG. 2a, 2b. They revealed particle agglomeration on a microscopic scale. The particle morphology is highly irregular, with a broad particle size distribution. The distribution of constituting elements within the particles was analyzed using the backscattering electron imaging (BEI) combined with EDS. Backscattering analysis suggests uniform composition; i.e. no separate particles or regions of high concentrations of $MoS_2$ or $WS_2$ were present (FIG. 2c, 2d). Both samples on the micrometer-size scale appeared homogeneous.

Figure 3:
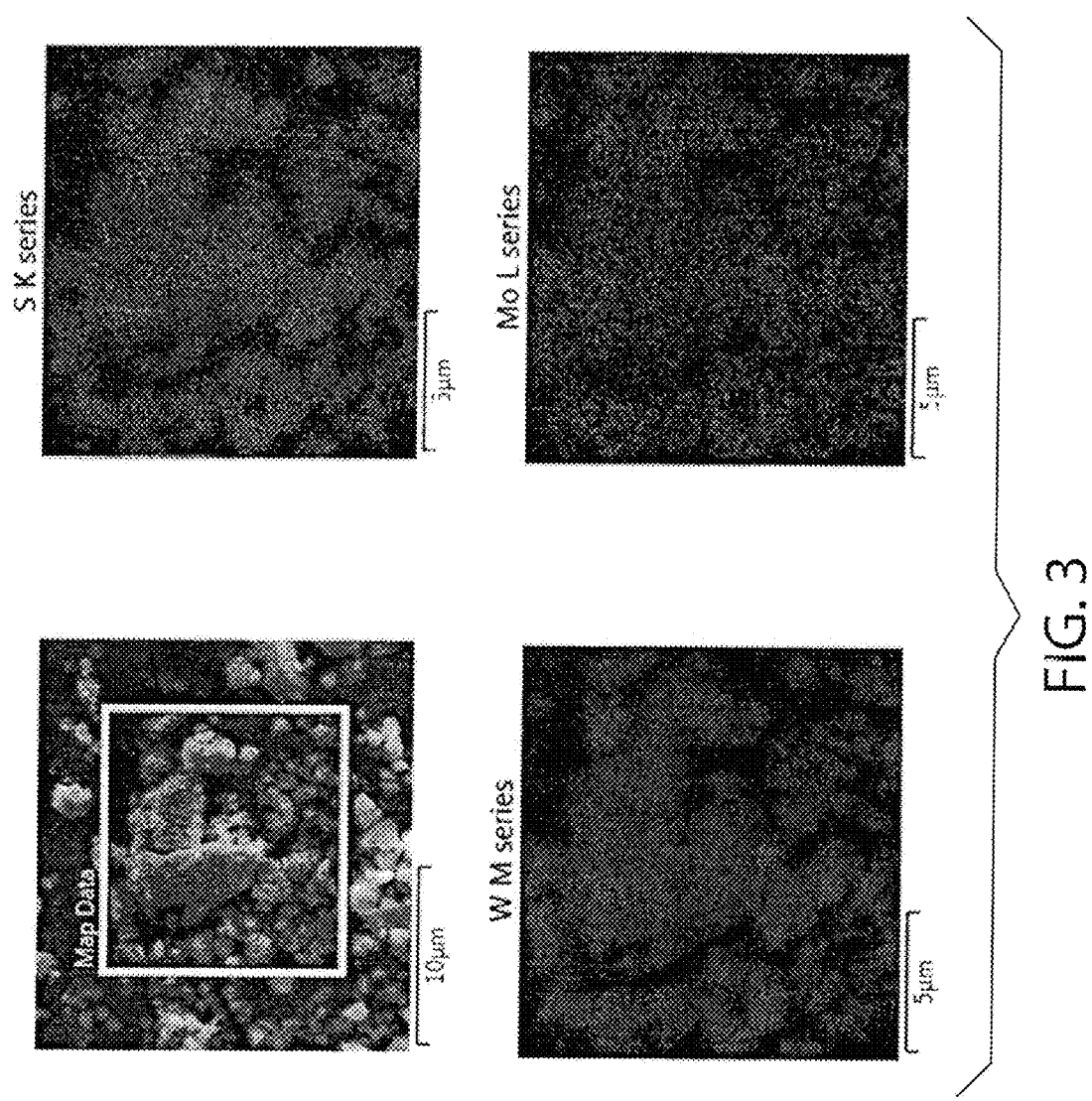
FIG. 3 shows EDS elemental mapping of the 1:1 (molar) $MoS_2$ and $WS_2$ sample milled in the planetary mill for 15 hours where view "a" shows the analyzed area, view "b" shows sulfur distribution, view "c" shows tungsten distribution, and view "d" shows molybdenum distribution.

Analysis by SEM-EDS showed the characteristic peaks for tungsten, molybdenum, sulfur and carbon. The latter coming from the sample holder grid. As can be seen in FIG. 3, SEM-EDS confirms an even distribution of W, Mo, and S throughout the particle(s). Unfortunately, some overlapping peaks of S K- and Mo L-series in the SEM-EDS spectrum made the analysis qualitative. Therefore, the signal coming from W appears to be stronger compared to Mo. Similar results were obtained for the samples processed in the mixer mill (not shown).

Figure 4A:
FIGS. 4a and 4b are TEM images of the 1:1 (molar) $MoS_2$ and $WS_2$ samples milled for 15 hours in the planetary mill (FIG. 4a) and the mixer mill (FIG. 4b).
Figure 4B:
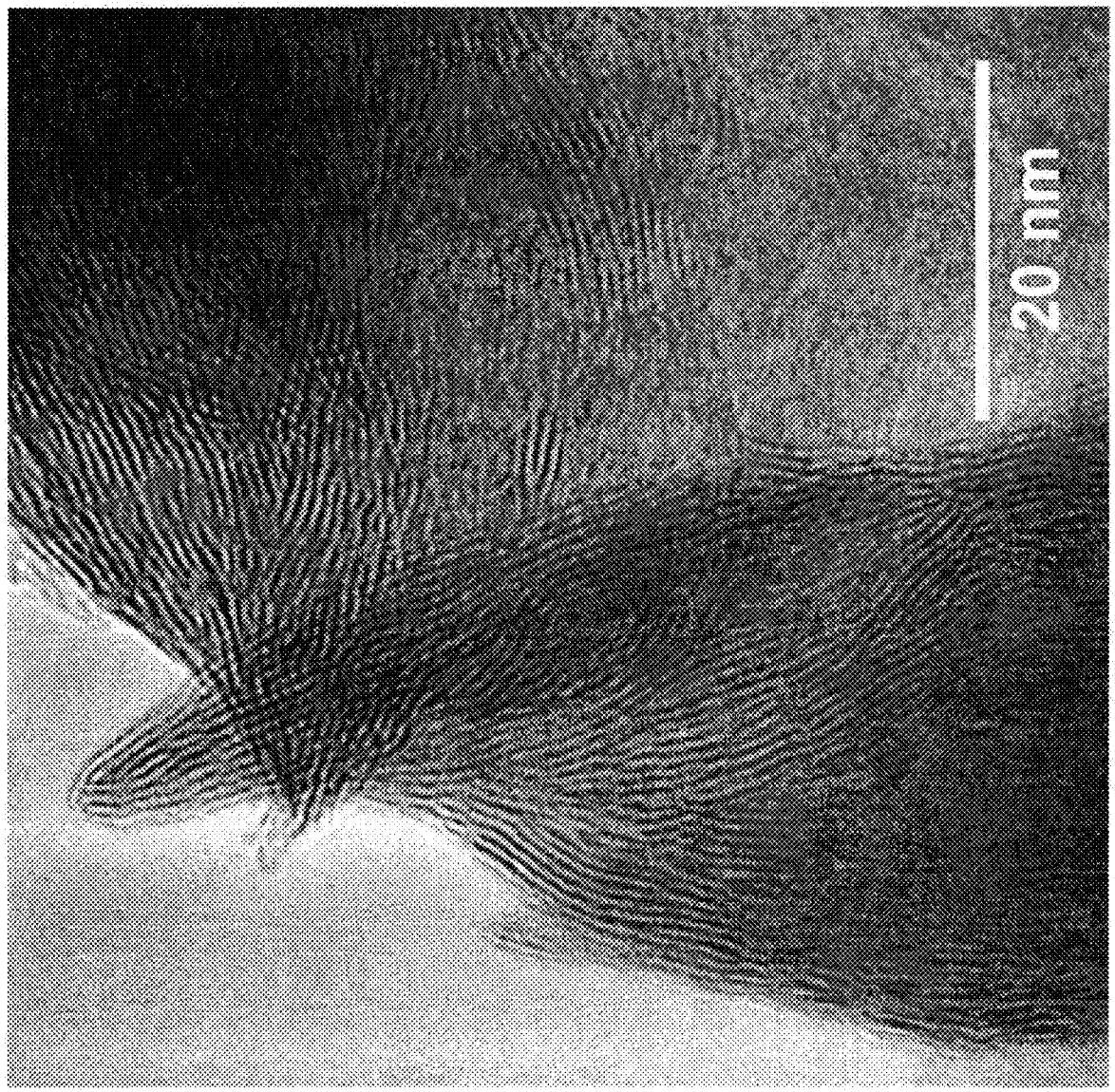

For samples processed either in the planetary or mixer mills, TEM (FIG. 4a, 4b) reveals disordered layered structures, which are consistent with the broadening of Bragg peaks in their XRD patterns (FIGS. 1a, 1b). Again, the uniform layer spacing of about 0.6 nm, characteristic for both $MoS_2$ and $WS_2$ (002) basal plane, cannot be indicative of a solid solution or layered hetero-structures due to the similarity of the $MoS_2$ and $WS_2$ cell parameters.

Figure 5A:
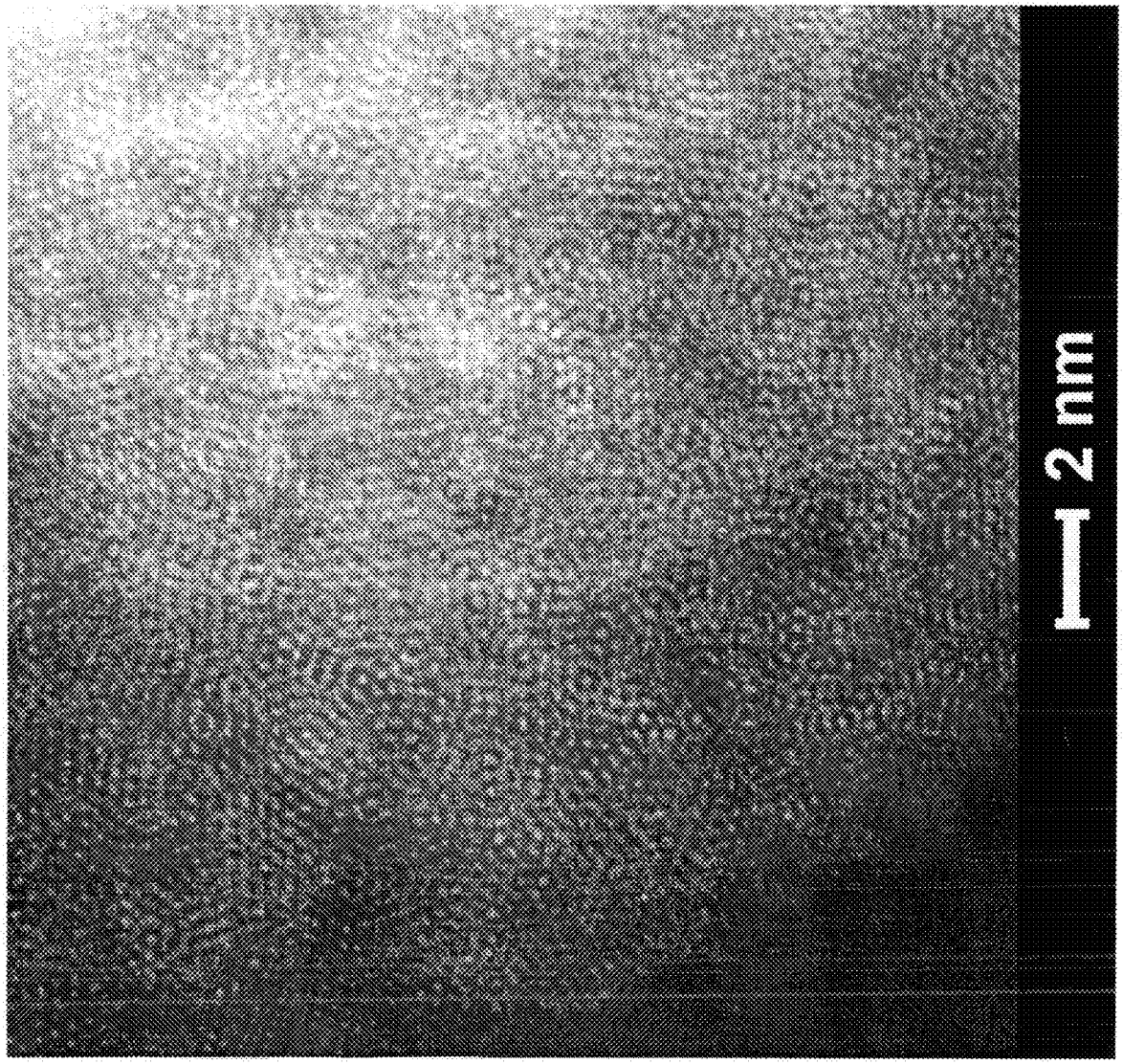
FIGS. 5a and 5b are HAADF-TEM images of the 1:1 (molar) $MoS_2$ and $WS_2$ samples milled for 15 hours in the planetary mill (FIG. 5a) and the mixer mill (FIG. 5b). HAADF-TEM is high-angle annular dark-filed transmission electron microscopy.
Figure 5B:
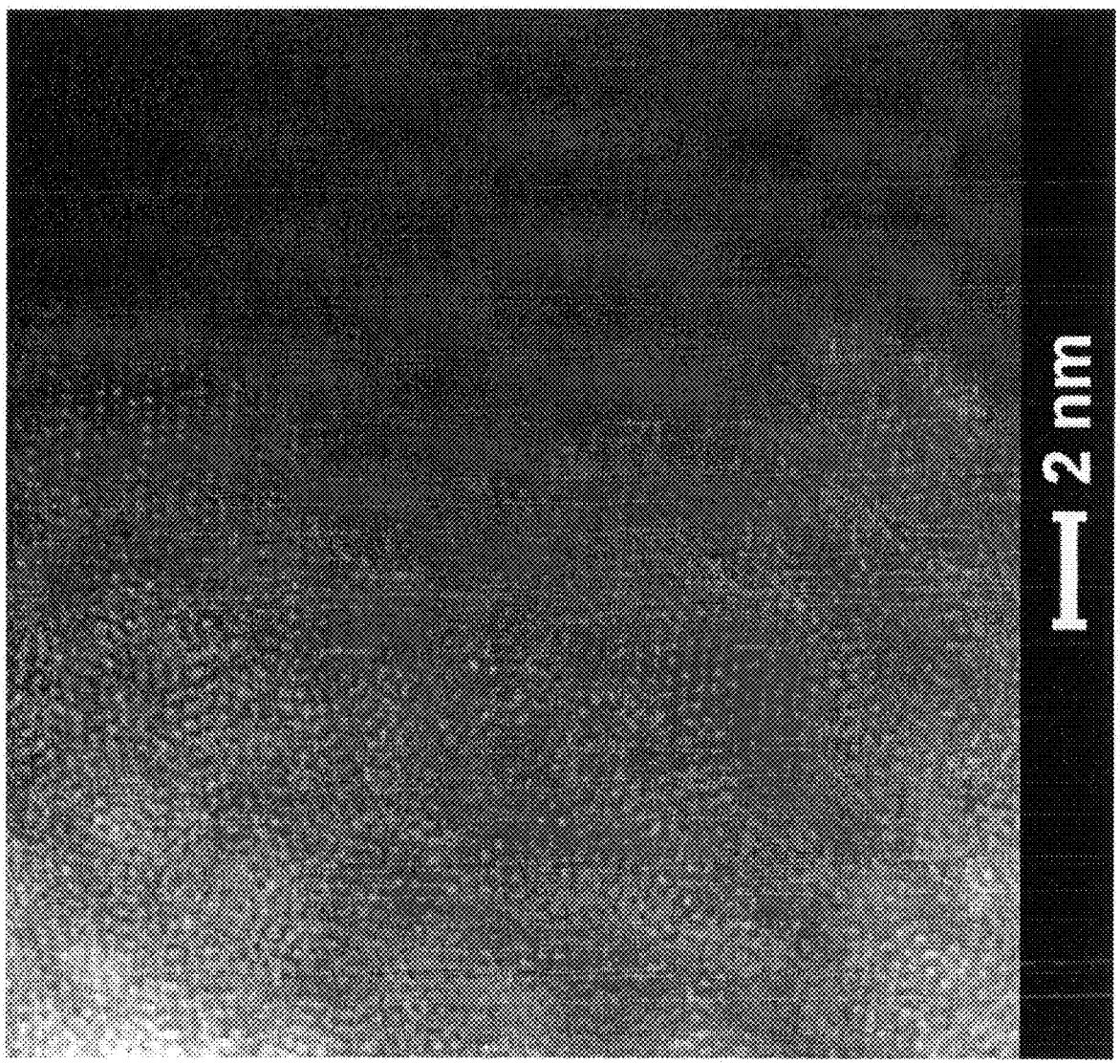

The HAADF-STEM studies confirm disordering in both milled samples (FIG. 5a, 5b). The images clearly show high degrees of distortion and poor crystallinity of the as-milled materials. The Z-dependence visualizes W-rich sites as white to light-grey zones, and Mo-rich—as grey to dark-grey zones. Based on the Z-contrast images, in both cases a solid solution of $MoS_2$ and $WS_2$ may be suggested.

Figure 6:
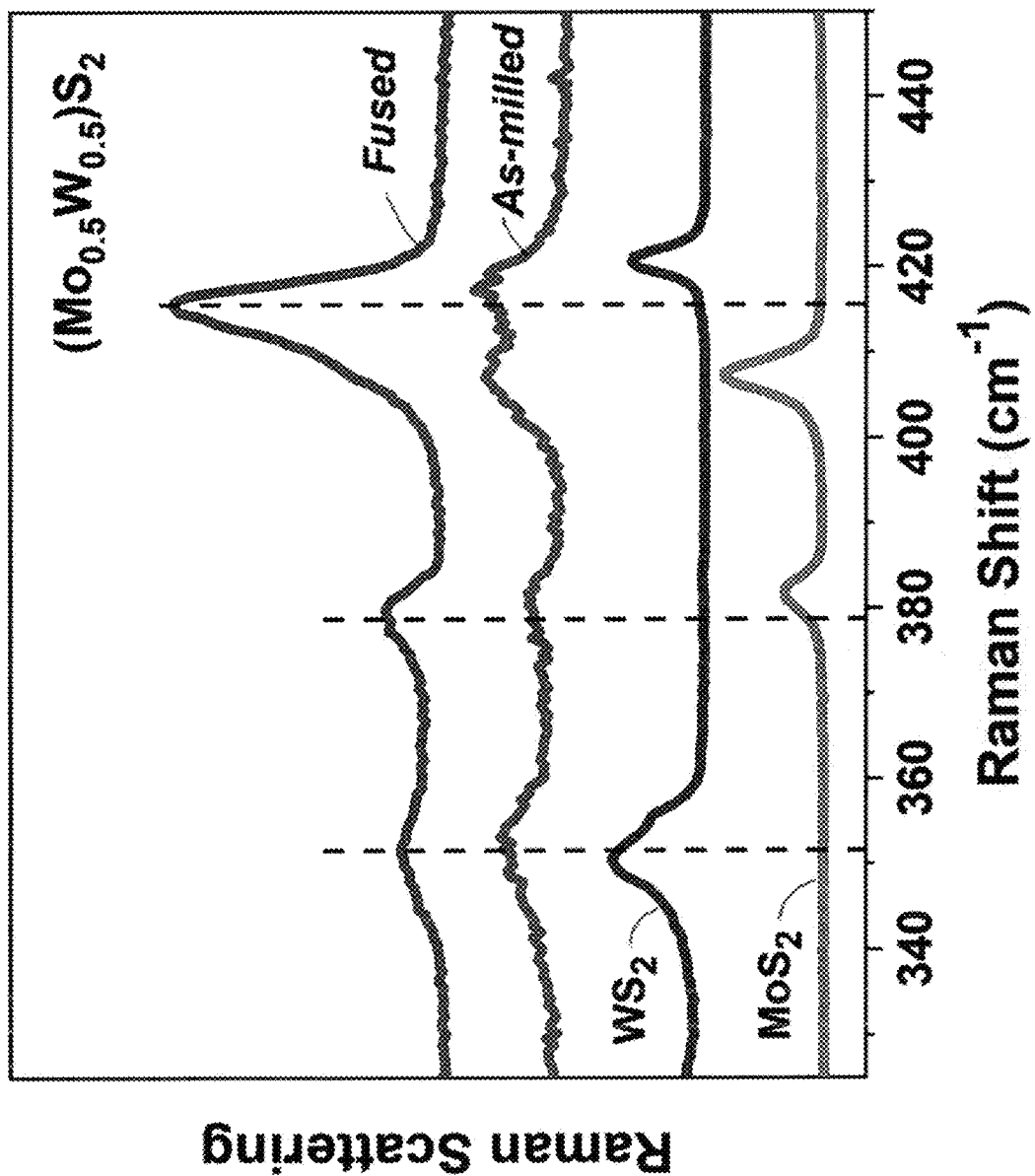
FIG. 6 shows Raman spectra of the 1:1 (molar) $MoS_2$ and $WS_2$ samples milled for 15 hours in the planetary mill (curve a) and in the mixer mill (curve b).

However, the Raman spectrum of the sample (FIG. 6) does not agree with that published for a single-phase $(Mo_{1-x}W_x)S_2$ [40] On the contrary, it contains a set of broad peaks at 352, 380, 407 and 418 $cm^{-1}$ that resemble those of the individual $MoS_2$ and $WS_2$ phases in laminar $MoS_2/WS_2$ heterostructures. [41] Annealing the ball-milled powders at 1000° C. for 16 hours under helium produces a fused single-phase material, whose Raman spectrum (FIG. 6) matches that of $(Mo_{0.5}W_{0.5})S_2$.

Figure 7:
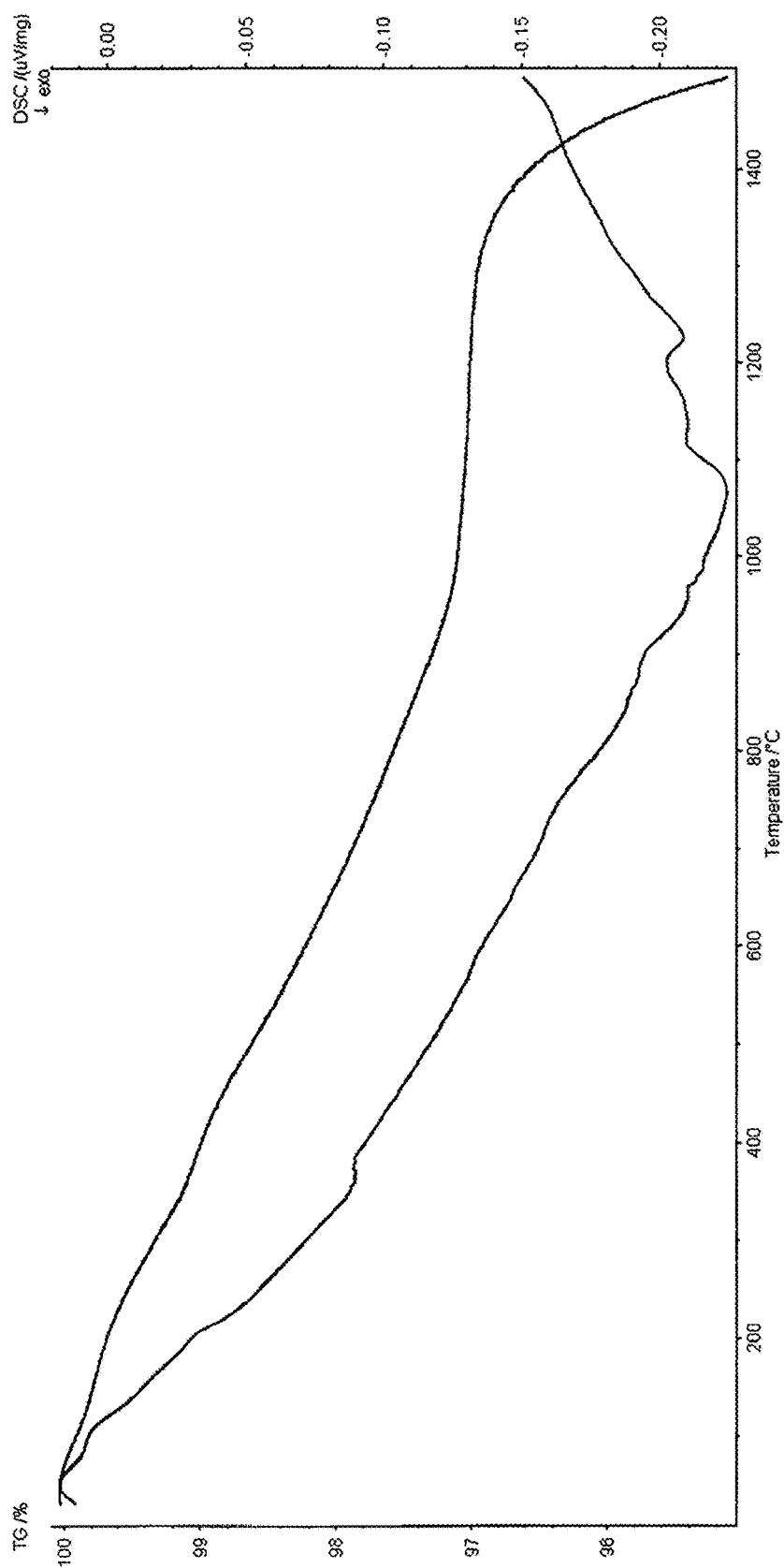
FIG. 7 is the DSC/TGA curve of the 1:1 (molar) $MoS_2$ and $WS_2$ samples milled for 15 hours in the planetary mill.

In order to obtain a crystalline material, the sample milled in a planetary ball mill for 15 hours was heat treated at 950 degrees C. The annealing temperature of 950 degrees C. was selected based on the results of DCS/TGA analysis for pure binary TMDCs (FIG. 7) and analytical data published in open literature. At ambient pressure, bulk $MoS_2$, $WS_2$ and $WSe_2$ are fairly stable up to ~1100 degrees C., but they slowly release chalcogens between 800-1000 degrees C. in high vacuum [42,43]. This suggests that all three binary TMDCs are approaching the edge of their stability at T~950-1000 degrees C., where mobile reactive $\{MX_Y\}$ species formed can drive their chemical conversion.

Figure 8:
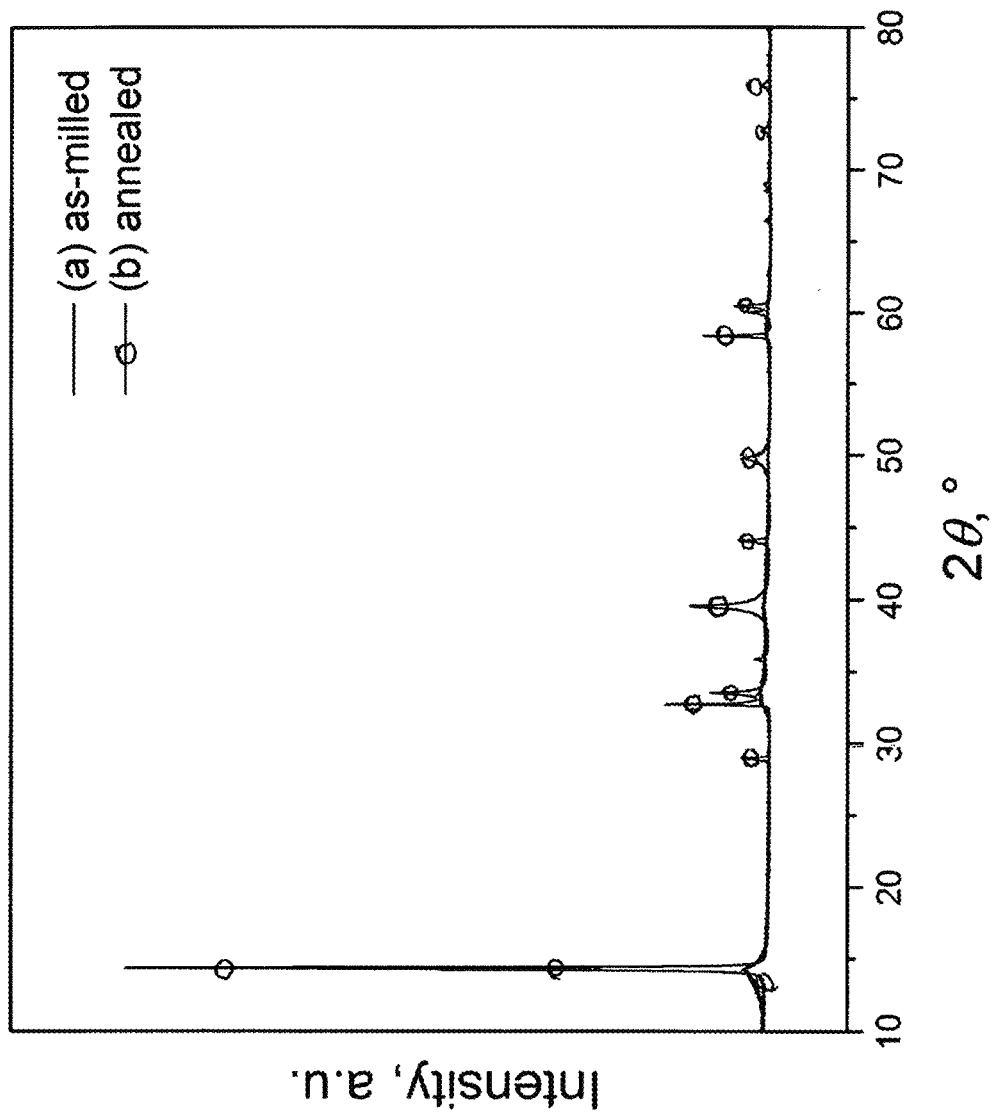
FIG. 8 shows powder X-ray diffraction patterns of the 1:1 (molar) mixture of $MoS_2$ and $WS_2$ milled for 15 hours in a planetary mill (curve a—as-milled) and then heat treated at 950 degrees C. in argon for 16 hours (curve b—annealed).
Figure 9A:
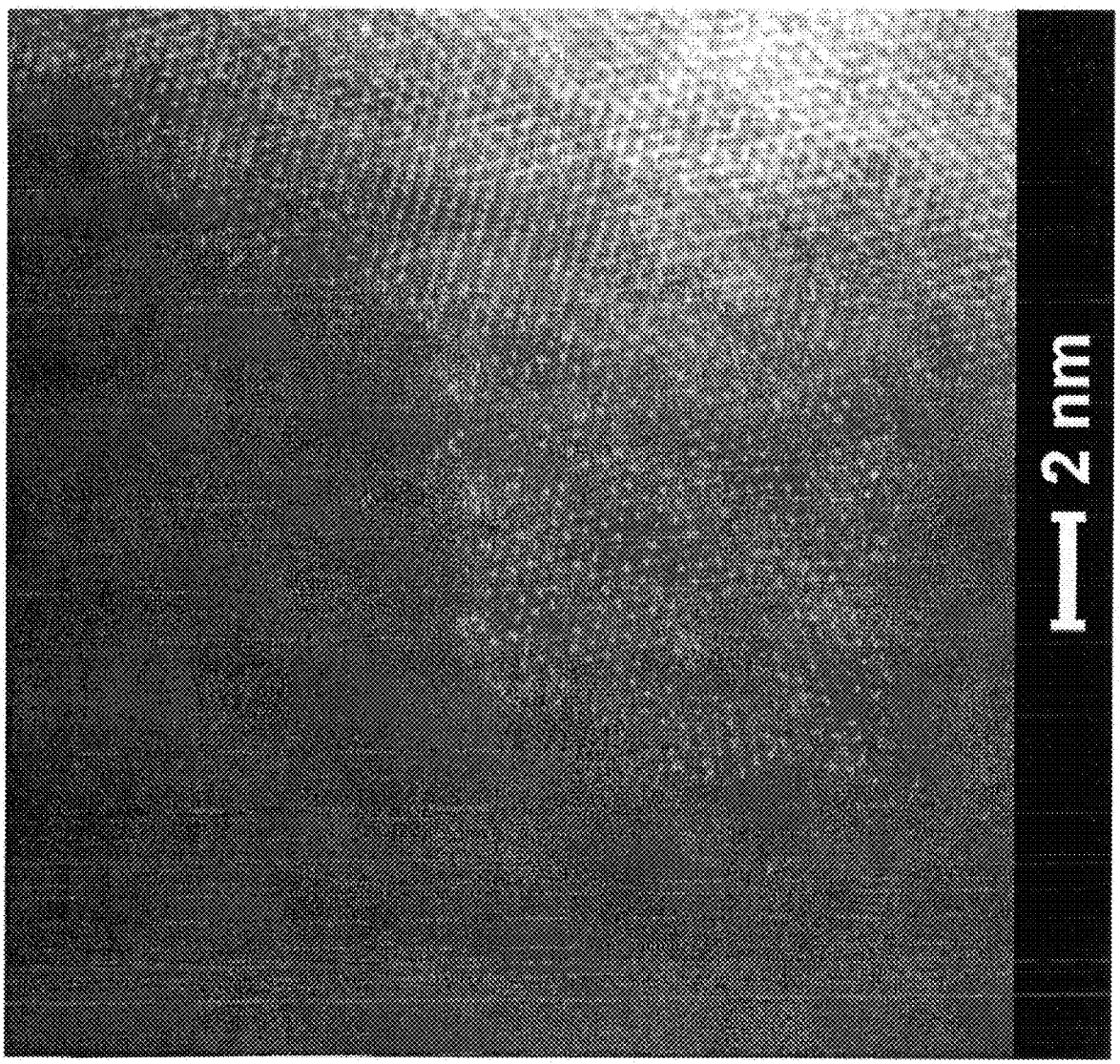
FIGS. 9a and 9b are HAADF-TEM images of the 1:1 (molar) $MoS_2$ and $WS_2$ samples milled for 15 hours in the planetary mill and then heat treated at 950 degrees C. in argon for 16 hours.
Figure 9B:
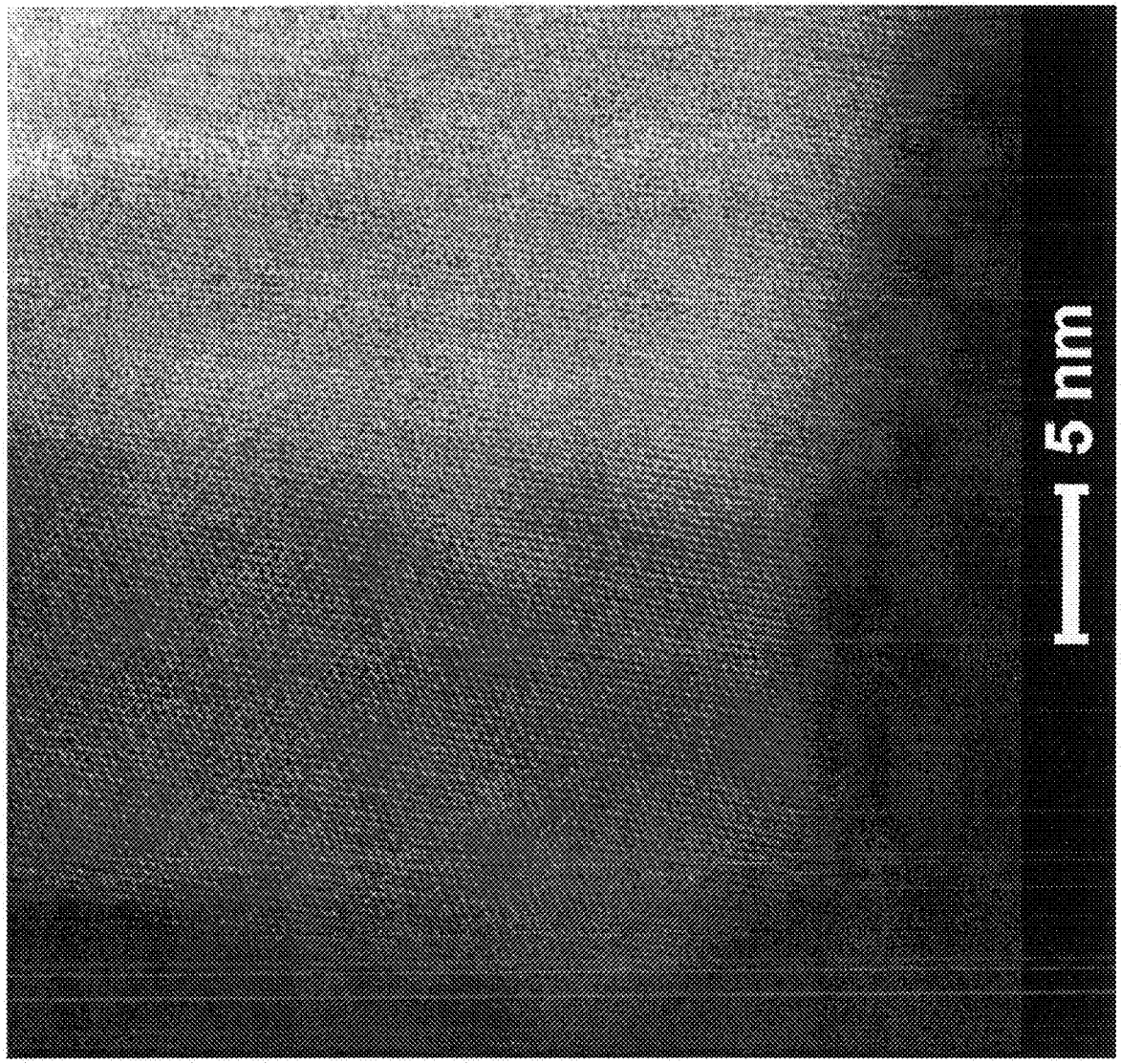

The powder XRD pattern of the material heat treated for 16 hours in an argon atmosphere consisted of sharp crystalline peaks (FIG. 8). Significantly improved crystallinity of the material was also confirmed by the HAADF-STEM measurements (FIGS. 9a, 9b). The heat treated sample consists of a 2H polymorph. Both HAADF- and EDS-STEM indicated a uniform distribution of Mo and W throughout the lattice.

Example 2.—$MoSe_2$—$WS_2$ and $MoS_2$—$WSe_2$ Systems

Figure 10A:
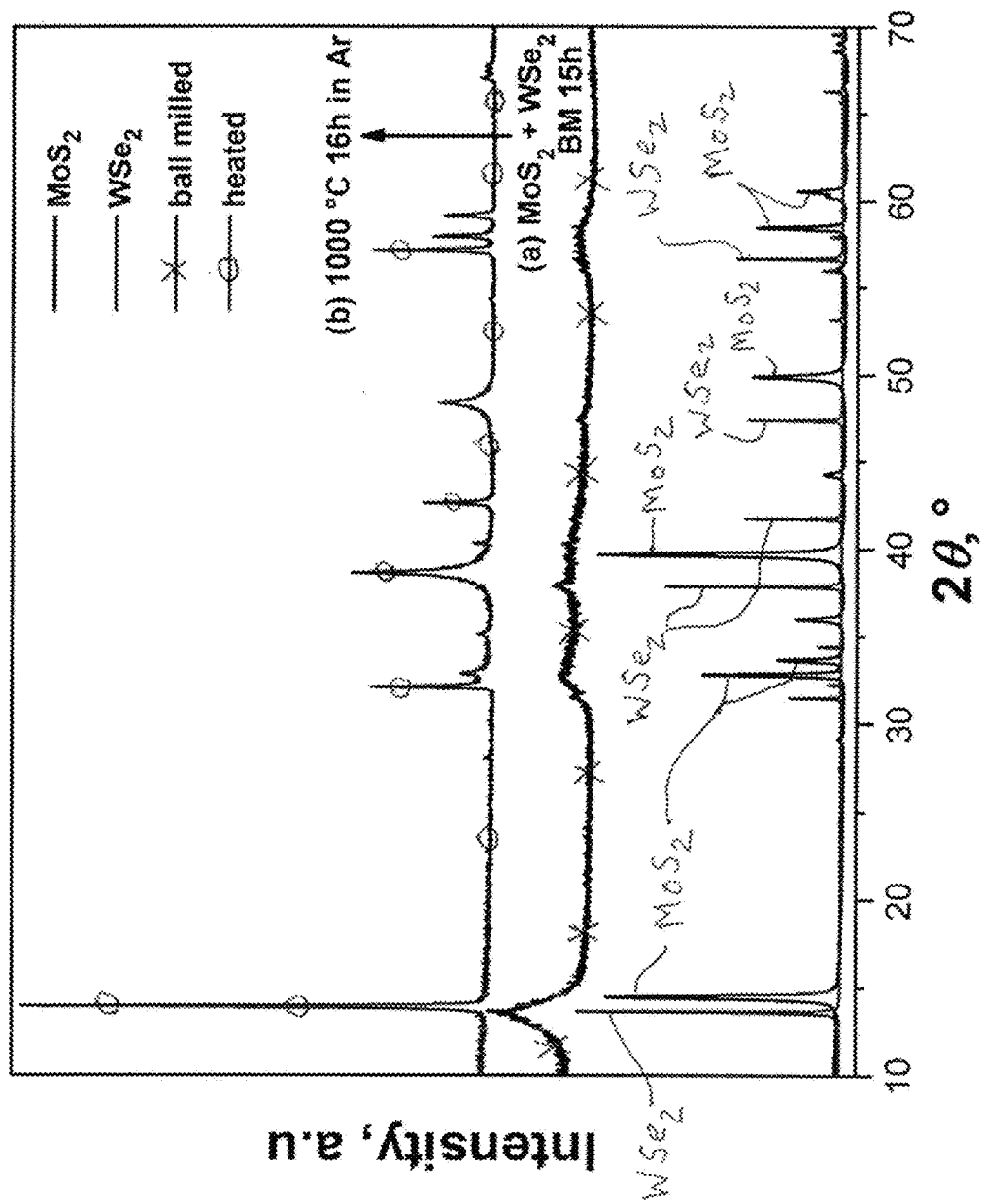
FIGS. 10a and 10b are powder X-ray diffraction patterns of the 1:1 (molar) mixture of $MoS_2$ and $WSe_2$ (FIG. 10a) and $MoSe_2$ and $WS_2$ (FIG. 10b). Both materials were ball milled for 15 hours in a planetary mill and then heat treated at 1000 degrees C. in argon for 16 hours.
Figure 10B:
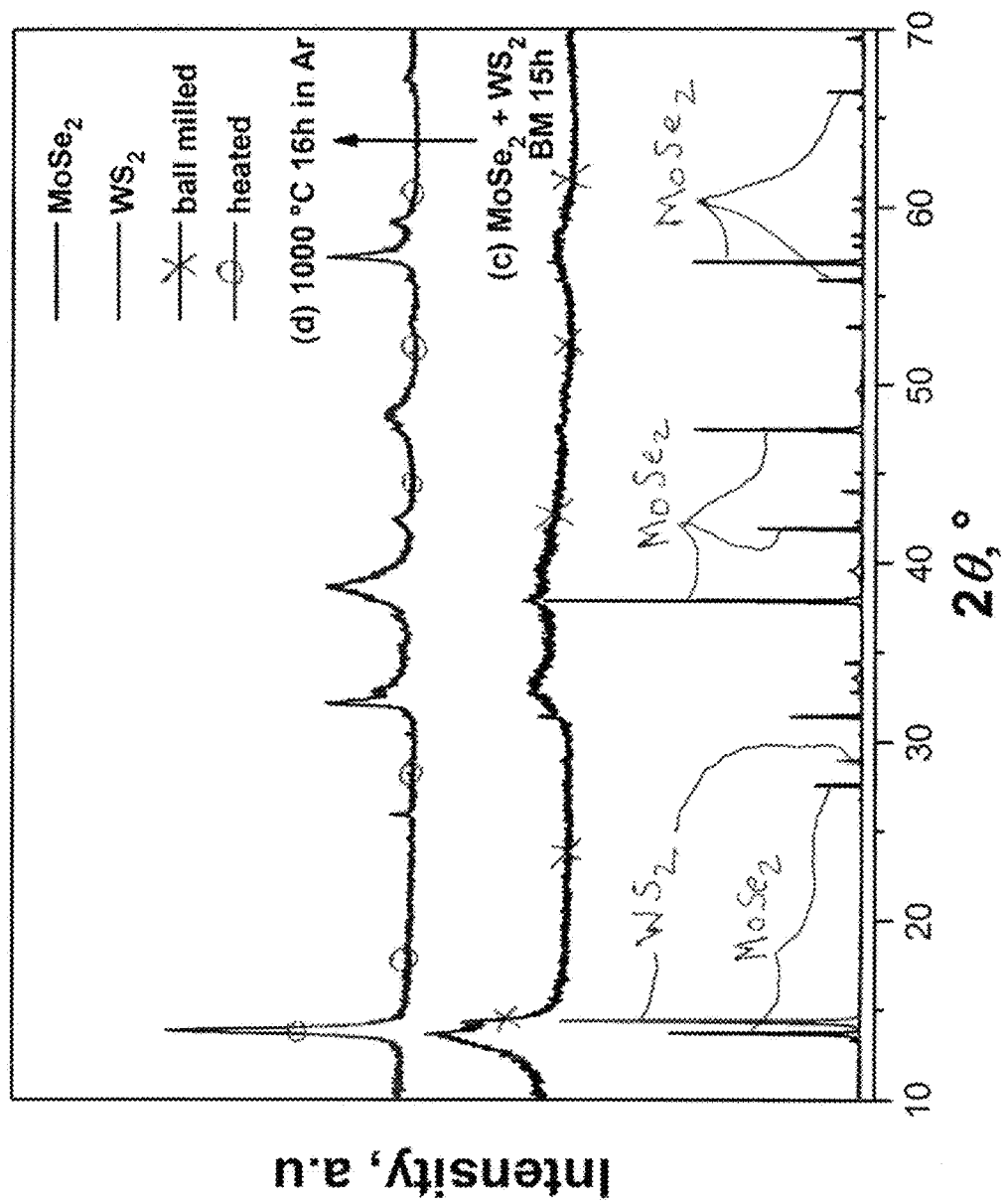

Processing of both $MoS_2$—$WSe_2$ and $MoSe_2$—$WS_2$ systems was performed in a planetary mill. For this purpose, 2 g of corresponding equimolar mixture was ball milled at 600 rpm in a planetary mill for 30 hours with eight 12 mm stainless steel balls. The XRD traces of the samples obtained (FIGS. 10a, 10b) showed a significant Bragg peak broadening indicative of disordering in the starting materials. Partially incomplete homogenization of the as-milled samples can be concluded from the enhanced Bragg scattering corresponding to the individual chalcogenides. The 1:1 (molar) $MoS_2$—$WSe_2$ is clearly more homogeneous when compared to the 1:1 (molar) $MoSe_2$—$WS_2$ system.

After the heat treatment at 1000 degrees C. for 16 hours in argon, both of the investigated materials crystalized into mixed TMDC systems with characteristic Bragg peaks (FIG. 10a for $MoS_2$—$WSe_2$ and FIG. 10b for $MoSe_2$—$WS_2$) that correspond to $Mo_{0.5}W_{0.5}S_{0.5}Se_{0.5}$. In the case of $MoSe_2$—$WS_2$ system, both the formation of the solid solution and the crystallization were incomplete as evidenced by the high-angle shoulder of the Bragg peak at $2\theta \approx 15$ degrees and overall broader Bragg peaks when compared to the $MoS_2$—$WSe_2$ sample.

Figure 11:
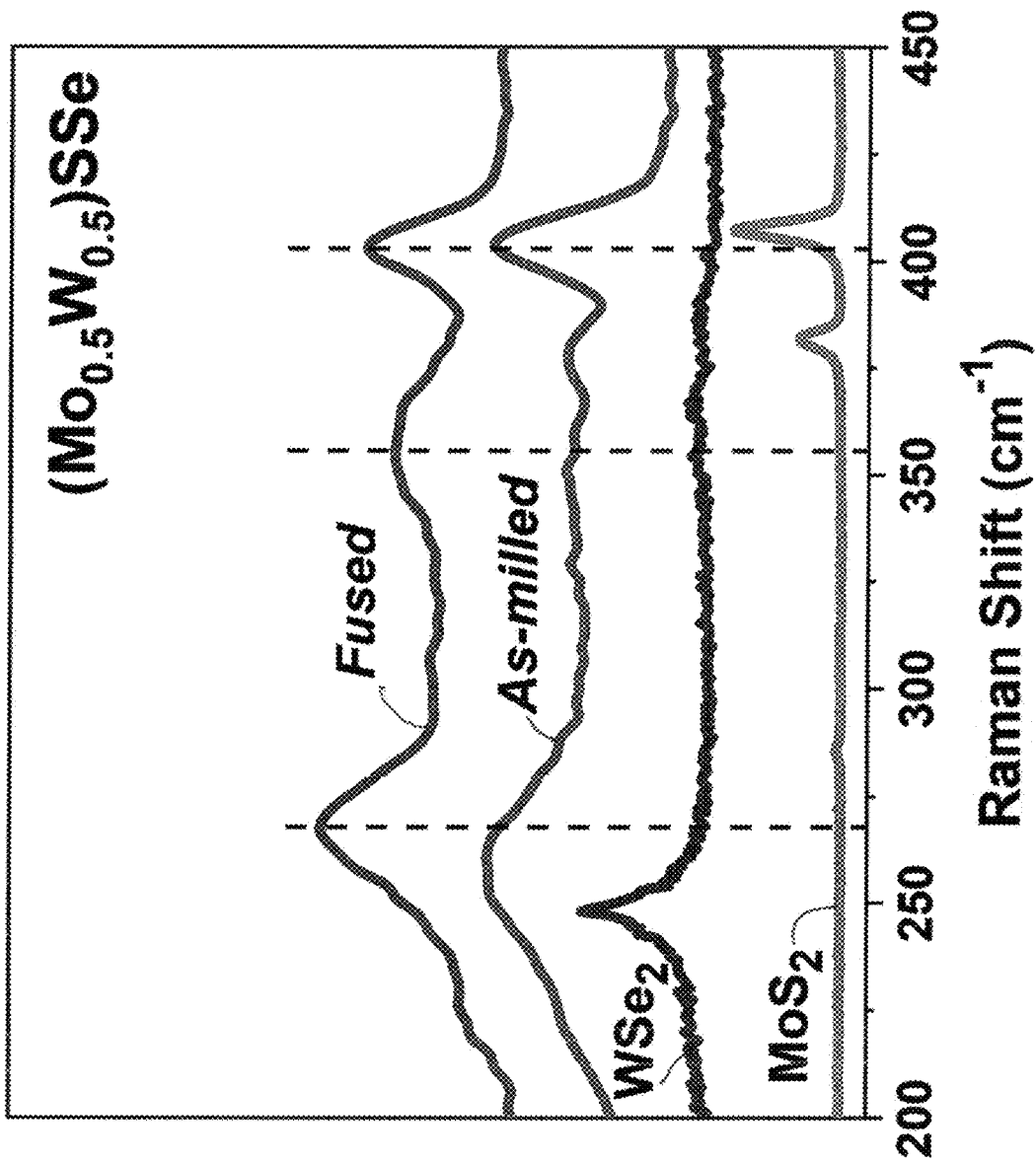
FIG. 11 is Raman spectra of the 1:1 (molar) $MoS_2$—$WSe_2$ samples milled for 30 hours in the planetary mill and then heat treated at 1000 degrees C. in argon for 16 hours.
Figure 12:
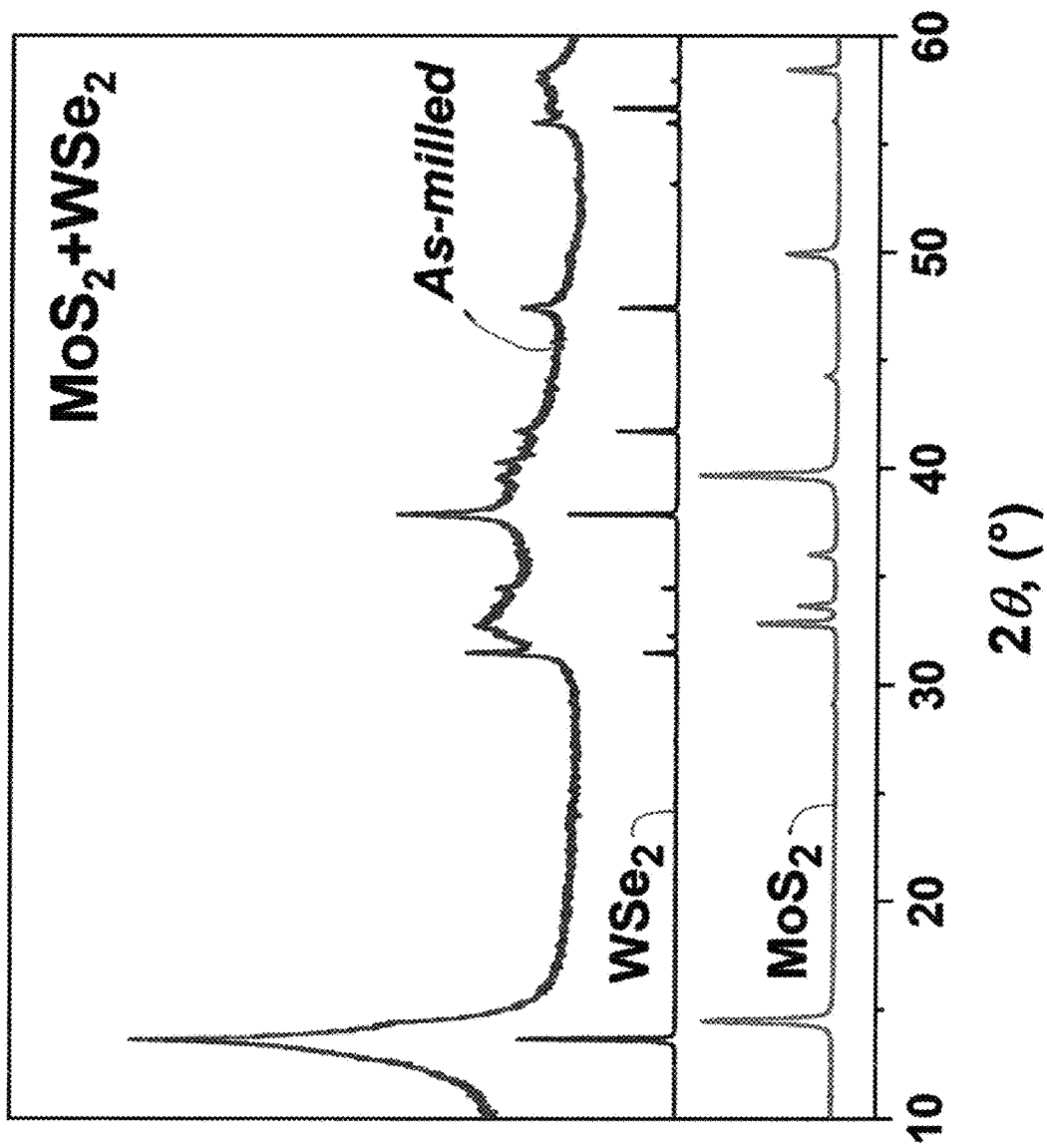
FIG. 12 shows powder X-ray diffraction patterns of the starting $MoS_2$ and $WSe_2$, and the 1:1 (molar) $MoS_2$—$WSe_2$ sample milled for 30 hours in a planetary mill at 600 rpm.
Figure 13:
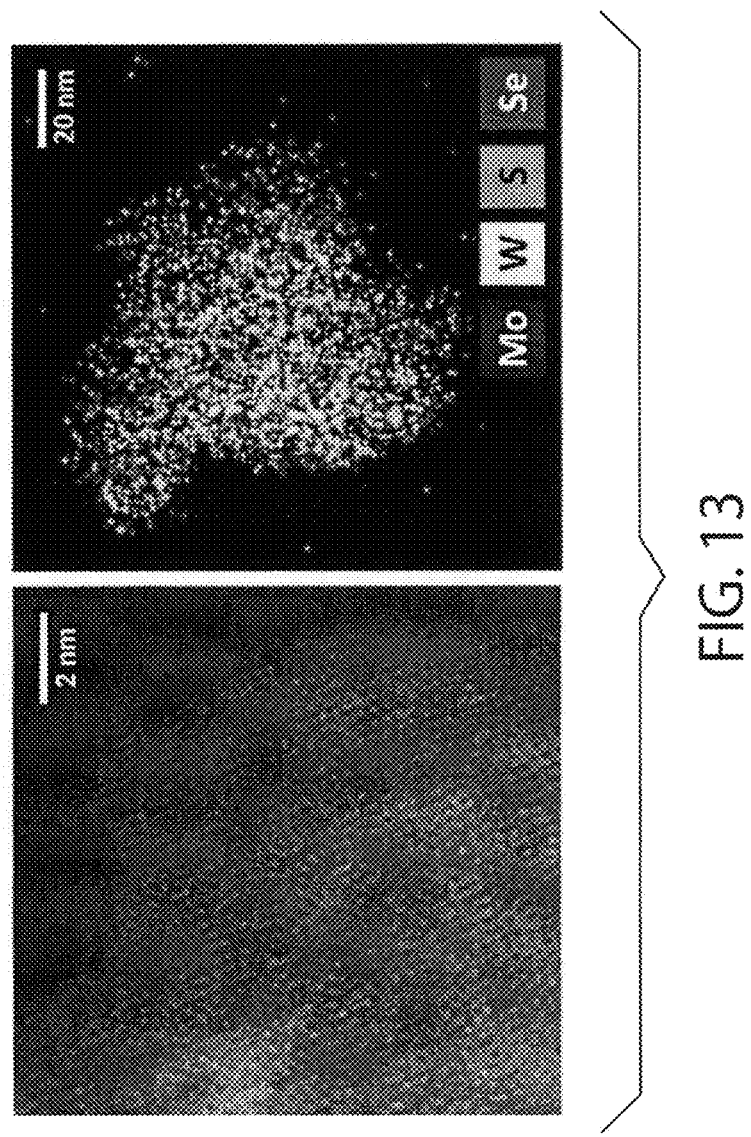
FIG. 13 is HAADF-TEM and HAADF-EDS images of the 1:1 (molar) $MoS_2$ and $WSe_2$ samples milled for 30 hours in the planetary mill.

The Raman spectrum of the heat treated material confirms the XRD results (FIG. 11). In the case of $MoS_2$—$WSe_2$ system, it consists of three characteristic broad bands at about 265, 355 and 400 $cm^{-1}$, clearly deviating from those observed in the starting $MoS_2$, $WSe_2$ and the as-milled sample. The XRD pattern of the latter indicates the presence of both $MoS_2$ and $WSe_2$ phases in the material even after 30 hours of ball milling (FIG. 12). Once again, STEM-EDS suggests compositional homogeneity of heat treated samples (FIG. 13).

Figure 14:
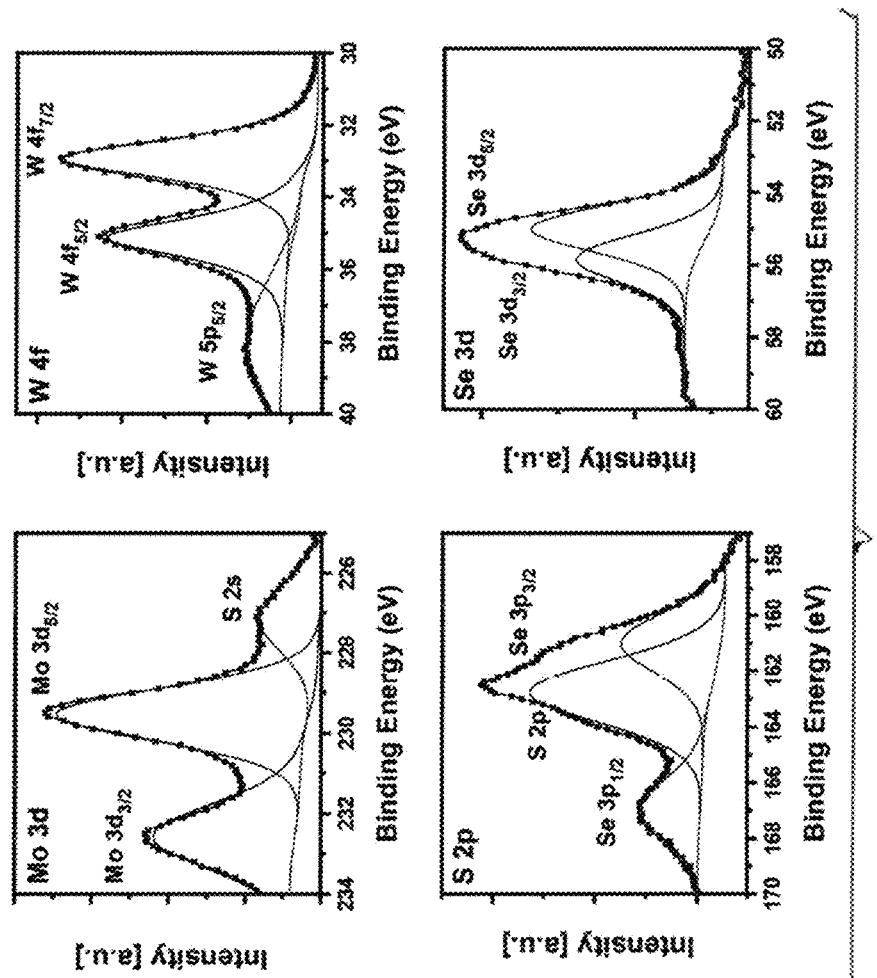
FIG. 14 is the high-resolution XPS spectra of Mo 3d, S 2p, Se 3d and W 4f for the 1:1 (molar) $MoS_2$ and $WSe_2$ sample milled for 30 hours in the planetary mill and then heat treated at 1000 degrees C. in argon for 16 hours.

The high-resolution X-ray photoelectron spectroscopy (XPS) (FIG. 14) reveals the presence of all four-principal elements, Mo, W, S and Se, on the surface of the heat treated material. The XPS spectrum of the annealed $(Mo_{0.5}W_{0.5})$SSe contains peaks at 229.5 and 232.6 eV corresponding to $Mo^{4+}(3d_{5/2})$ and $Mo^{4+}(3d_{3/2})$ ions and the signal at 227 eV agrees with the position characteristic for $S^{2-}(2s)$ ion [44, 45]. The peaks at 32.9 and 35.1 eV are indicative of $W^{4+}(4f_{7/2}$ and $4f_{5/2})$ in TMDCs [46] while the weak signal at 38 eV suggests the presence of a minor $W^{6+}$ ($WO_3$) contamination [44]. Finally, the peak around 162.5 eV corresponds to the unresolved signals by $S^{2-}(2p_{3/2})/S^{2-}(2p_{1/2})$. The additional peaks at ~161 and ~167 eV belong to $Se^{2-}(3p_{3/2})$ and $Se^{2-}(3p_{1/2})$, respectively [47]. The signal at ~55 eV can be assigned to overlapping $3d_{5/2}$ and $3d_{3/2}$ peaks of $Se^{2-}$.

Figure 15:
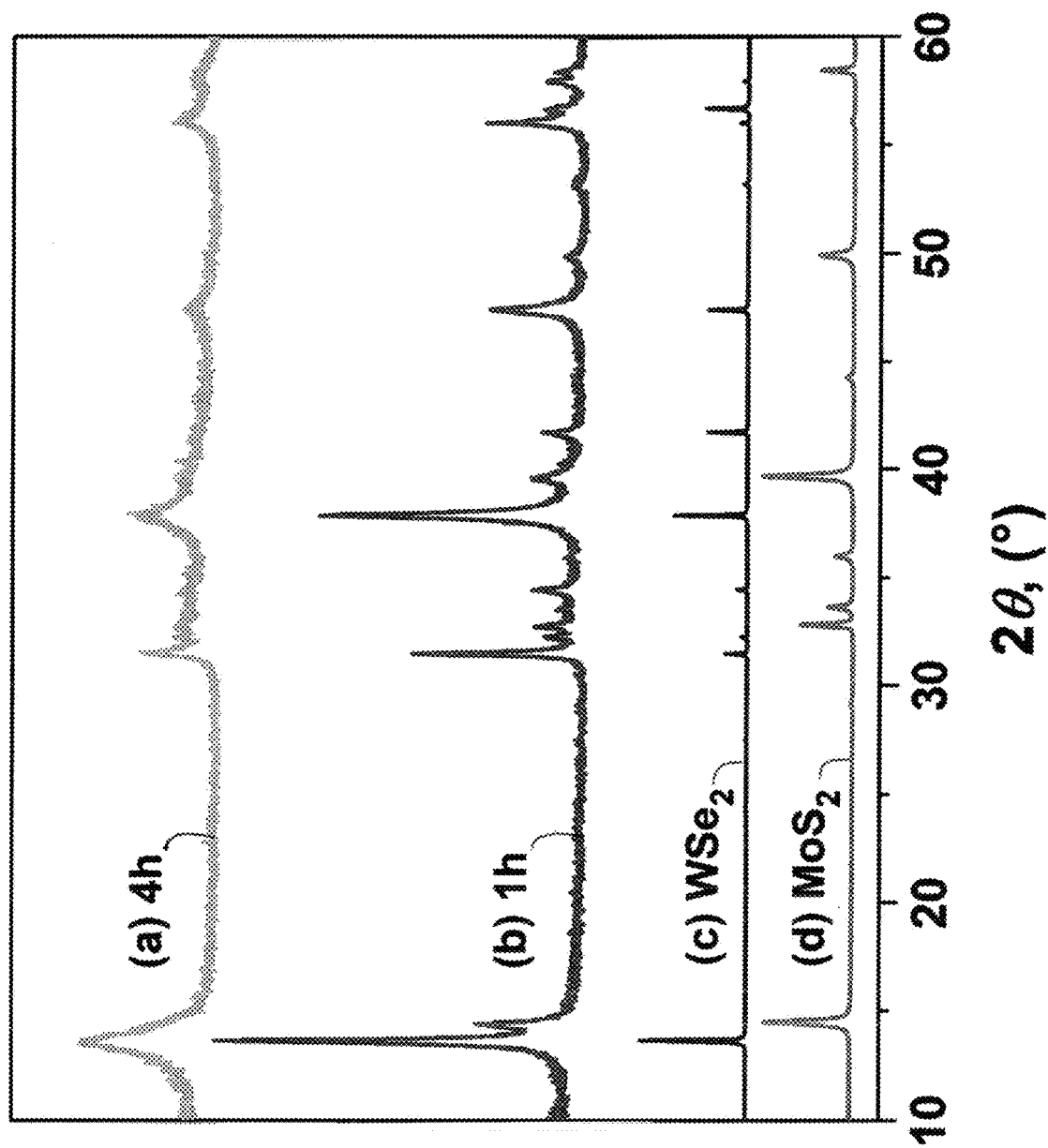
FIG. 15 shows powder X-ray diffraction patterns of the starting $MoS_2$ and $WSe_2$, and the 1:1 (molar) $MoS_2$—$WSe_2$ samples milled for 1 and 4 hours in the mixer mill.

It is worth noting that the frequency of milling has a distinct effect on its result. Thus, the XRD pattern of the materials processed for 30 hours in the planetary mill at 300 rpm (processing frequency of 5 Hz) is quite similar to that obtained after one hour of milling of the $MoS_2$ and $WSe_2$ mixture in a SPEX 8000M unit (processing frequency of ~18 $Hz^1$), and the XRD pattern of the sample processed for 4 hours in the SPEX 8000M mill closely resembles that of the powder generated in the Fritsch Pulverisette 7 planetary mill at 600 rpm (the processing frequency of 10 Hz) for 30 hours (FIG. 15).

The material of the milling equipment does not seem to affect the overall outcome of the synthetic process and a single-phase $(Mo_{0.5}W_{0.5})$SSe could be successfully prepared in both silicon nitride and hardened steel vials after heat treatment. In the latter case, processed material contained up to 0.4 at. % of iron contamination after 30 hours of milling as determined by the X-ray fluorescence spectrometry (XRF). Similar amount of iron was also discovered in other TMDC samples prepared using the hardened steel milling sets.

$(Mo_{0.5}W_{0.5})$SSe crystallizes in space group $P6_3/mmc$ where Mo and W atoms randomly occupy the 2c position (⅓, ⅔, ¼) in the crystal lattice. The 4f site (⅓, ⅔, z) is filled randomly with S and Se. Shapes of Bragg reflections in the XRD pattern are highly anisotropic owing to distinctly plate-shaped particles and a nonrandom distribution of their orientations, which causes texturing and asymmetric broadening of the (h 0 l) Bragg peaks. Correcting for these effects requires spherical harmonics expansion to approximate crystallite shapes for Rietveld-based refinements. Results of which for this and other compounds described in this work are listed in Table 1.

TABLE 1

Structural parameters of TMDCs derived from Rietveld refinements. The space group is P6$_3$/mmc (#194). Metal atoms (Mo, W, Nb or Ta) occupy 2c (1/3, 2/3, 1/4) site and chalcogens occupy 4f (1/3, 2/3, z) site. Standard deviations are given in parentheses. Column labelled R$_p$ lists profile residuals.

| Phase Composition | Lattice parameters | | Chalcogen z/c | R$_p$ |
| --- | --- | --- | --- | --- |
| | a, Å | c, Å | | |
| Mo$_{0.5}$W$_{0.5}$S$_2$ | 3.1628(1) | 12.3581(4) | 0.6229(2) | 6.77 |
| Mo$_{0.5}$W$_{0.5}$SSe | 3.2239(5) | 12.7348(3) | 0.6169(2) | 6.99 |
| MoSSe | 3.2246(4) | 12.7069(2) | 0.6168(1) | 9.10 |
| Mo$_{0.4}$W$_{0.2}$Nb$_{0.4}$S$_{0.8}$Se$_{1.2}$ | 3.3073(2) | 12.5718(9) | 0.6151(2) | 8.86 |
| Mo$_{0.6}$W$_{0.2}$Ta$_{0.2}$S$_{0.8}$Se$_{1.2}$ | 3.1754(1) | 12.4158(2) | 0.6186(3) | 9.01 |
| Mo$_{0.25}$W$_{0.25}$Nb$_{0.25}$Ta$_{0.25}$SSe | 3.3015(2) | 12.5189(9) | 0.6223(3) | 8.82 |

Example 3.—Three to Six Principal Element (Mixed Metal) TMDC Systems

In a typical experiment, a 1 or 2 g sample of a physical mixture of two or more different binary TMDCs, taken in an appropriate stoichiometric proportion, was milled in either stainless steel milling container with eight 11.9 mm stainless steel balls, or in a silicon nitride vial with three 12.7 mm silicon nitride grinding balls using a two-station horizontal planetary mill (Fritsch, Pulverisette 7), or a shaker mill (SPEX 8000M) for various periods of time (1-30 hours). The milling containers were loaded and sealed under ultra-high purity argon in a glove box. To facilitate uniform milling and to prevent kinking of the powder during the processing, the milling mode of the planetary mill was alternated between forward and reverse rotations (30 min each) with an intermittent pause of 5 min. Subsequently, as-milled powders were pressed into pellets under argon in a glove box, placed in a quartz tube, which was further sealed under 0.75 bar of ultra-high purity helium. Typically, the heat treatment was conducted by ramping the temperature to 1000° C. and annealing the material for 16 hours or longer. Afterwards, samples were allowed to cool down to room temperature in the furnace. For analytical characterization, prepared materials were crushed in a mortar with a pestle and stored in a glove box under high-purity argon. The material of the milling equipment does not affect the overall outcome of the synthetic process. Also, according to X-ray fluorescence spectrometry (XRF), samples prepared using the hardened steel setup contained up to 0.4 at. % of iron contamination.

Figure 16:
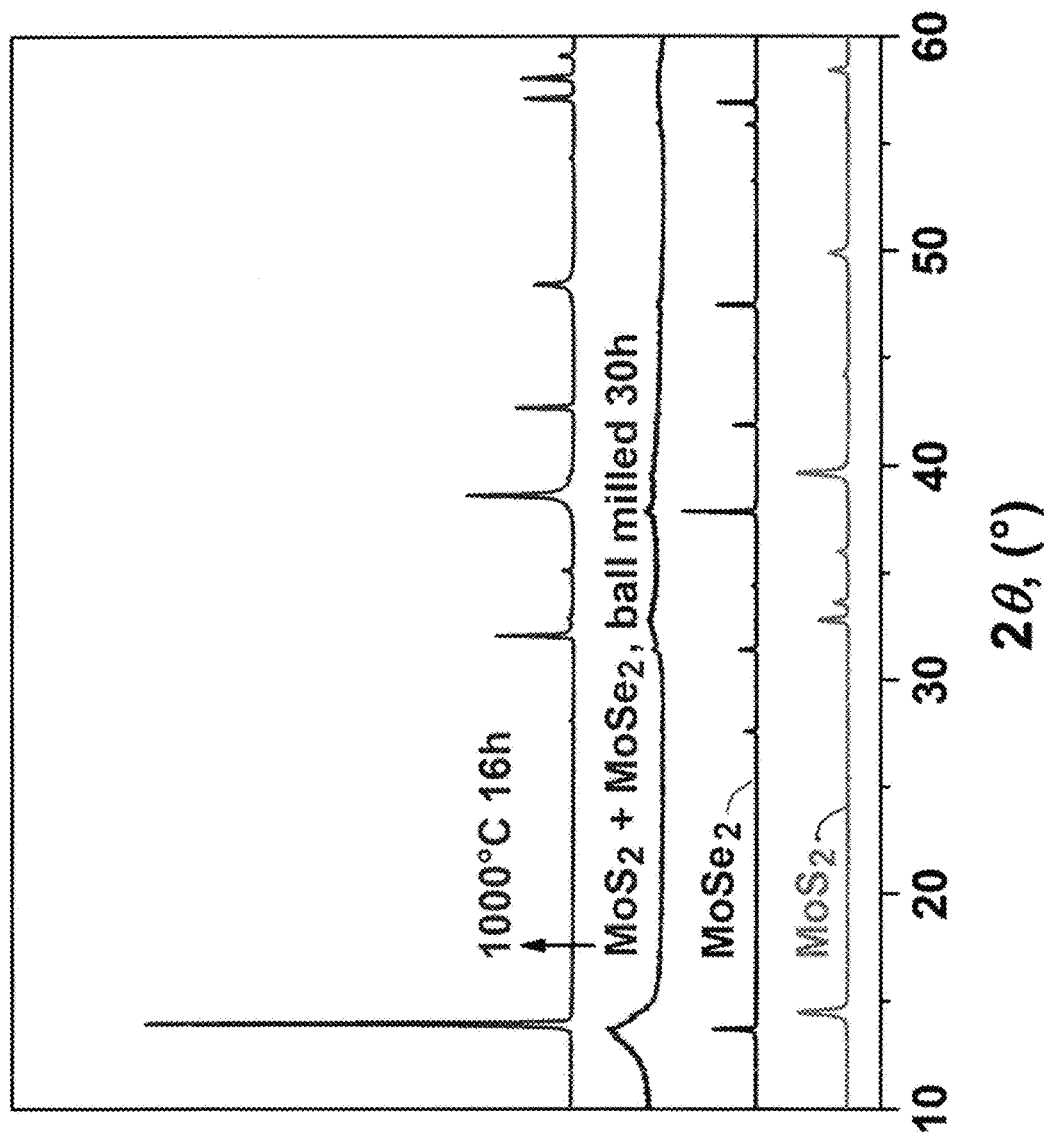
FIG. 16 is powder X-ray diffraction patterns of the starting $MoS_2$ and $MoSe_2$, and the 1:1 (molar) $MoS_2$—$MoSe_2$ samples milled for 30 hours in the planetary mill and then heat treated at 1000 degrees C. in argon for 16 hours.
Figure 17:
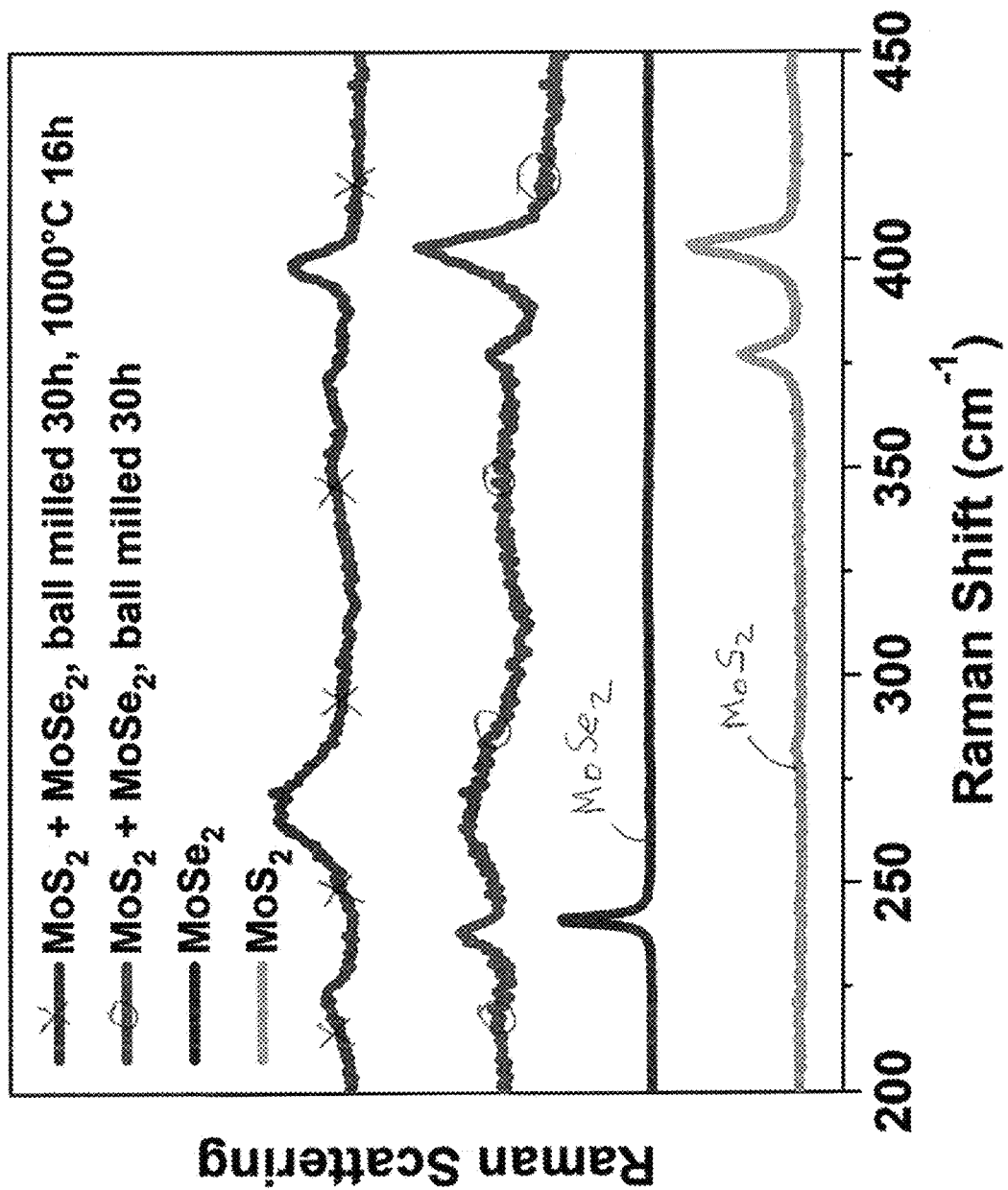
FIG. 17 is Raman spectra of the starting $MoS_2$ and $MoSe_2$, and the 1:1 (molar) $MoS_2$—$MoSe_2$ samples milled for 30 hours in the planetary mill and then heat treated at 1000 degrees C. in argon for 16 hours.

Ball milling of the equimolar mixture of bulk MoS$_2$ and MoSe$_2$, followed by heat treatment of the resulting powder, reliably and reproducibly yields the known three-element chalcogenide, MoSSe. In this case, the presence of the starting materials in the as-milled powder was confirmed by both XRD and Raman spectroscopy, while a single-phase MoSSe forms after annealing at 1000° C. (FIG. 16, 17).

Figure 18A:
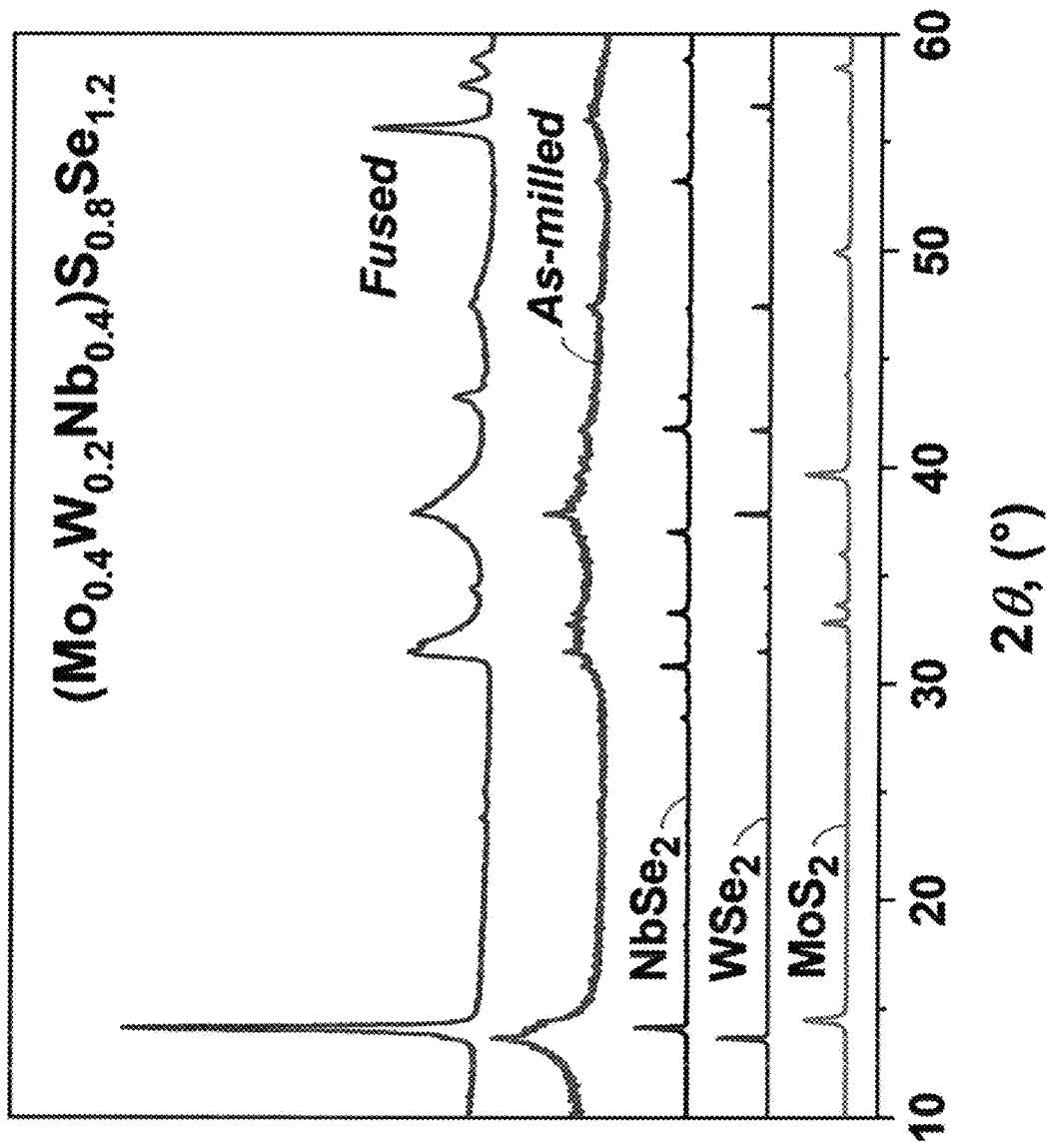
Figure 18B:
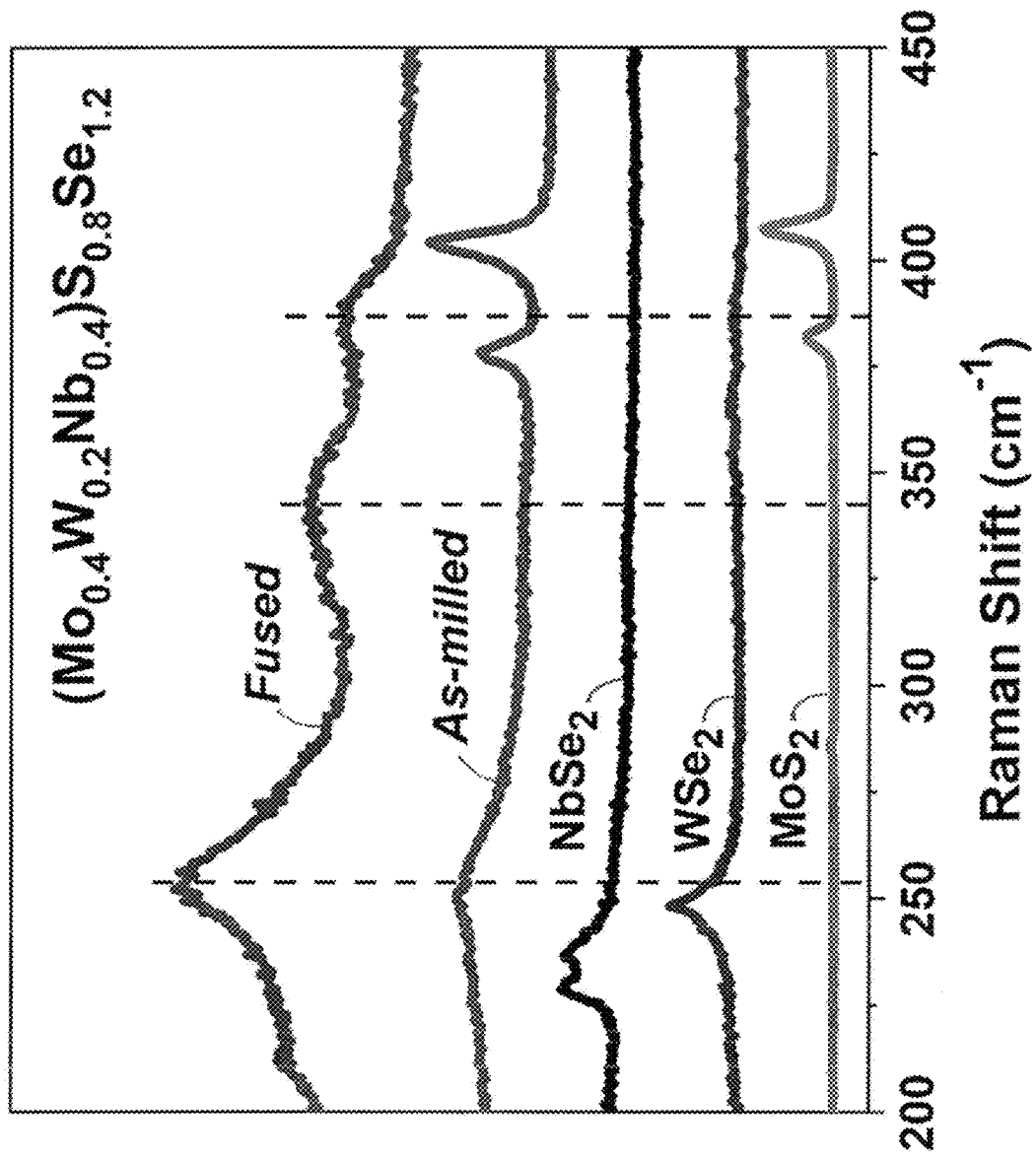

Starting from bulk MoS$_2$, WSe$_2$ and NbSe$_2$, a five-element compound with the nominal composition of (Mo$_{0.4}$W$_{0.2}$Nb$_{0.4}$)S$_{0.8}$Se$_{1.2}$ (FIG. 18a, 18b) was prepared. Similar to other discussed cases, after ball-milling for 30 h, the material emerges as a highly disordered multi-phase powder. Its Raman spectrum (FIG. 18b) contains two prominent peaks at 378 and 404 cm$^{-1}$, matching MoS$_2$, and the very broad signal at ~250 cm$^{-1}$ that combines characteristic peaks of NbSe$_2$ and WSe$_2$ at 228, 236 and 248 cm$^{-1}$. Subsequent annealing at 1000° C. converts the as-milled powder into a fused single-phase (Mo$_{0.4}$W$_{0.2}$Nb$_{0.4}$)S$_{0.8}$Se$_{1.2}$.

Figure 19A:
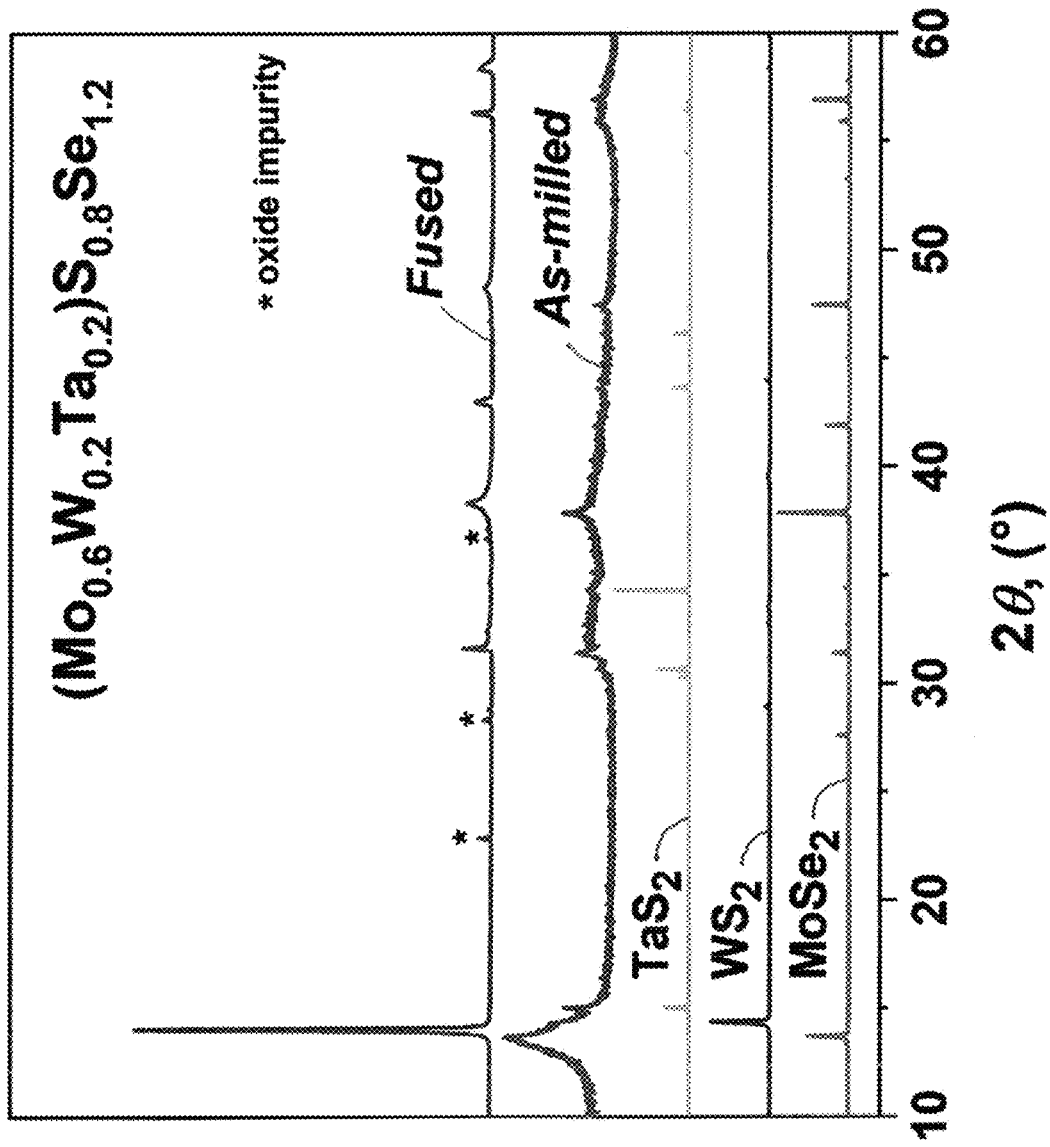
Figure 19B:
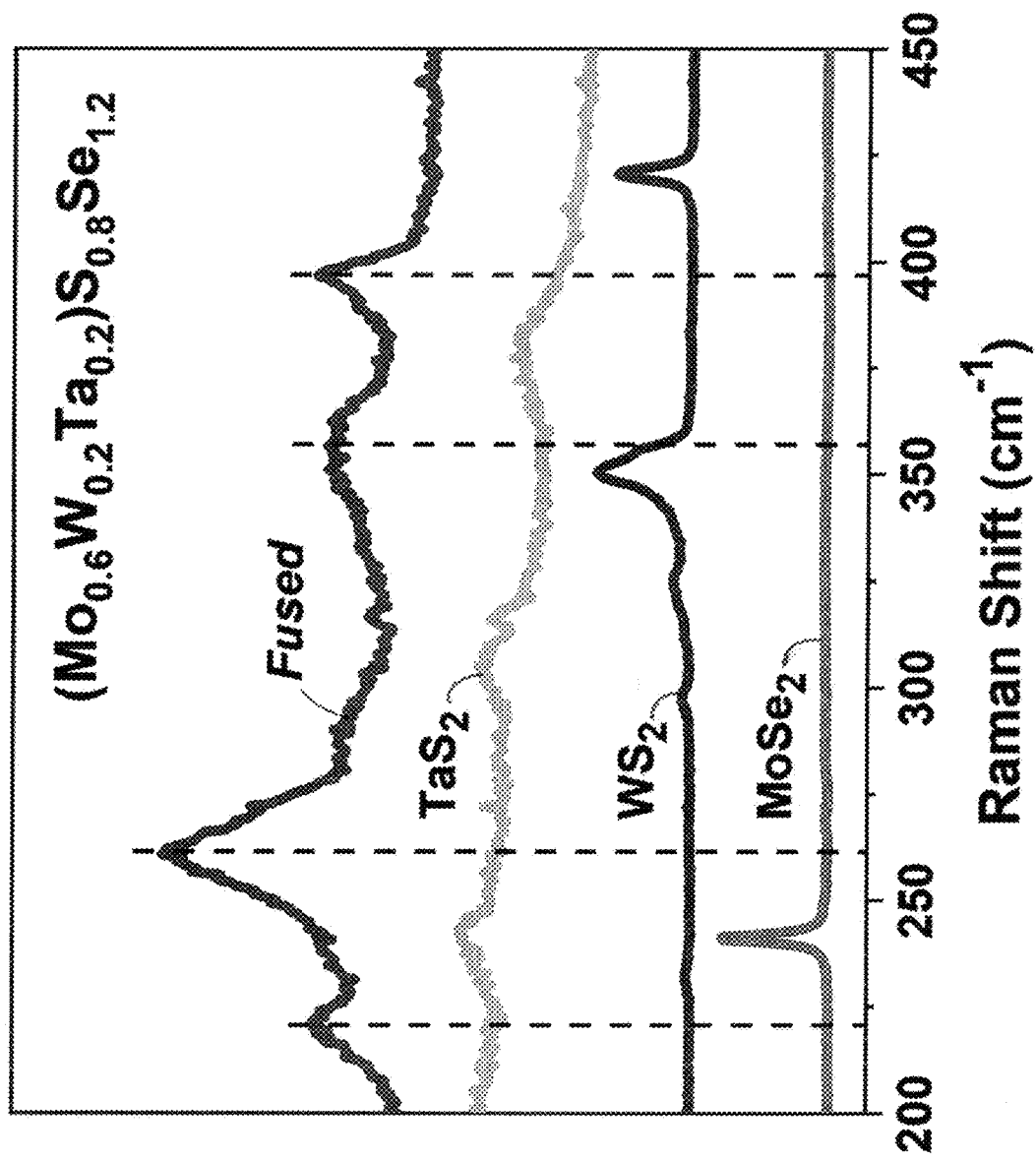

Further, (Mo$_{0.6}$W$_{0.2}$Ta$_{0.2}$)S$_{0.8}$Se$_{1.2}$ (FIG. 19a, 19b) was prepared from a stoichiometric mixture of MoSe$_2$, WS$_2$ and TaS$_2$ using the same procedure. However, in this instance, an extended annealing time of 72 hours was necessary to obtain a crystalline material suitable for Rietveld refinement.

Figure 20A:
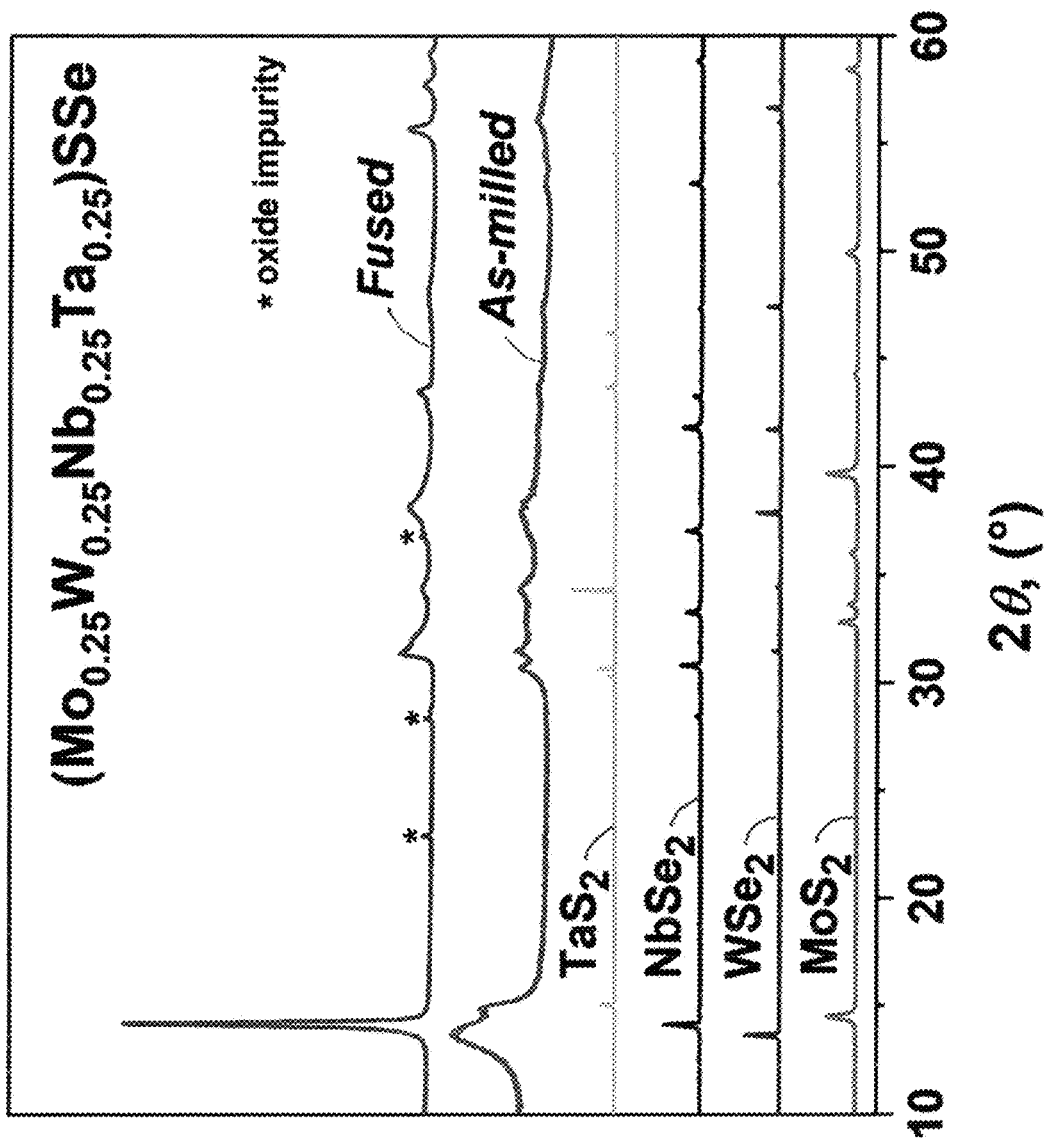
Figure 20B:
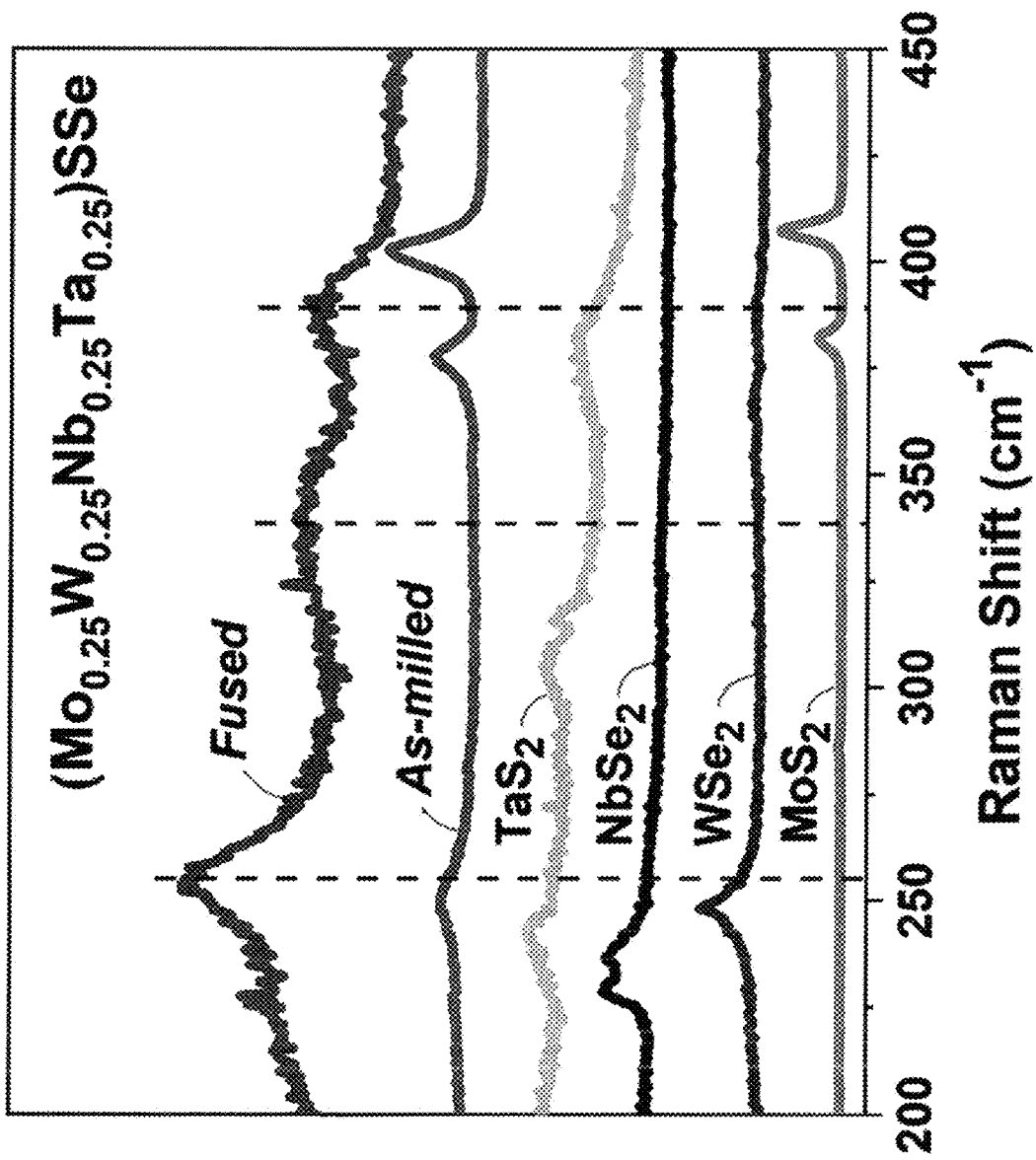

Finally, the six-component compound, (Mo$_{0.25}$W$_{0.25}$Nb$_{0.25}$Ta$_{0.25}$)SSe (FIG. 20a, 20b) has been prepared by ball milling and subsequent annealing of an equimolar (1:1:1:1) mixture of MoS$_2$, WSe$_2$, NbSe$_2$ and TaS$_2$.

The Bragg peaks in the XRD patterns of all five- and six-principal element (mixed metal TMDCs remain substantially broadened even after a prolonged annealing, and a minor oxide impurity was detected in both Ta-containing samples. Reasonably assuming similarity of particle sizes and shapes in all three materials prepared from similar precursors, the observed Bragg peak broadening can be attributed to reduced crystallinity due to built-in strain. Since both Nb and Ta are larger than Mo and W, combining them in the same metallic layer of a multi-element TMDC should cause distinct distortion of the layers that propagates into the entire 3D-lattice.

In achieving the results described above, the tangential component of ball-milling, which is accountable for the shearing action, appears to enable mechanical exfoliation of bulk TMDCs. At the same time, the exfoliated TMDCs can easily restore their 3D-arrangements by restacking, which is used to construct vertical 3D-heterostructures from exfoliated two dimensional TMDCs, graphene, h-BN and similar single-layer nanomaterials [49, 50]. Hence, it is quite feasible that mechanical exfoliation and spontaneous restacking of different TMDCs in a way similar to reshuffling a deck of playing cards, can produce 3D hetero-assemblies that appear uniform for EDS but, in fact, are heterostructured materials. The latter can further transform into uniform single-phase materials during subsequent heat treatment. However, the inventors do not intend to be bound by any above theory or above explanation.

Figure 21:
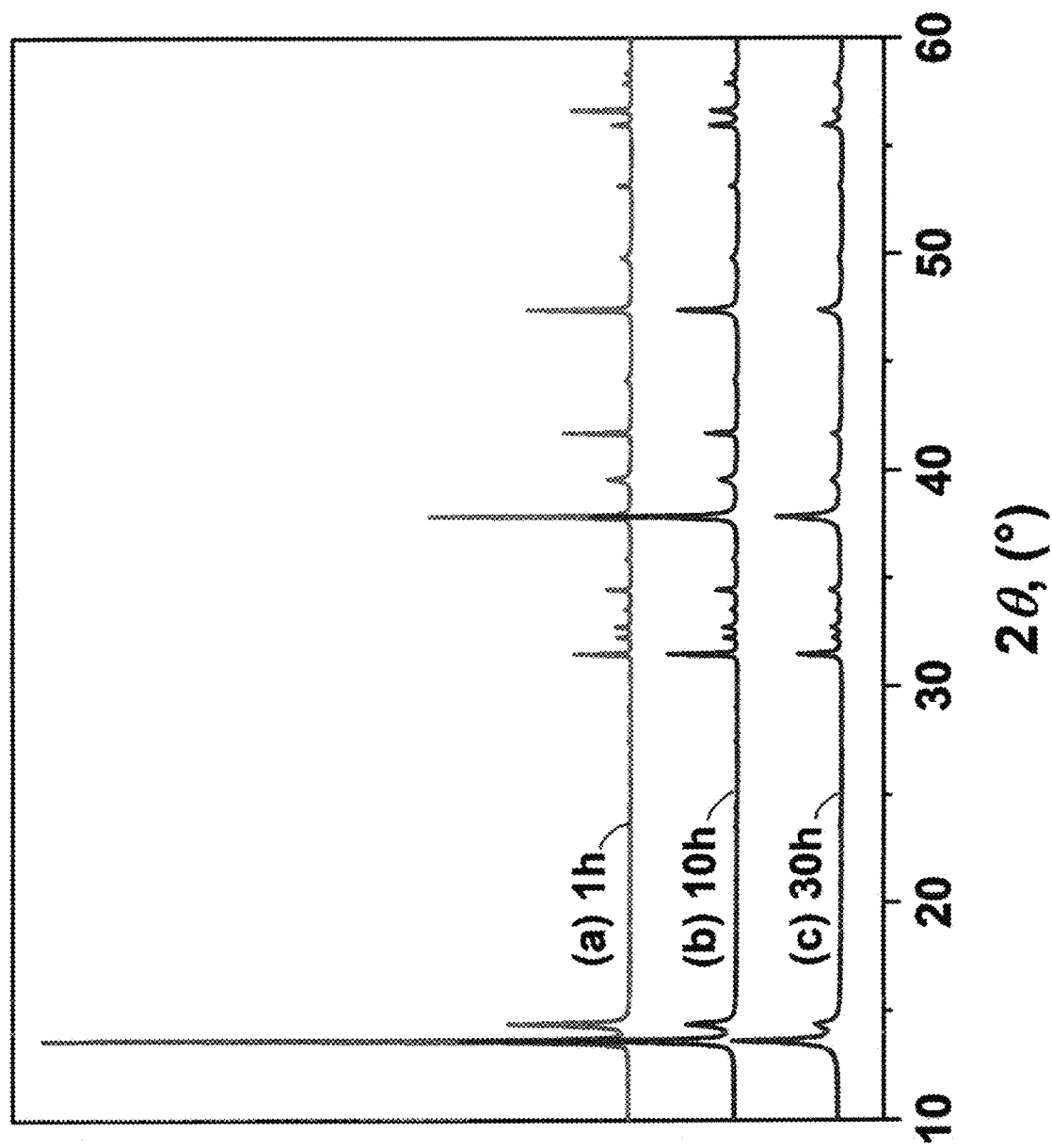
FIG. 21 shows powder X-ray diffraction patterns of the 1:1 (molar) $MoS_2$—$WSe_2$ samples milled for 1, 10 and 30 hours in the planetary mill at 300 rpm.
Figure 22A:
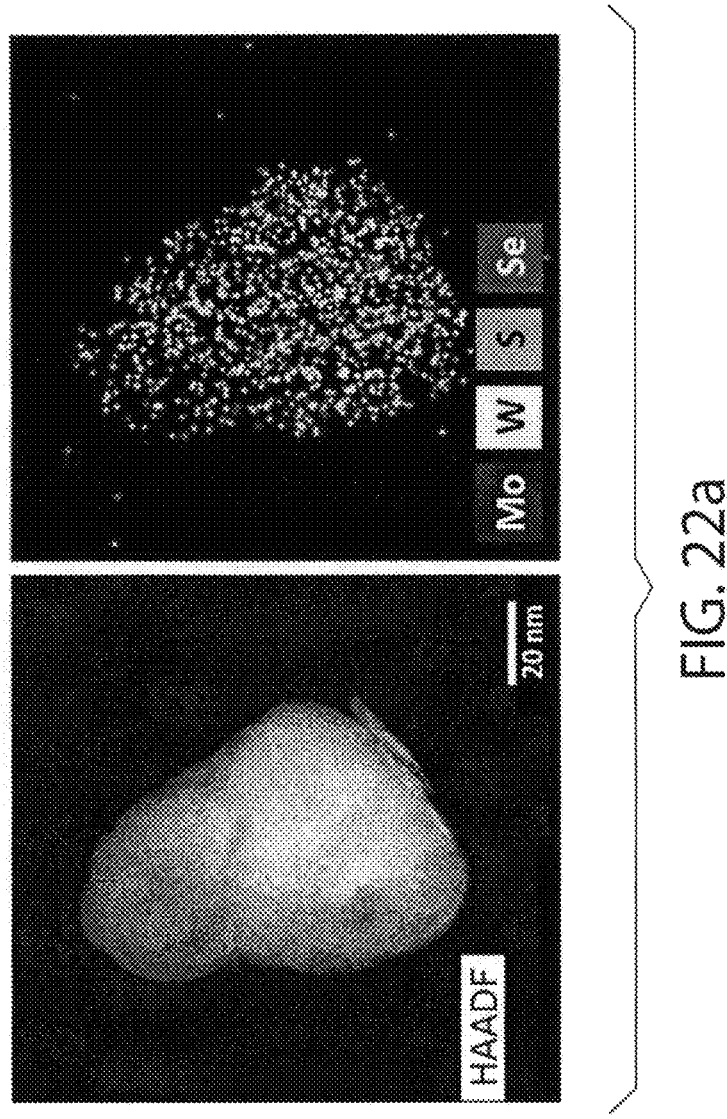
Figure 22B:
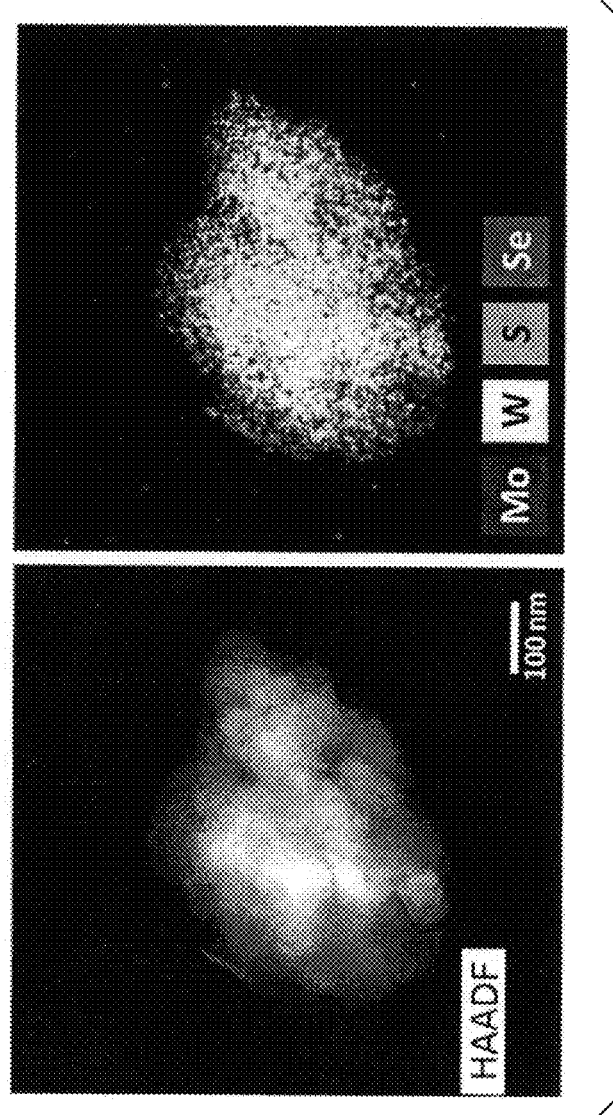
Figure 22C:
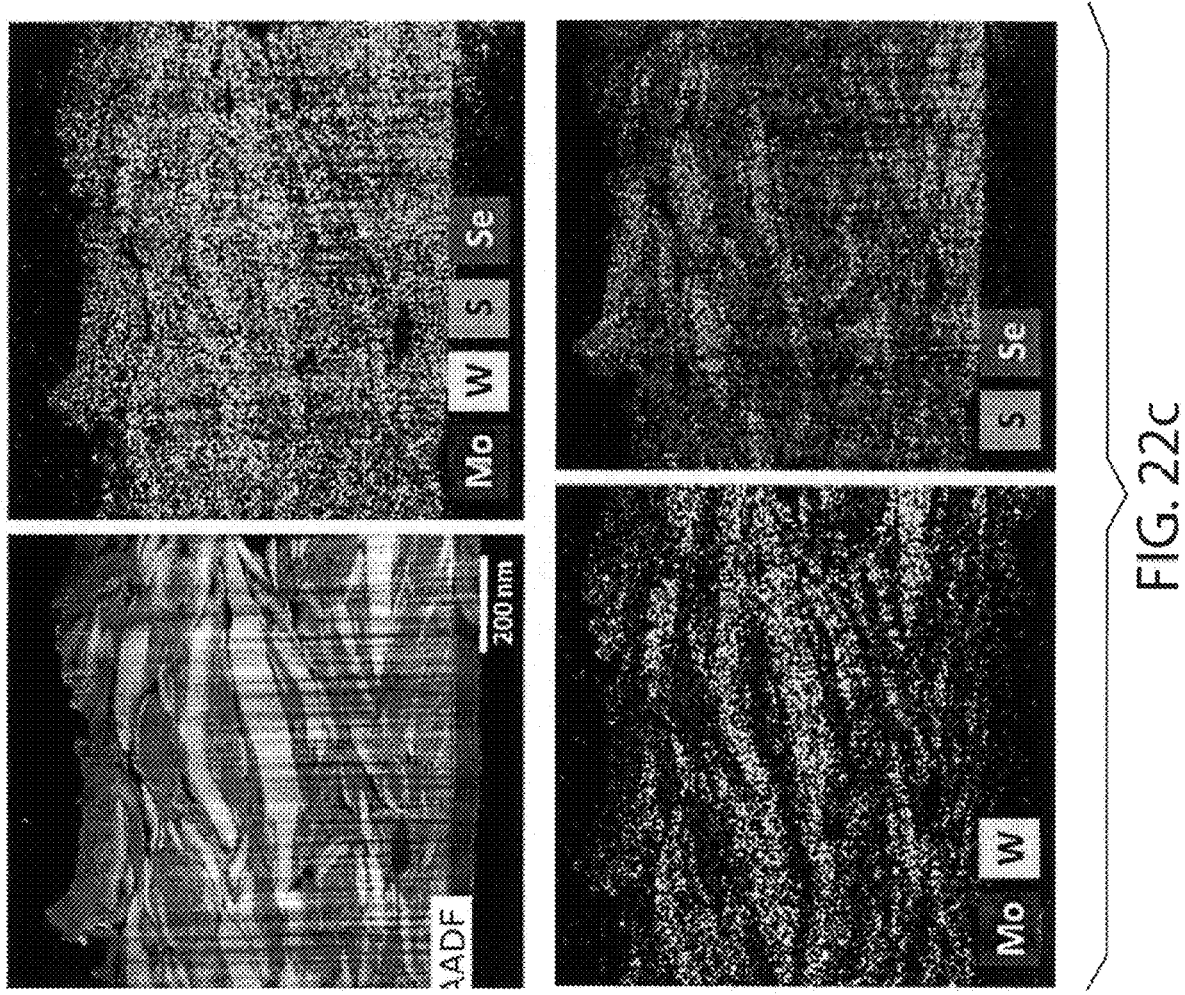
Figure 22D:
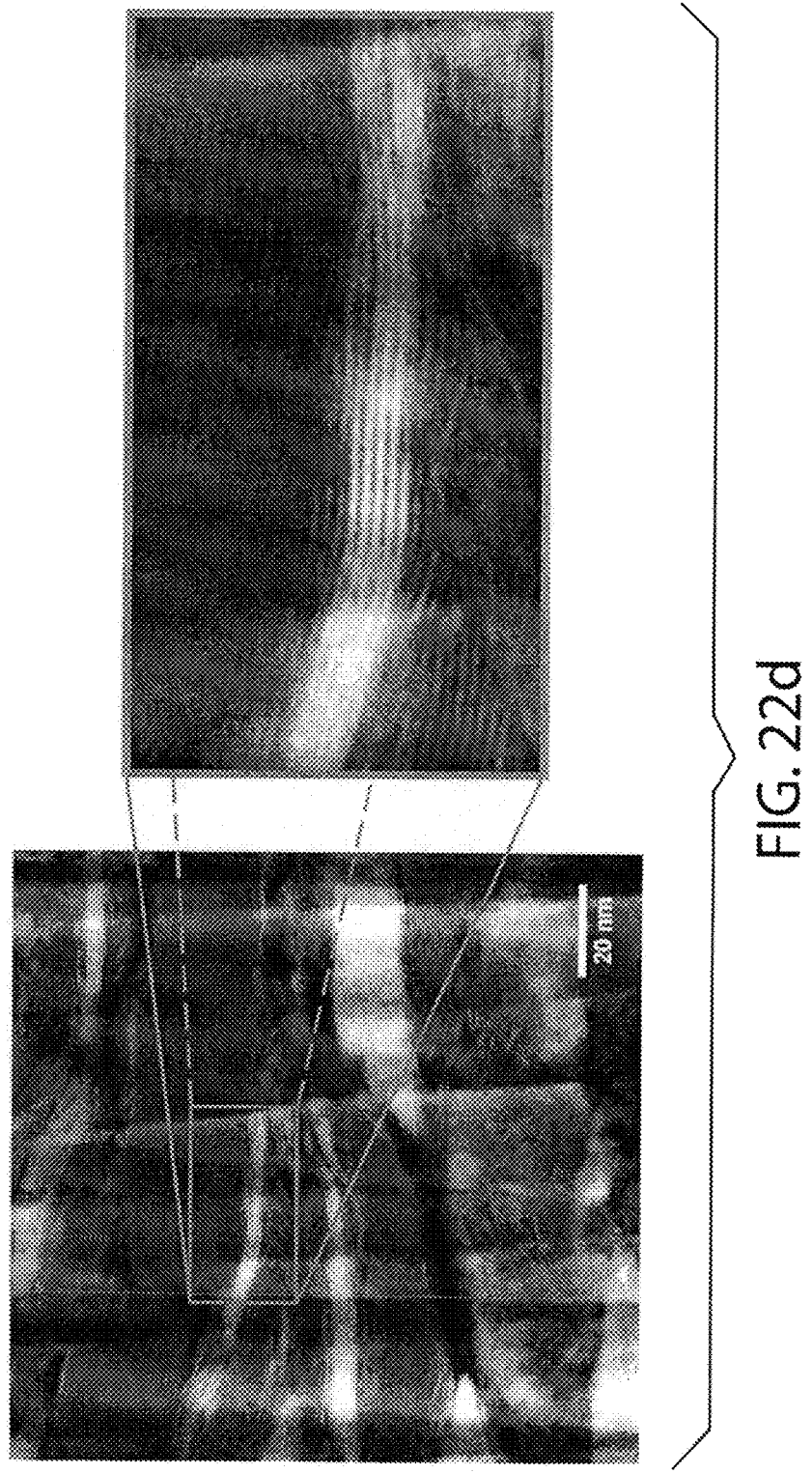
Figure 22E:
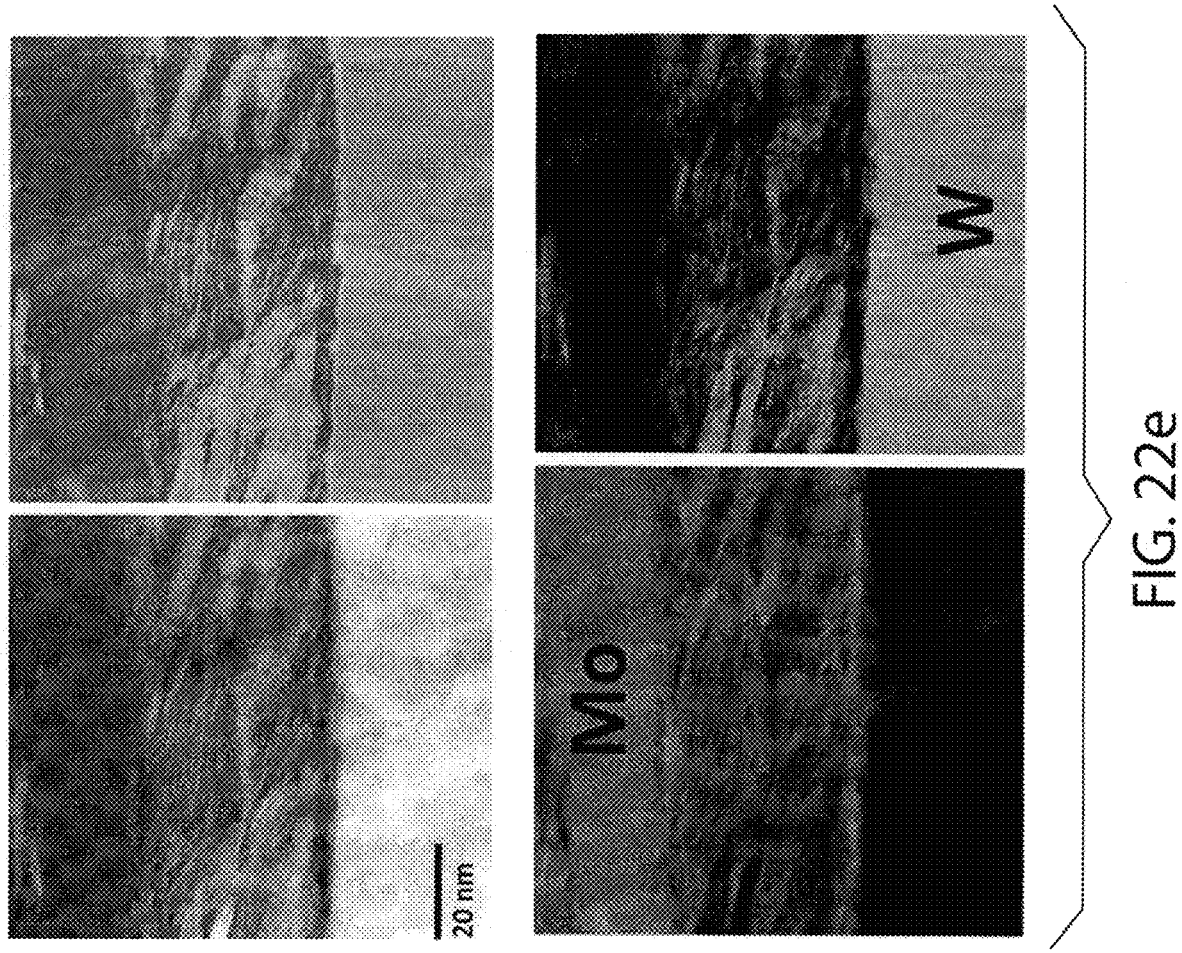
Figure 23:
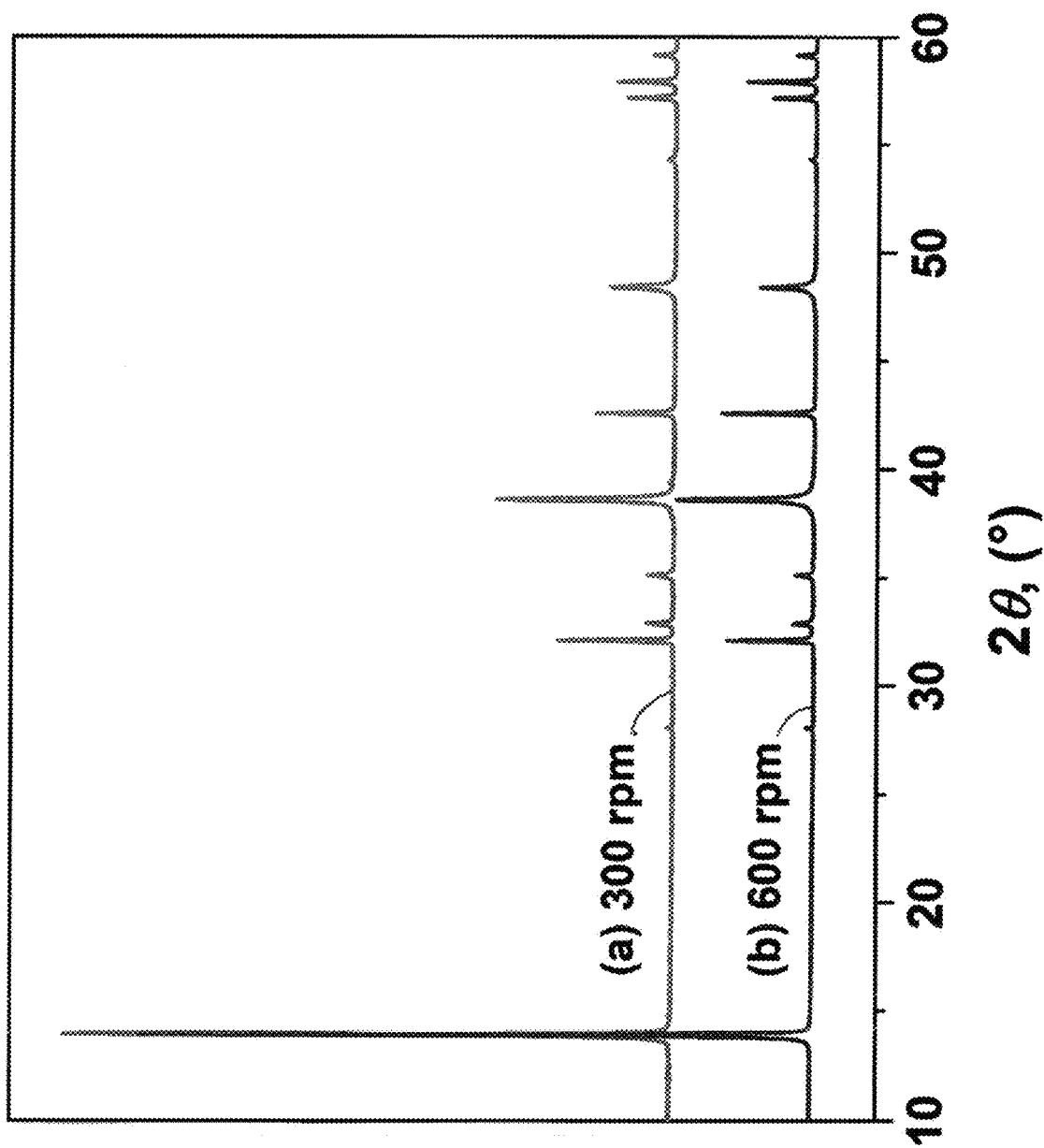
FIG. 23 is powder X-ray diffraction patterns of the 1:1 (molar) $MoS_2$—$WSe_2$ samples milled for 30 hours in the planetary mill at 300 and 600 rpm and then heat treated at 1000 degrees C. in argon for 16 hours.

Experiments using lower-speed (300 rpm) ball milling of bulk MoS$_2$ and WSe$_2$ shed some additional light upon layer-reshuffling during ball-milling. Contrary to the more intense (600 rpm) processing, both MoS$_2$ and WSe$_2$ phases remain clearly distinguishable in the XRD patterns of the as-milled powders even after 30 hours of milling (FIG. 21), and the STEM-EDS analysis now clearly reveals the presence of two different types of particles in this material (FIG. 22a-22e). The first kind of particles looks compositionally uniform (FIG. 22a) resembling particles in the as-milled samples discussed above. The second group consists of hetero-assemblies, where the "reshuffling" remains incomplete, and individual $MoS_2$ and $WSe_2$ segments can be distinguished around the areas of their overlap (FIG. 22b). The Focused Ion Beam (FIB) cross-sectioning experiment performed on a large agglomerate of the particles, which was cut by a Ga-ion beam, attached to a tungsten needle and rotated in the TEM chamber to produce a side view, clearly demonstrates its heterogeneous layered structure (FIG. 22c, 22d). Heating the as-milled, incompletely reshuffled powder at 1000 degrees C. for 16 hours produces a fused single-phase $(Mo_{0.5}W_{0.5})SSe$ identical to the material obtained in other experiments. (FIG. 23) Thus, available experimental data strongly suggest that mechanical milling of $MoS_2$ with $WSe_2$ leads to stochastic rearrangement of both individual layers and incompletely exfoliated slabs into 3D hetero-assemblies where both kinds of building blocks retain their compositional individuality (FIG. 22d, 22e).

The above examples demonstrate that the method embodiments of the invention described above enable easy and reliable preparation of diverse multi-principal element (mixed metal) TMDCs that were either unknown or barely accessible via conventional materials fabrication routes.

Mechanochemical exfoliation coupled with stochastic restacking of binary precursors enables the generation of layered 3D heterostructures, and annealing of the latter generates single-phase multi-metal element materials. It is quite feasible that similar or closely related protocols can be applied to the preparation of other classes of materials, which are inaccessible or hard-to-reach through conventional synthetic routes.

Another important outcome of practice of method embodiments is that mechanochemical treatment facilitates the formation of 3D-heterostructures from bulk TMDCs that may provide a path to prepare to a broad range of unusual hetero-structured nanomaterials.

Finally, multi-principal element (mixed metal) materials synthesized using the method embodiments, represent a unique group of high-entropy-like systems that can serve as precursors of new 2D nanomaterials and 3D-heterostructures with future applications in electronics, electrochemical water splitting, and advanced lubrication, to name a few.

Figure 24:
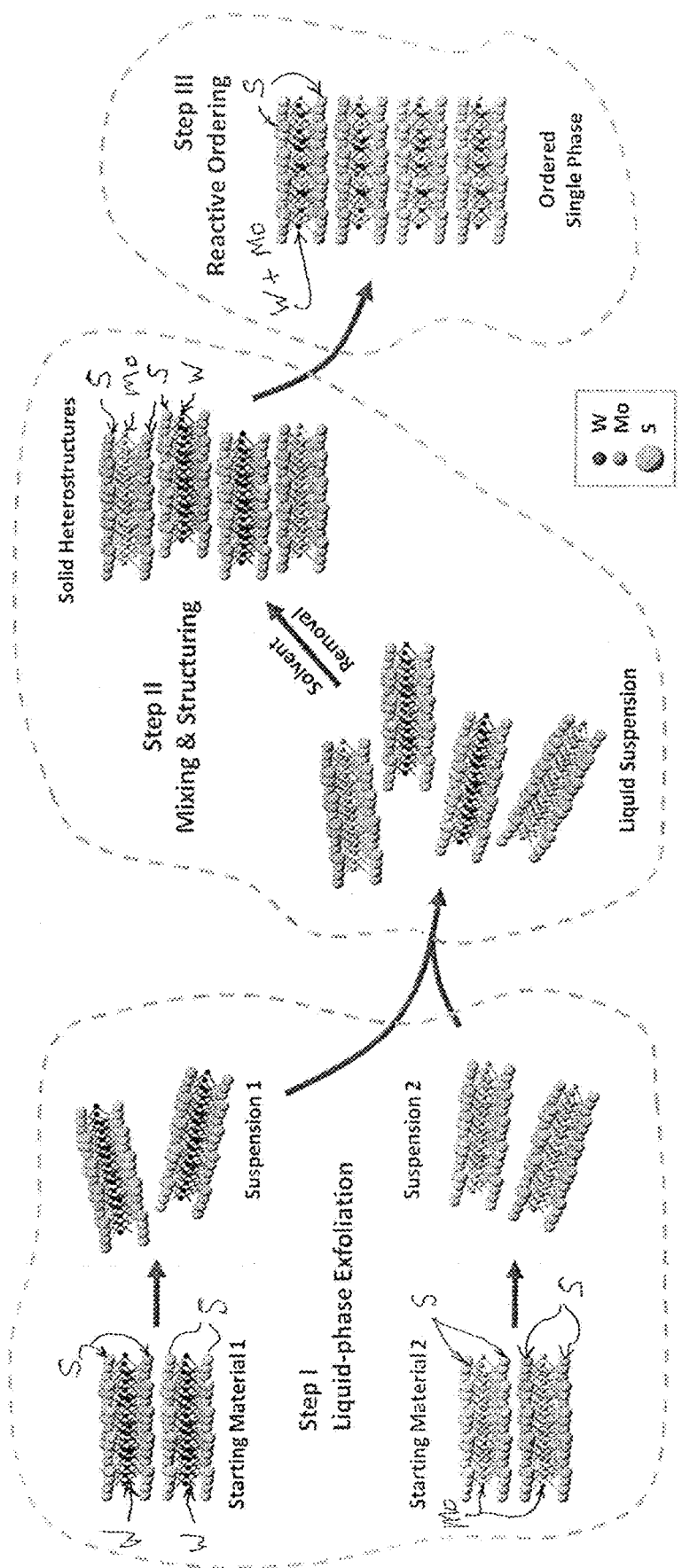
FIG. 24 is a schematic diagram of liquid-phase preparation of single-phase, bulk TMDC materials according to an embodiment of the invention.

Preparation of Multi-Principal Element (Mixed Metal) TMDC's by Liquid-Assisted Exfoliation:

FIG. 24 illustrates schematically liquid-phase preparation of single-phase, bulk TMDC materials according to other embodiments of the invention. After synthesis, the liquid medium can be removed by vacuum evaporation, boiling away, dry freezing or any other technique.

Example 4.—$MoS_2$—$WSe_2$ System

Commercial $MoS_2$ powder (Sigma-Alrdich, 99% purity) and $WSe_2$ powder (Alfa Aesar, 99.8% purity) were used as starting materials. $MoS_2$ and $WSe_2$, 2 g of each powder, were separately ball milled in the presence of 1 ml of isopropanol for 30 hours using a Fritsch Pulverisette 7 planetary mill. The milling was carried out in separate milling vials sealed under argon with eight 12 mm stainless steel balls (about 7 g each) at 600 rpm. The milling mode was alternated between forward and reverse (30 min each) with an intermittent pause of 5 min to facilitate uniform shear milling.

Figure 25:
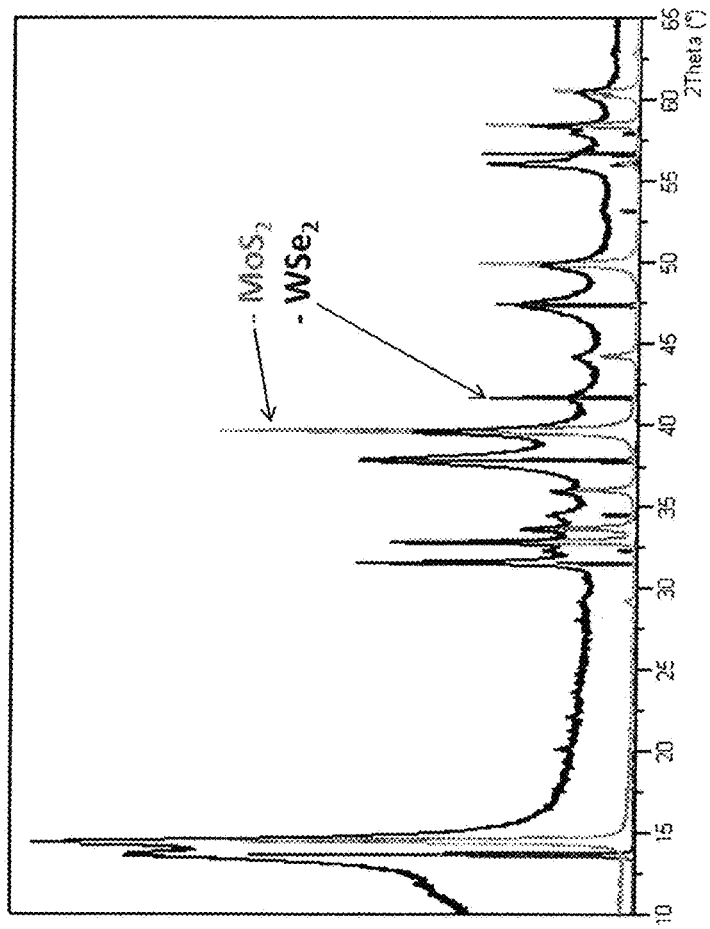
FIG. 25 are powder X-ray diffraction patterns of the 1:1 (molar) $MoS_2$—$WSe_2$ sample processed as described in Example 4 before heating.

Obtained powders were dried under vacuum and corresponding amounts of the samples were weighed out to obtain stoichiometric molar ratio of $1MoS_2$:$1$ $WSe_2$ with a total mass of 0.5 gram. Each sample was separately added to 40 grams of isopropanol and sonicated for 60 minutes in a FS20H Fisher Scientific sonicating machine. Thereafter, obtained suspensions were centrifuged at 3500 rpm for 15 min. Equal amounts of the obtained dispersions were mixed together, then the solvent was evaporated at 70° C., which led to the formation of a mixed solid assembly from exfoliated $MoS_2$ and $WSe_2$ phases as confirmed by XRD (FIG. 25).

Figure 26:
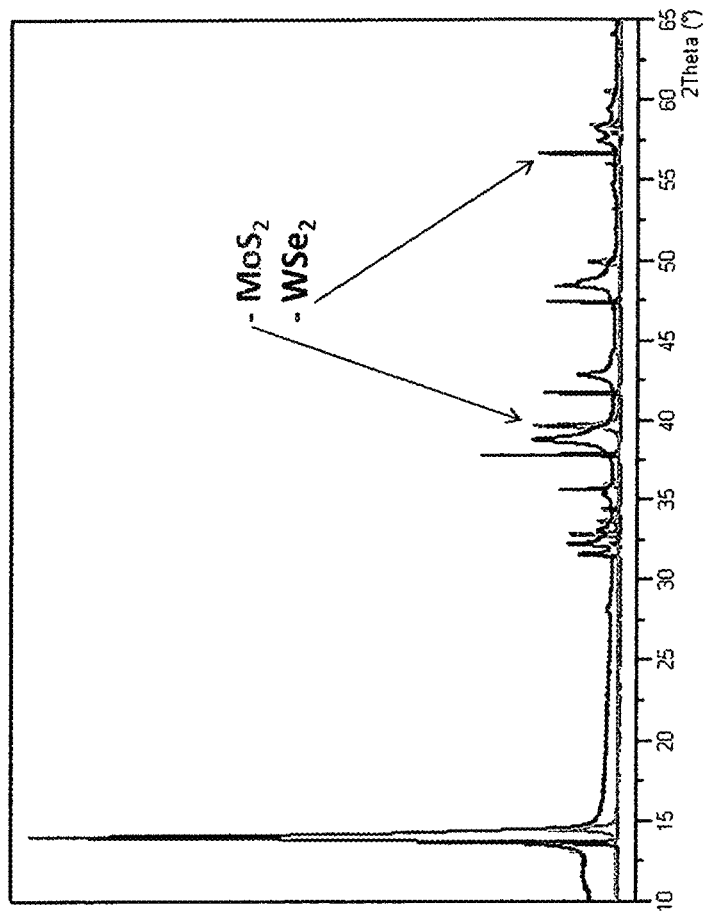
FIG. 26 are powder X-ray diffraction patterns of the 1:1 (molar) $MoS_2$—$WSe_2$ sample processed as described in Example 4 after heating at 1000 degrees C. in argon for 16 hours.

Next, the obtained mixed solid material was annealed at 1000 degrees C. in a quartz tube under inert gas atmosphere for 16 hours. The XRD pattern of the heat treated sample showed a highly crystalline single-phase solid combining four elements in its structure with the general chemical formula of $Mo_{1-x}W_xS_{2-2x}Se_{2x}$ (FIG. 26)

Example 5.—$MoS_2$—$WSe_2$ System

Figure 27:
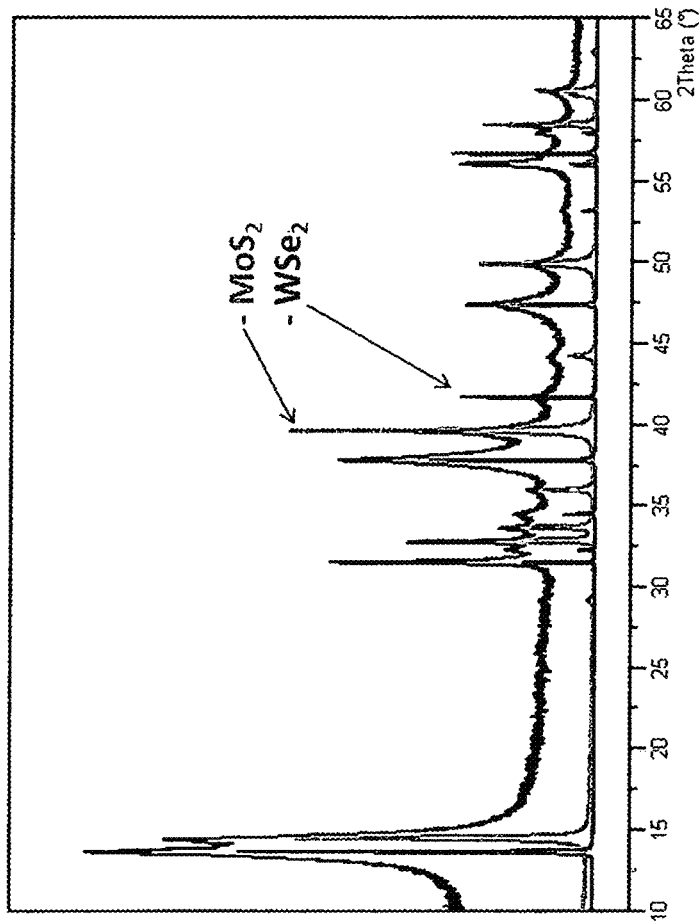
FIG. 27 are powder X-ray diffraction patterns of the 1:1 (molar) $MoS_2$—$WSe_2$ sample processed as described in Example 5 before heating.

Starting $MoS_2$ and $WSe_2$ were prepared as described in Example 4. Subsequently, they were combined together in an equimolar ratio to obtain a 0.5 gram sample. The sample was suspended in 100 ml of isopropanol and sonicated for 10 hours in a FS20H Fisher Scientific sonicating machine. Next, 50 ml of isopropanol was added to the sonicated suspension, and it was centrifuged for 30 minutes at 3500 rpm. The liquid phase was separated and the precipitated material was dried in vacuum. The obtained dry solid material was annealed at 1000° C. for 16 hours in a quartz tube sealed under inert argon. FIG. 27 shows the XRD pattern of the material before annealing, indicating the presence of $MoS_2$ and $WSe_2$ phases in the sample. After annealing, an XRD pattern showed a highly crystalline solid solution of four component TMDC with the general chemical composition of $Mo_{1-x}W_xS_{2-2x}Se_{2x}$.

Example 6.—$MoS_2$—$WSe_2$ System

Figure 28:
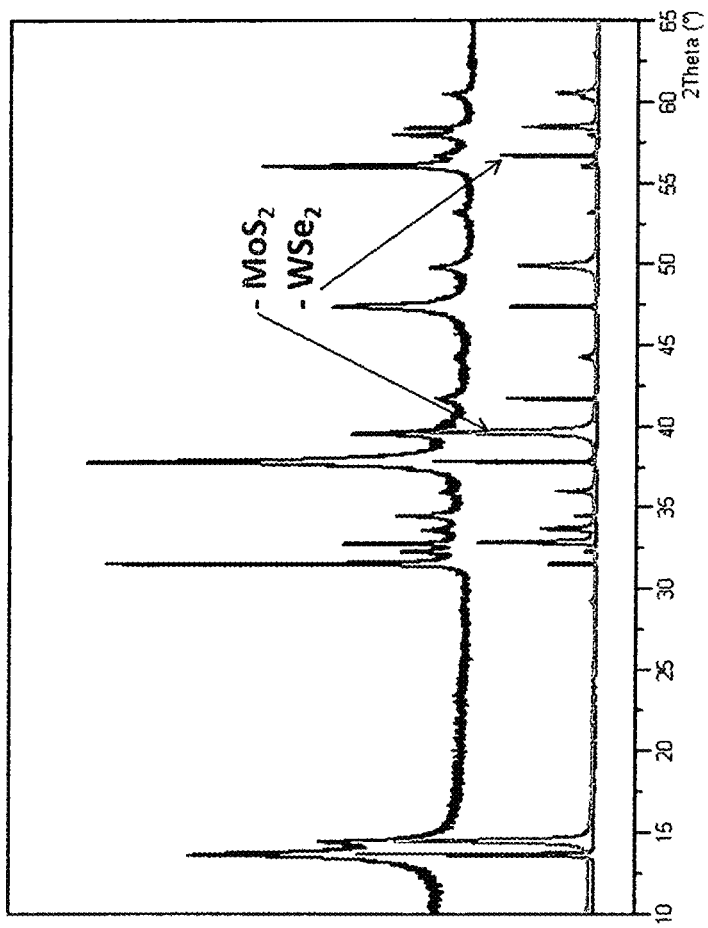
FIG. 28 are powder X-ray diffraction patterns of the 1:1 (molar) $MoS_2$—$WSe_2$ sample processed as described in Example 6 before heating.
Figure 29:
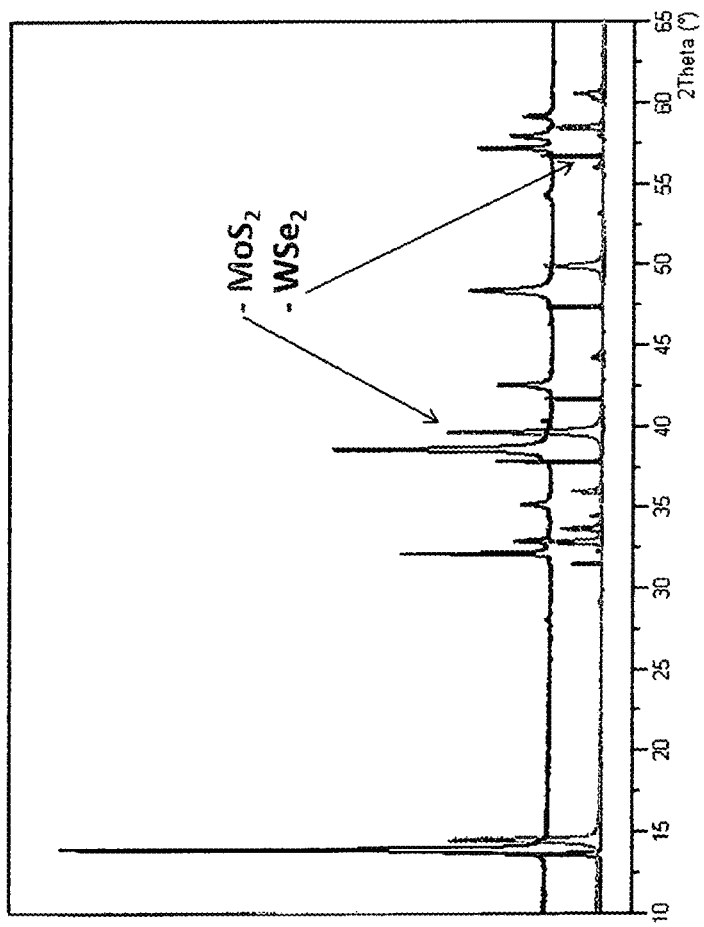
FIG. 29 are powder X-ray diffraction patterns of the 1:1 (molar) $MoS_2$—$WSe_2$ sample processed as described in Example 6 after heating at 1000 degrees C. in argon for 16 hours.

A total 2 grams of the equimolar mixture of $MoS_2$ powder and $WSe_2$ powder was shear milled for 30 hours in 1 ml of isopropanol to facilitate their liquid-assisted exfoliation and restacking. The XRD pattern of the as-milled sample shown in FIG. 28 suggests that the product formed contains chemically unchanged but clearly disordered precursor phases. The absence of the characteristic peaks of $(Mo_{0.5}W_{0.5})SSe$ phase implies that only exfoliation and restacking processes may have occurred. After heat treatment at 1000° C. for 16 hours under argon, the material has transformed into a crystalline single-phase $(Mo_{0.5}W_{0.5})SSe$ as confirmed by XRD (FIG. 29).

In practicing these and other embodiments of the present invention, heat treating of the disordered layered mixed TMDCs can be conducted at elevated temperatures between 100 and 1500 degrees C. in an inert or non-reactive gas atmosphere to produce the ordered layered mixed TMDC. For purposes of illustration and not limitation, the heat treating time can be between 1 minute to 72 hours or longer. Heat treating can be conducted in an inert atmosphere comprise helium, argon, krypton, xenon, nitrogen, methane and any other gas, which shows no reactivity towards the binary TMDCs and the produced disordered layered mixed TMDC.

The present invention further envisions a subsequent method step that involves exfoliating the ordered layered mixed TMDC (crystalline material) to produce a single layer or multi-layer crystalline nanostructure. Exfoliation can be conducted using sonication in a liquid or any other appropriate exfoliation technique.

Although the present invention has been described with respect to certain illustrative embodiments and examples for purposes of illustration and not limitation, those skilled in the art will understand that changes and modifications can be made therein within the scope of the present invention as set forth in the appended claims.

REFERENCES, WHICH ARE INCORPORATED HEREIN BY REFERENCE

1. Mann, J., Ma, Q., Odenthal, P. M., Isarraraz, M., Le, D., Preciado, E., Barroso, D., Yamaguchi, K., von Son Palacio, G., Nguyen, A. and Tran, T., 2014; 2-Dimensional Transition Metal Dichalcogenides with Tunable Direct Band Gaps: MoS2 (1-x) Se2x Monolayers. Advanced Materials, 26(9), pp. 1399-1404.
2. Ultra-thin nano sheet made by transition metal chalcogenide MX2, preparation method and application on lubricating oil additive. Li, Changsheng; Dong, Jinze; Yang, Jin; Tang, Guogang; Peng, Weixiang. CN 106145065 (Faming Zhuanli Shenqing, 2016).
3. Mcgee, Z. G., Mcgee Chemical Company Inc, 1963; Solid lubricant containing compositions. U.S. Pat. No. 3,071, 543.
4. Molybdenum disulfide—a new lubricant; Sentyurikhina, L. N.; Oparina, E. M. Trudy Vsesoyuz. Nauch.-Issledovatel. Inst. po Pererabotke Nefti i Gaza i Poluchen. Zhidkogo Topliva (1958), (No. 7), 403-9.
5. Lu, R., Du, K., Liu, G., Yang, C. and Wang, K., 2015; Preparation and Photoelectrochemical Properties of Multilayered WS2 Coated Titanium Dioxide Nanocomposites. ECS Transactions, 66(14), pp. 57-63.
6. Li, H., Yu, K., Li, C., Guo, B., Lei, X., Fu, H. and Zhu, Z., 2015; Novel dual-petal nanostructured $WS_2$@$MoS_2$ with enhanced photocatalytic performance and a comprehensive first-principles investigation. Journal of Materials Chemistry A, 3(40), pp. 20225-20235.
7. Chen, T. Y., Chang, Y. H., Hsu, C. L., Wei, K. H., Chiang, C. Y. and Li, L. J., 2013; Comparative study on $MoS_2$ and $WS_2$ for electrocatalytic water splitting. International Journal of Hydrogen Energy, 38(28), pp. 12302-12309.
8. Wang, D., Wang, Z., Wang, C., Zhou, P., Wu, Z. and Liu, Z., 2013; Distorted $MoS_2$ nanostructures: An efficient catalyst for the electrochemical hydrogen evolution reaction. Electrochemistry Communications, 34, pp. 219-222.
9. Li, J., Shi, X., Fang, J., Li, J. and Zhang, Z., 2016; Facile Synthesis of $WS_2$ NanosheetsCarbon Composites Anodes for Sodium and Lithium Ion Batteries. ChemNanoMat, 2(10), pp. 997-1002.
10. Krishnamoorthy, K., Pazhamalai, P., Veerasubramani, G. K. and Kim, S. J., 2016; Mechanically delaminated few layered $MoS_2$ nanosheets based high performance wire type solid-state symmetric supercapacitors. Journal of Power Sources, 321, pp. 112-119.
11. Dai, Y., Wu, X., Sha, D., Chen, M., Zou, H., Ren, J., Wang, J. and Yan, X., 2016; Facile self-assembly of $Fe_3O_4$ nanoparticles@$WS_2$ nanosheets: A promising candidate for supercapacitor electrode. Electronic Materials Letters, 12(6), pp. 789-794.
12. Wang, Yifeng; Ye, Yang; Shen, Yawei; Pan, Lin; Zhang, Jian; Method for preparing $TiS_2$ composite nano $MoS_2$ thermoelectric materials. Faming Zhuanli Shenqing (2016), CN 105226180 A.
13. Han, Z., Zhou, S., Wang, N., Zhang, Q., Zhang, T. and Ran, W., 2016; Crystal structure and hydrogen storage behaviors of Mg/$MoS_2$ composites from ball milling. Journal of Wuhan University of Technology-Mater. Sci. Ed., 31(4), pp. 773-778.
14. Setijadi, E. J., Li, X., Masters, A. F., Maschmeyer, T. and Aguey-Zinsou, K. F., 2016; Delaminated $MoS_2$ as a structural and functional modifier for $MgH_2$—Better hydrogen desorption kinetics through induced worm-like morphologies. International Journal of Hydrogen Energy, 41(5), pp. 3551-3560.
15. Choudhary, N., Park, J., Hwang, J. Y., Chung, H. S., Dumas, K. H., Khondaker, S. I., Choi, W. and Jung, Y., 2016; Centimeter Scale Patterned Growth of Vertically Stacked Few Layer Only 2D $MoS_2$/$WS_2$ van der Waals Heterostructure. Scientific reports, 6.
16. Zheng, S., Sun, L., Yin, T., Dubrovkin, A. M., Liu, F., Liu, Z., Shen, Z. X. and Fan, H. J., 2015; Monolayers of $W_xMo_{1-x}X_2$ alloy heterostructure with in-plane composition variations. Applied Physics Letters, 106(6), p. 063113.
17. Kobayashi, Y., Mori, S., Maniwa, Y. and Miyata, Y., 2015; Bandgap-tunable lateral and vertical heterostructures based on monolayer $Mo_{1-x}$ $S_2$ alloys. Nano Research, 8(10), pp. 3261-3271.
18. Shi, J., Tong, R., Zhou, X., Gong, Y., Zhang, Z., Ji, Q., Zhang, Y., Fang, Q., Gu, L., Wang, X. and Liu, Z., 2016; Temperature-Mediated Selective Growth of $MoS_2$/$WS_2$ and $WS_2$/$MoS_2$ Vertical Stacks on Au Foils for Direct Photocatalytic Applications. Advanced Materials, 28(48), pp. 10664-10672.
19. Thomazeau, C., Geantet, C., Lacroix, M., Harle, V., Benazeth, S., Marhic, C. and Danot, M., 2001; Two cation disulfide layers in the $W_xMo_{1-x}S_2$ lamellar solid solution. Journal of Solid State Chemistry, 160(1), pp. 147-155.
20. Dong, R., Moore, L., Aripova, N., Williamson, C., Schurz, R., Liu, Y., Ocola, L. E. and Kuljanishvili, I., 2016; Bottom-up direct writing approach for controlled fabrication of $WS_2$/$MoS_2$ heterostructure systems. RSC Advances, 6(71), pp. 66589-66594.
21. Chen, K., Wan, X., Xie, W., Wen, J., Kang, Z., Zeng, X., Chen, H. and Xu, J., 2015; Lateral Built-In Potential of Monolayer $MoS_2$—$WS_2$ In-Plane Heterostructures by a Shortcut Growth Strategy. Advanced Materials, 27(41), pp. 6431-6437.
22. Li, C., Bo, Xi., Guo, L., 2017; Facile electrodeposition fabrication of molybdenum-tungsten sulfide on carbon cloth for electrocatalytic hydrogen evolution. Int. J. Hydrogen Energy, 42, pp. 15479-15488.
23. Lei, Y.; Pakhira, S.; Fujisawa, K.; Wang, X.; Iyiola, O. O.; Perea López, N.; Laura Elías, A.; Pulickal Rajukumar, L.; Zhou, C.; Kabius, B.; Alem, N.; Endo, M.; Lv, R.; Mendoza-Cortes, J. L.; Terrones, M., 2017; Low-temperature Synthesis of Heterostructures of Transition Metal Dichalcogenide Alloys (WxMo1–xS2) and Graphene with Superior Catalytic Performance for Hydrogen Evolution; ACS Nano, 11, 5103-5112.
24. Tang, Junli; Cui, Yuqing; Xi, Sha; Zhou, Xinwen; He, Kai; Zhu, Qi; Preparation method of 2H—$MoS_2$ nanosheet from molybdenum concentrate under atmospheric pressure. Faming Zhuanli Shenqing (2016), CN 106064833 A.
25. Yang, Jun; Zhu, Shengyu; Zhang, Hao; Cheng, Jun; Qiao, Zhuhui; Liu; Weimin. Widevacuum high-temperature self-lubricating composite material and preparation method thereof. From Faming Zhuanli Shenqing (2016), CN 106086568 A.
26. Tang Hua, Zhang Hongtao, Li Changsheng, Zhang Du; Copper-based self-lubricating composite material containing $WS_2$ and $MoS_2$ and preparation method thereof. Faming Zhuanli Shenqing (2013), CN 103627921 A.

27. Abdelkader, A. M. and Kinloch, I. A., 2016; Mechanochemical exfoliation of 2D crystals in deep eutectic solvents. ACS Sustainable Chemistry & Engineering, 4(8), pp. 4465-4472.
28. Xu, Z. Z., Wang, D. Z., Wu, Z. Z., Zhu, W. and Wang, C. L., 2013; Preparation of $WS_2$ Nanoplates by Mechanical Activation Method. Materials for Mechanical Engineering, 3, p. 017.
29. Wu, Z., Wang, D., Zan, X. and Sun, A., 2010; Synthesis of $WS_2$ nanosheets by a novel mechanical activation method. Materials Letters, 64(7), pp. 856-858.
30. Zeng Hong, Wu Ying, Zhao Haihua, Zhou Shaoxiong; $WS_2$—$MoS_2$—C composite negative pole material and preparation method thereof. Aetna Technology Co., Ltd (2015), CN 104577063 A
31. Mao, Daheng; Shi, Chen; Mao, Xianghui; Mao, Yan; Li, Dengling; Preparation method of $WS_2$ or $MoS_2$ nanoparticles. Faming Zhuanli Shenqing (2010), CN 101857274 A.
32. Huang, Fuqiang; Liu, Zhanqiang; Lin, Tianquan; Tang, Yufeng; MoS2/graphene composite material and preparation method thereof. Faming Zhuanli Shenging (2016), CN 106033810 A.
33. Kostecki, M. & Jezierska, E.; Influence of Milling Media on Mechanically Exfoliated $MoS_2$. *Nanomater. Nanotechnol.* 4, 1-9 (2014).
34. Oleg Yu. Posudievsky, a Oleksandra A. Khazieieva, a Vsevolod V. Cherepanov, b Galina I. Dovbeshko, b Anatoly G. Shkavro, c Vyacheslav G. Koshechkoa and Vitaly D. Pokhodenkoa; Improved dispersant-free liquid exfoliation down to the graphene-like state of solvent-free mechanochemically delaminated bulk $MoS_2$. *J. Mater. Chem. C* 1, 6411 (2013).
35. Lei, Y.; Pakhira, S.; Fujisawa, K.; Wang, X.; Iyiola, O. O.; Perea López, N.; Laura Elías, A.; Pulickal Rajukumar, L.; Zhou, C.; Kabius, B.; Alem, N.; Endo, M.; Lv, R.; Mendoza-Cortes, J. L.; Terrones, M., 2017; Low-temperature Synthesis of Heterostructures of Transition Metal Dichalcogenide Alloys ($W_xMo_{1-x}S_2$) and Graphene with Superior Catalytic Performance for Hydrogen Evolution. ACS Nano, 11, 5103-5112
36. Wang, L., Sofer, Z., Luxa, J. & Pumera, M.; $Mo_xW_{1-x}S_2$ Solid Solutions as 3D Electrodes for Hydrogen Evolution Reaction. *Adv. Mater. Interfaces* 2, 1500041 (2015).
37. Kun Chen, Xi Wan, Weiguang Xie, Jinxiu Wen, Zhiwen Kang, Xiaoliang Zeng, Huanjun Chen, and Jianbin Xu; Lateral Built-In Potential of Monolayer $MoS_2$—$WS_2$ In-Plane Heterostructures by a Shortcut Growth Strategy. *Adv. Mater.* 27, 6431-6437 (2015)
38. Giannuzzi, L. A., Drown, J. L., Brown, S. R., Irwin, R. B. & Stevie, F. A.; Focused Ion Beam Milling and Micromanipulation Lift-Out for Site Specific Cross-Section Tem Specimen Preparation. *MRS Proc.* 480, 19-27 (1997);
39. Yaguchi, T., Kamino, T., Ishitani, T. & Urao, R.; Method for Cross-sectional Transmission Electron Microscopy Specimen Preparation of Composite Materials Using a Dedicated Focused Ion Beam System. *Microsc. Microanal.* 5, 365-370 (1999)
40. Dumcenco, D. O., Chen, K. Y., Wang, Y. P., Huang, Y. S. & Tiong, K. K.; Raman study of $2H$—$Mo_{1-x}W_xS_2$ layered mixed crystals. J. Alloys Compd. 506, 940-943 (2010)
41. Chong-Rong Wu, Xiang-Rui Chang, Tung-Wei Chu, Hsuan-An Chen, Chao-Hsin Wu, and Shih-Yen Lin; Establishment of 2D Crystal Heterostructures by Sulfurization of Sequential Transition Metal Depositions: Preparation, Characterization, and Selective Growth. Nano Lett. 16, 7093-7097 (2016).
42. Brainard, W. A.; The thermal stability and friction of the disulfides, diselenides, and ditellurides of molybdenum and tungsten in vaccum (10-9 to 10-6 TORR). *NASA Technical Note D*-5141 1-26 (1968);
43. Giannuzzi, L. A., Drown, J. L., Brown, S. R., Irwin, R. B. & Stevie, F. A.; Focused Ion Beam Milling and Micromanipulation Lift-Out for Site Specific Cross-Section Tem Specimen Preparation. *MRS Proc.* 480, 19-27 (1997)
44. Ambrosi, A., Sofer, Z. & Pumera, M.; 2H→1T phase transition and hydrogen evolution activity of $MoS_2$, $MoSe_2$, $WS_2$ and $WSe_2$ strongly depends on the $MX_2$ composition. *Chem. Commun.* 51, 8450-8453 (2015).
45. Eda, G. et al. Photoluminescence from Chemically Exfoliated $MoS_2$. *Nano Lett.* 11, 5111 5116(2011).
46. Mahler, B., Hoepfner, V., Liao, K. & Ozin, G. A.; Colloidal Synthesis of 1T-$WS_2$ and 2H—$WS_2$ Nanosheets: Applications for Photocatalytic Hydrogen Evolution. *J. Am. Chem. Soc.* 136, 14121-14127 (2014).
47. Naik, R., Jena, S., Ganesan, R. & Sahoo, N. K.; Laser-induced optical properties change in $Sb_{10}S_{40}Se_{50}$ chalcogenide thin films: An investigation through FTIR and XPS measurements. *Phys. Status Solidi* 251, 661-668 (2014).
48. Miracle, D. B. & Senkov, O. N.; A critical review of high entropy alloys and related concepts. *Acta Mater.* 122, 448-511 (2017)
49. Geim, A. K. & Grigorieva, I. V.; Van der Waals heterostructures. *Nature* 499, 419-425 (2013).
50. Novoselov, K. S., Mishchenko, A., Carvalho, A. & Castro Neto, A. H.; 2D materials and van der Waals heterostructures. *Science* 353, aac9439 (2016)

We claim:

1. A method for preparing a transition metal chalcogenide, comprising the step of exfoliating and concurrently self-combining two or more starting transition metal chalcogenides having compositions that differ with respect to at least one of a transition metal constituent and a chalcogen constituent to produce a hetero-layered structure having a mix of different layers with different compositions.

2. The method of claim 1 wherein exfoliating is conducted by mechanical processing of the starting transition metal chalcogenides together.

3. The method of claim 2 wherein the exfoliating is conducted by dry mechanical processing of the two or more starting transition metal chalcogenides together.

4. The method of claim 2 wherein dry mechanical processing is carried out in an inert gaseous atmosphere or gaseous atmosphere that is non-reactive towards the two or more starting transition metal chalcogenides and the produced hetero-layered structure.

5. The method of claim 2 wherein the exfoliating and self-combining are conducted by mechanical processing in the presence of a liquid medium.

6. The method of claim 5 wherein the liquid medium comprises at least one of isopropanol, water, dimethylsulphoxide, N-vinyl-pyrrolidinonc, N-methyl-pyrrolidinone, benzonitrile or any solvent that does not react with exfoliated chalcogenide materials under the processing conditions.

7. The method of claim 2 wherein mechanical processing is carried out using pestle and mortar, shaker ball mills of any configuration, planetary ball mills of any configurations, any type of laboratory or industrial grinders, sonication, or other milling, or grinding equipment.

8. The method of claim 1 wherein the exfoliating and sell-combining form the hetero-layered structure which is three dimensional.

9. The method of claim 1 wherein the exfoliated starting transition metal chalcogenides are concurrently mixed as they are exfoliated to self-combine to form the hetero-layered structure.

10. The method of claim 9 where the hetero-layered structure is converted into single-phase, chalcogenide material by subjecting it to thermal annealing treatment or mechanical processing including at least one of milling, grinding, cold or hot rolling, or extrusion, high hydrostatic pressure, combined with thermal annealing treatment.

11. The method of claim 10 wherein the thermal treatment is carried out by heating in the temperature range between 100° C. and 1500° C.

12. The method of claim 1 wherein the exfoliating and concurrent self-combing are carried out by ultrasonic irradiation.

13. The method of claim 1 including the further step of treating the hetero-layered structure to form a substantially single-phase, chalcogenide structure.

14. The method of claim 13 wherein the hetero-layered structure is substantially devoid of separate phases of the two or more starting transition metal chalcogenides.

15. The method of claim 13 wherein a substantially homogenous solid solution of the two or more starting transition metal chalcogenides is produced.

16. The method of claim 13 wherein the hetero-layered structure is treated by heat treating at a temperature for a time to achieve a substantially single-phase chalcogenide structure.

17. The method of claim 16 wherein heat treating is conducted at elevated temperatures between 100 and 1500 degrees C. in an inert or non-reactive gaseous atmosphere to produce a single-phase transition metal chalcogenide.

18. The method of claim 16 wherein the heat treating time is between 1 minute to 72 hours or longer.

19. The method of claim 16 wherein heat treating is conducted in an atmosphere comprising at least one of helium, argon, krypton, xenon, nitrogen, and any other gas, which shows no reactivity towards the starting transition metal chalcogenides or the hetero-layered structure.

20. The method of claim 13 including the further step of exfoliating the substantially single phase, chalcogenide structure.

21. The method of claim 1 wherein the starting transition metal chalcogenides comprise transition metal dichalcogenides selected from the group consisting of the group 4 transition metal dichalcogenides (M=Ti, Zr, Hf), group 5 transition metal dichalcogenides (M=V, Nb, Ta) or group 6 transition metal dichalcogenides (M=Cr, Mo, W), group 7 transition metal dichalcogenides (M=Mn, Re), group 10 transition metal dichalcogenides (M=Pd, Pt)J, group 11 transition metal dichalcogenides (Cu, Ag), group 12 transition metal dichalcogenides (Zn, Cd), group 13 transition metal dichalcogenides (e.g., M=1n, Ga) as well as lanthanum group metals chalcogenides (Sc, Y, La, Ce, Pr, Nd, Sm, Eu, Gd, Tb, Dy, Ho, Er, Tm, Yb, Lu).

22. The method of claim 1 that produce a hetero-layered transition metal chalcogenide having a chemical composition represented by $(M_a M^2_b M^3_c \ldots _n)(X_d X^2_e X^3_f)$, where the formula unit includes two or more different metals (M), and X, $X^2$ and $X^3$ represent S, Se, or Te, whereby the sum of a+b+c+...n is between 1 and 3 and the sum of d+e+f is between 1 and 6.

23. The method of claim 1 where the hetero-layered structure comprises at least two or more of a mixed metal dichalcogenide material, a mixed metal tricbalcogenide material, a same metal dichalcogenide material, or a same metal trichalcogenide material.

24. The method of claim 23 the metal is selected from the group consisting of Ti, Zr, Hf, Nb, Ta, Mo, W, Re, Pd, Pt, In, Ga and Sn.

25. The method of claim 1 wherein the exfoliating and self-combining occur in the presence of at least one of graphite, black phosphorus, and boron nitride.

26. The method of claim 1 wherein exfoliating is conducted using at least one of ultrasonic irradiation, liquid-assisted mechanical processing that includes grinding or milling, electrical force liquid-phase electrochemical exfoliation, or chemical exfoliation.

* * * * *